United States Patent
Kimura et al.

(10) Patent No.: US 9,678,613 B2
(45) Date of Patent: Jun. 13, 2017

(54) INPUT DEVICE AND DISPLAY

(71) Applicant: Sharp Kabushiki Kaisha, Osaka-shi, Osaka (JP)

(72) Inventors: Tomohiro Kimura, Osaka (JP); Yasuhiro Sugita, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 28 days.

(21) Appl. No.: 14/769,475

(22) PCT Filed: Feb. 13, 2014

(86) PCT No.: PCT/JP2014/053301
§ 371 (c)(1),
(2) Date: Aug. 21, 2015

(87) PCT Pub. No.: WO2014/129374
PCT Pub. Date: Aug. 28, 2014

(65) Prior Publication Data
US 2016/0004351 A1    Jan. 7, 2016

(30) Foreign Application Priority Data
Feb. 25, 2013  (JP) .................. 2013-034994

(51) Int. Cl.
*G06F 3/044* (2006.01)
*G06F 3/14* (2006.01)
(Continued)

(52) U.S. Cl.
CPC ............ *G06F 3/044* (2013.01); *G06F 1/1647* (2013.01); *G06F 3/0346* (2013.01);
(Continued)

(58) Field of Classification Search
CPC .... G06F 1/1647; G06F 3/0346; G06F 3/0416; G06F 3/044; G06F 3/1423; G06F 3/1446
(Continued)

(56) References Cited

U.S. PATENT DOCUMENTS 6,452,514 B1    9/2002  Philipp
8,798,669 B2 *  8/2014  Russ .................. H04M 1/0256
                                                    345/173
(Continued)

FOREIGN PATENT DOCUMENTS

JP    2008-216499 A    9/2008
JP    2010-238148 A    10/2010
(Continued)

OTHER PUBLICATIONS

Official Communication issued in International Patent Application No. PCT/JP2014/053301, mailed on Apr. 8, 2014.

*Primary Examiner* — Tony Davis
(74) *Attorney, Agent, or Firm* — Keating & Bennett, LLP

(57) ABSTRACT

An input device (2a) includes: a position/angle determining section (505) for determining an adjacent region (F1) and defining, in the adjacent region (F1), an input coordinate system that is in common with a counterpart device; a detection position control section (701) for determining first detection coordinates indicating a user operation performed in the adjacent region (F1) in the input coordinate system; and a data transmitting and receiving section (506) for transmitting the first detection coordinates to the counterpart device.

10 Claims, 64 Drawing Sheets

(51) Int. Cl.
*G06F 1/16* (2006.01)
*G06F 3/0346* (2013.01)
*G06F 3/041* (2006.01)

(52) U.S. Cl.
CPC .......... *G06F 3/0416* (2013.01); *G06F 3/1423* (2013.01); *G06F 3/1446* (2013.01)

(58) Field of Classification Search
USPC .................................................. 345/170–173
See application file for complete search history.

(56) References Cited

U.S. PATENT DOCUMENTS

| | | | | |
|---|---|---|---|---|
| 8,866,754 B2* | 10/2014 | Homma | ................ | G06F 3/0416 345/1.1 |
| 9,019,214 B2* | 4/2015 | Sirpal | .................. | G06F 1/1616 345/173 |
| 2010/0225601 A1* | 9/2010 | Homma | ................ | G06F 3/0416 345/173 |
| 2010/0245275 A1 | 9/2010 | Tanaka | | |
| 2011/0304583 A1* | 12/2011 | Kruglick | ................ | G06F 3/044 345/174 |
| 2012/0081303 A1* | 4/2012 | Cassar | .................. | G06F 1/1616 345/173 |
| 2013/0060555 A1* | 3/2013 | Thomson | .............. | G06F 1/3203 703/21 |
| 2013/0147760 A1* | 6/2013 | Lai | ....................... | H04B 5/0012 345/174 |
| 2013/0211757 A1 | 8/2013 | Miyamoto | | |
| 2014/0184534 A1* | 7/2014 | Lee | ....................... | G06F 3/0412 345/173 |
| 2015/0378501 A1* | 12/2015 | Chen | ..................... | G06F 3/0416 345/173 |
| 2016/0110012 A1* | 4/2016 | Yim | ...................... | G06F 1/1626 345/173 |
| 2016/0117141 A1* | 4/2016 | Ro | ........................ | G06F 3/1454 715/748 |
| 2016/0283020 A1* | 9/2016 | Heo | ....................... | G06F 3/0416 |

FOREIGN PATENT DOCUMENTS

| | | |
|---|---|---|
| JP | 2011-221542 A | 11/2011 |
| JP | 4927216 B1 | 5/2012 |
| JP | 2012-173542 A | 9/2012 |
| WO | 2010/100075 A1 | 9/2010 |

* cited by examiner

FIG. 9
(a)
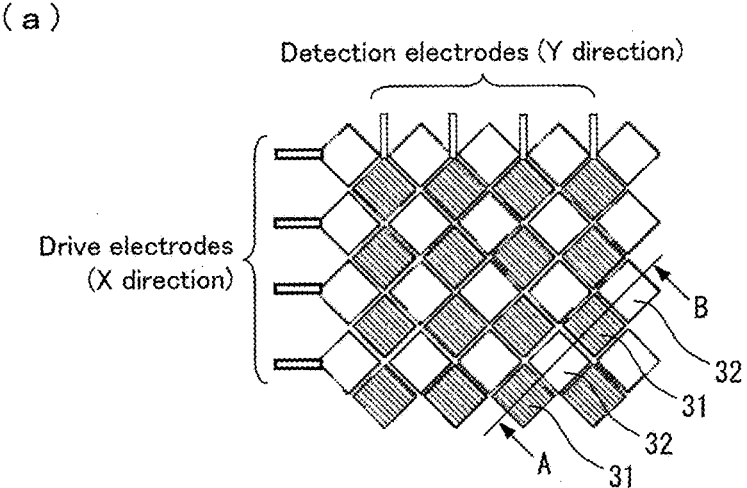
(b)
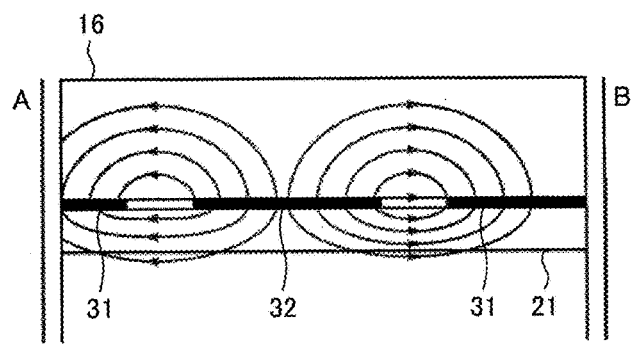
(c)
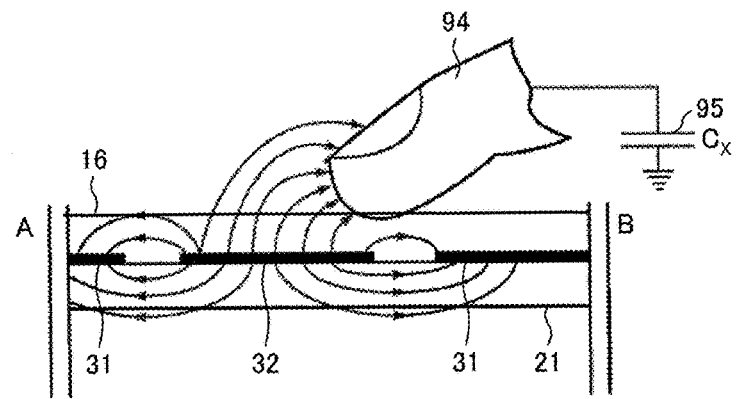

| | Transmitting device | |
|---|---|---|
| | Drive (transmitting) electrode | Drive (receiving) electrode |
| Case 1 | Normal operation (pulse application) | Normal operation (reading of electric charge) |
| Case 2 | Normal operation (pulse application) | Constant potential or Hi Z |

(b)

| | Receiving device | |
|---|---|---|
| | Drive (transmitting) electrode | Drive (receiving) electrode |
| Case 1 | Constant potential or Hi Z | Normal operation (reading of electric charge) |
| Case 2 | Normal operation (pulse application) | Normal operation (reading of electric charge) |

| Case | Electrode orientation | Conceptual image | Output example | Whether position detection is possible in Y direction |
|---|---|---|---|---|
| 1 | DL / SL | 1b / 1a | Sequence 1-8 plot | ○ |
| 2 | DL / SL | 1b / 1a | — | × |
| 3 | DL / SL | 1b / 1a | Sequence 1-8 plot | ○ |
| 4 | DL / SL | 1b / 1a | — | × |

FIG. 36

| Case | Electrode orientation | | Conceptual image | Output example | Whether position detection is possible in Y direction |
|---|---|---|---|---|---|
| | DL | SL | | | |
| 1 | (vertical DL) | (horizontal SL) | 1a horizontal lines, 1b vertical lines | — | × |
| 2 | (horizontal DL) | (vertical SL) | 1a vertical lines, 1b horizontal lines | 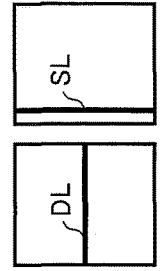 | ○ |
| 3 | (vertical DL) | (vertical SL) | 1a vertical lines, 1b vertical lines | 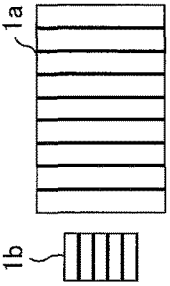 | ○ |
| 4 | (horizontal DL) | (horizontal SL) | 1a horizontal lines, 1b horizontal lines | — | × |

FIG. 42

| Case | Electrode orientation | Conceptual image | Output example | Whether position detection is possible | |
|---|---|---|---|---|---|
| | | | | X direction | Y direction |
| 1 | DL / SL | | | ○ | × |
| 2 | DL / SL | | | × | ○ |
| 3 | DL / SL | | | × | ○ |
| 4 | DL / SL | | | ○ | × |

FIG. 48

| Case | Electrode orientation | Conceptual image | Output example | Whether position detection is possible | |
|---|---|---|---|---|---|
| | | | | X direction | Y direction |
| 1 | DL / SL | | | ○ | × |
| 2 | DL / SL | | | × | ○ |
| 3 | DL / SL | | | × | ○ |
| 4 | DL / SL | | | ○ | × |

INPUT DEVICE AND DISPLAY

TECHNICAL FIELD

The present invention relates to, for example, (i) an input device capable of accepting an input made through a user operation and (ii) a display device capable of displaying an image.

BACKGROUND ART

Recent years have seen developments of a display device including a touch panel. An example of such a display device is disclosed in Patent Literature 1.

Patent Literature 1 discloses a table-type screen device 200 as illustrated in FIG. 53. This device is such that the positions of a camera 231 and printer 235, both of which are placed on a screen 215, are detected by a position detecting section 223 via a touch panel 216, and that in accordance with a predetermined instruction operation, image data 233 is transferred from the camera 231 to the printer 235 via the communication section 225. On an area between the position of the camera 231 and the position of the printer 235, an image 233*a* is displayed indicating a progress of transfer of the image data.

CITATION LIST

Patent Literatures

[Patent Literature 1]
Japanese Patent Application Publication, Tokukai No. 2011-221542 (Publication date: Nov. 4, 2011)
[Patent Literature 2]
U.S. Pat. No. 6,452,514 (Registration date: Jul. 17, 2002)
[Patent Literature 3]
Japanese Patent Publication No. 4927216 (Registration date: Feb. 17, 2012)

SUMMARY OF INVENTION

Technical Problem

In the technique disclosed in Patent Literature 1, the touch panel 216 included in the table-type screen device 200 detects the positions of the camera 231, the printer 235, and the like electronic device placed on the screen 215. However, input control, display control, or the like control between the table-type screen device 200 and the electronic devices is not performed in accordance with the positions thus detected. Moreover, the technique disclosed in Patent Literature 1 is not the one in which of the two electronic devices detect their mutual positions, and is, as a matter of course, not the one in which input control, display control, or the like control between the two electronic devices.

The present invention has been attained to solve the above problem. It is an object of the present invention to provide an input device and the like capable of preforming input control, display control, or the like control based on the detection of the positions of electronic devices, thereby improving user's convenience.

Solution to Problem

In order to solve the above problem, an input device according to an aspect of the present invention is an input device capable of, while a first panel component of the input device is placed next to a second panel component of a counterpart device, accepting an input of a continuous track made through contact of the target object or approach thereof, the continuous track extending from the first panel component to the second panel component, the input device including: a region determining section for, at an occurrence of contact of the counterpart device with the input device or approach thereof to the input device, determining a first adjacent region and defining, in the first adjacent region, an input coordinate system that is in common with the counterpart device, the first adjacent region being a region located in the first panel component so as to be adjacent to the second panel component; a detection position determining section for, upon detection of a user operation performed in the first adjacent region, determining first detection coordinates indicating a position of the user operation in the input coordinate system; and a transmitting section for transmitting, to the counterpart device, the first detection coordinates determined by the detection position determining section.

In order to solve the above problem, an input device according to an aspect of the present invention is an input device capable of, while a second panel component of the input device is placed next to a first panel component of a counterpart device, accepting an input of a continuous track made through contact of the target object or approach thereof, the continuous track extending from the first panel component to the second panel component, the input device including: a region determining section for, at an occurrence of contact of the counterpart device with the input device or approach thereof to the input device, determining a second adjacent region and defining, in the second adjacent region, an input coordinate system that is in common with the counterpart device, the second adjacent region being a region located in the second panel component so as to be adjacent to the first panel component; a receiving section for receiving first detection coordinates, determined by the counterpart device, indicating, in the input coordinate system, a position of a user operation performed in a first adjacent region, the first adjacent region being a region located in the first panel component so as to be adjacent to the second panel component; a detection position determining section for, upon detection of a user operation performed in the second adjacent region, determining second detection coordinates indicating a position of the user operation in the input coordinate system; a position judging section for judging whether the second detection coordinates having been determined by the detection position determining section match the first detection coordinates having been received by the receiving section or whether the second detection coordinates is present in a predetermined range where the second detection coordinates are deemed to match the first detection coordinates; and an input judging section for, in a case where the position judging section has judged that the second detection coordinates match the first detection coordinates or that the second detection coordinates are present in the predetermined range, judging the second detection coordinates as being the input of the continuous track.

Advantageous Effects of Invention

An input device and the like according to an aspect of the present invention perform input control based on the detection of the positions of input devices, thereby improving user's convenience.

BRIEF DESCRIPTION OF DRAWINGS

FIG. 9 shows plan views of an example capacitive touch panel, where (a) is a plan view of the touch panel, the plan view illustrating how electrodes of the touch panel are arranged, (b) is a A-B cross-sectional view of the touch panel, the cross-sectional view being taken along line A-B shown in (a), and (c) is a diagram illustrating an operation of the touch panel which operation is performed in the case where a finger (or thumb [the same applies hereinafter]) has touched the touch panel.

Figure 15:
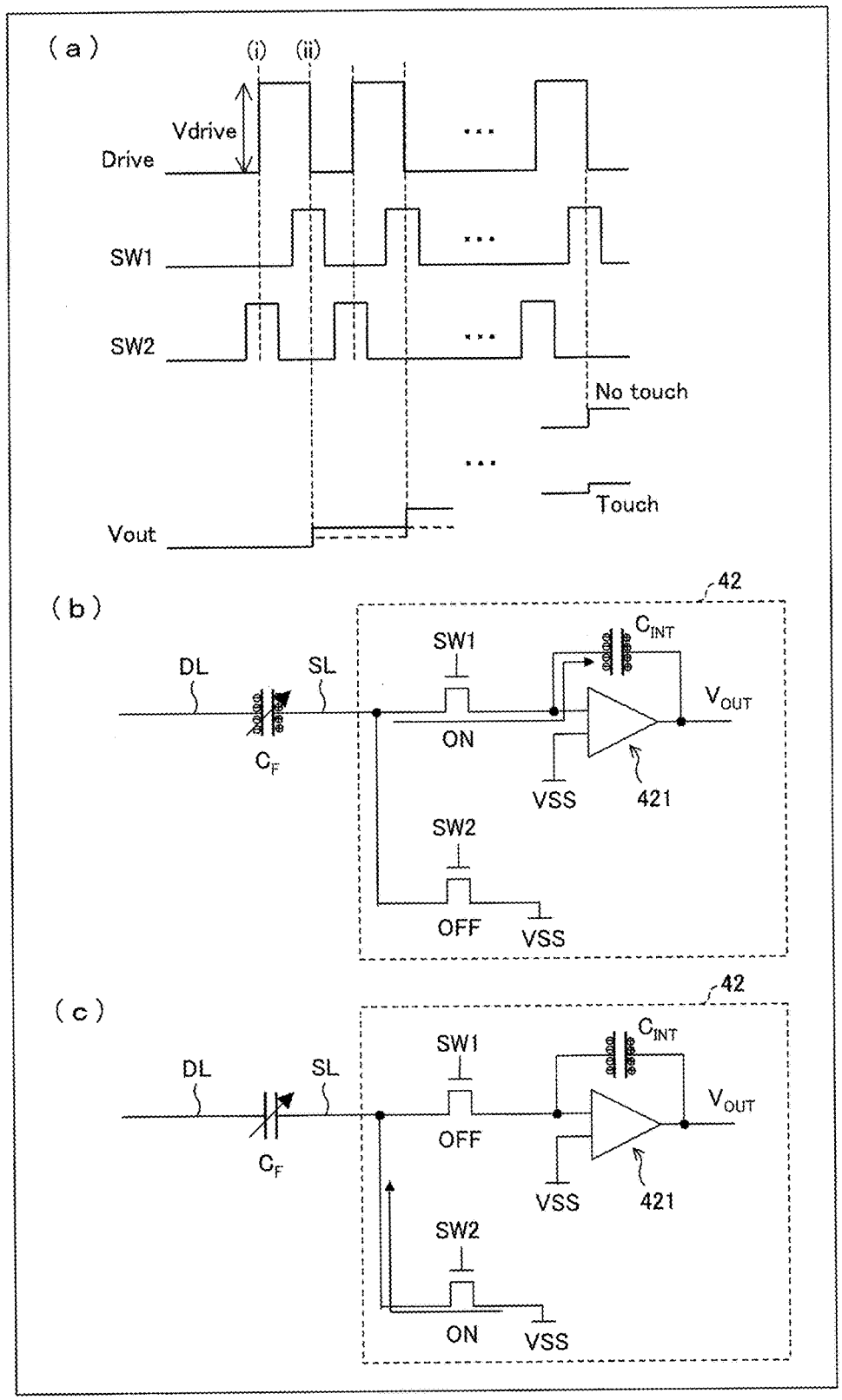

(a) to (c) of FIG. 15 are each a diagram illustrating a driving principle of a mutual capacitive touch panel.

Figure 16:
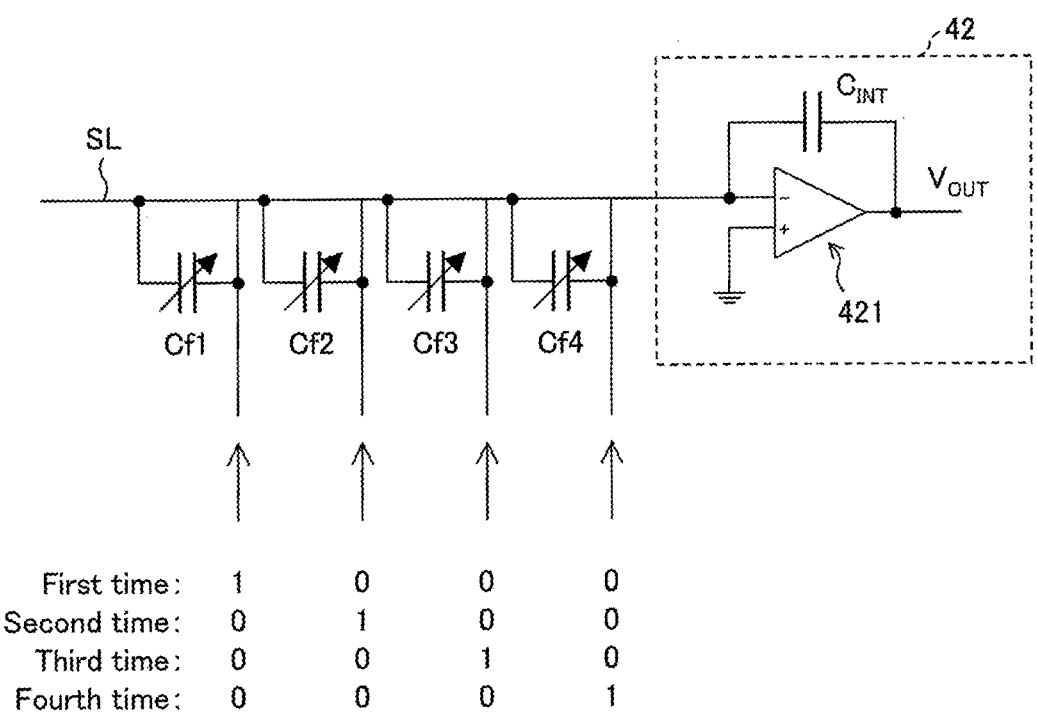

FIG. 16 is a diagram illustrating a driving principle of a sequential driving scheme.

Figure 17:
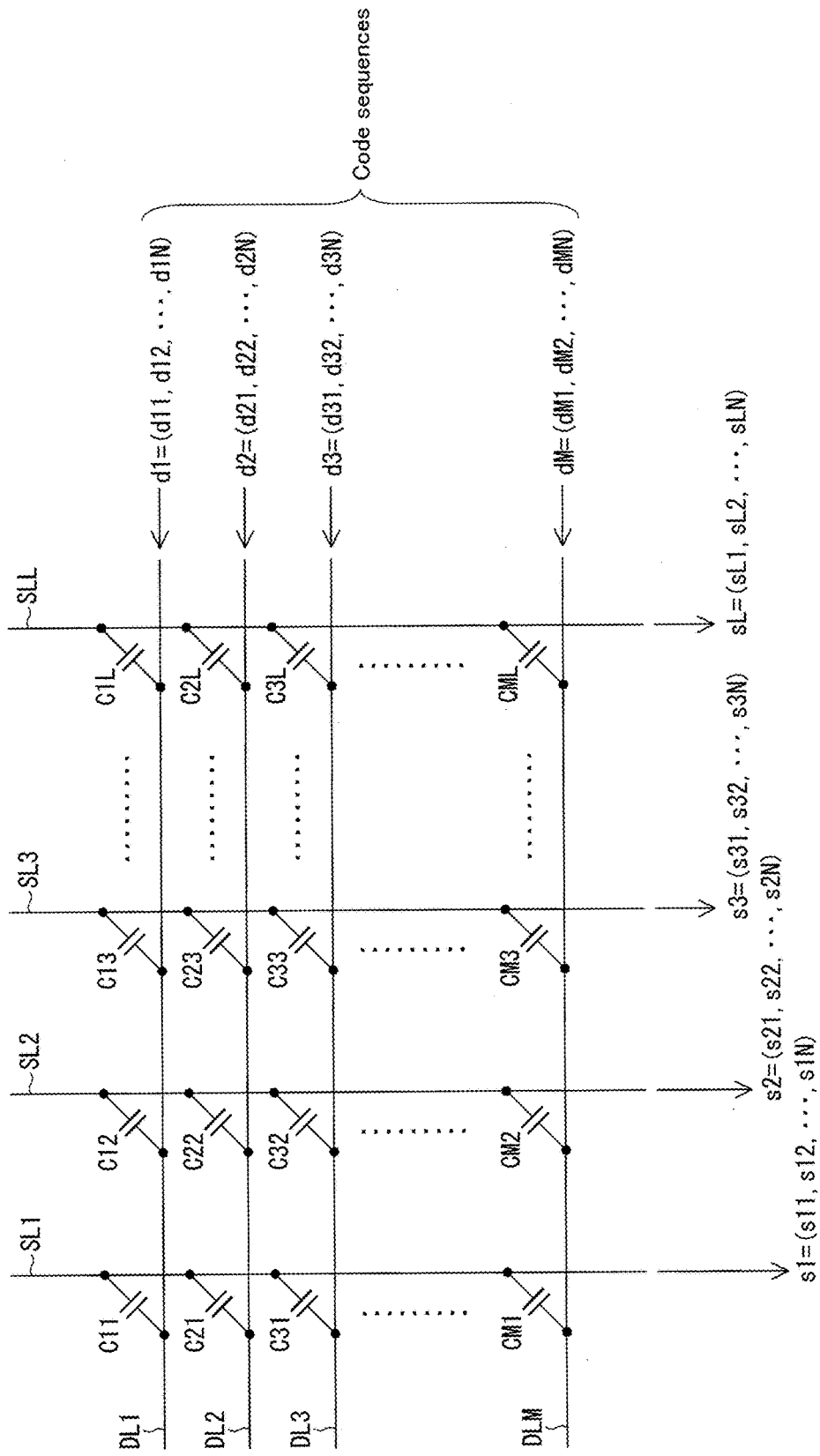

FIG. 17 is a diagram illustrating a driving principle of an orthogonal sequence driving scheme.

Figure 18:
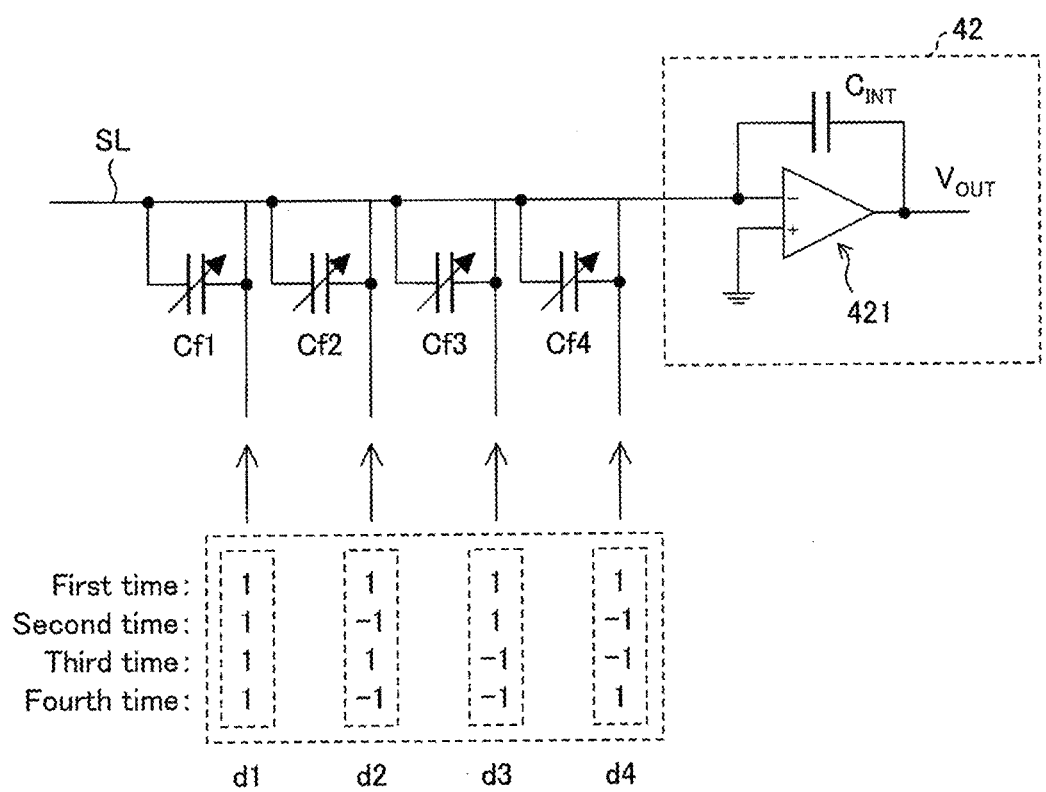

FIG. 18 is a diagram illustrating a driving principle of the orthogonal sequence driving scheme.

Figure 19:
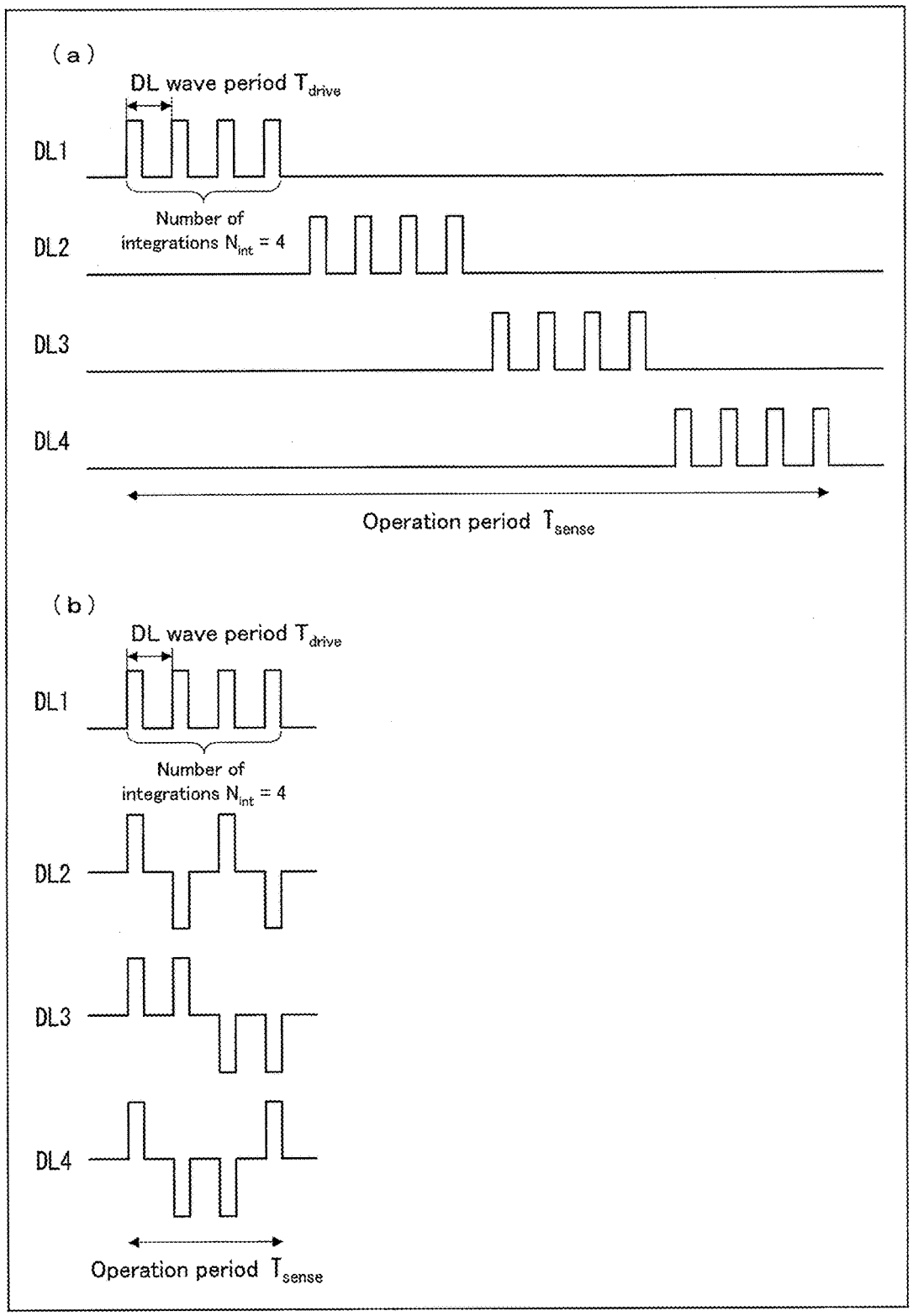

FIG. 19 shows diagrams each illustrating how parallel driving effectively reduces a time taken for a touch panel to carry out sensing, where (a) of FIG. 19 shows a sensing time in the case of sequential driving, and (b) of FIG. 9 shows a sensing time in the case of parallel driving.

Figure 20:
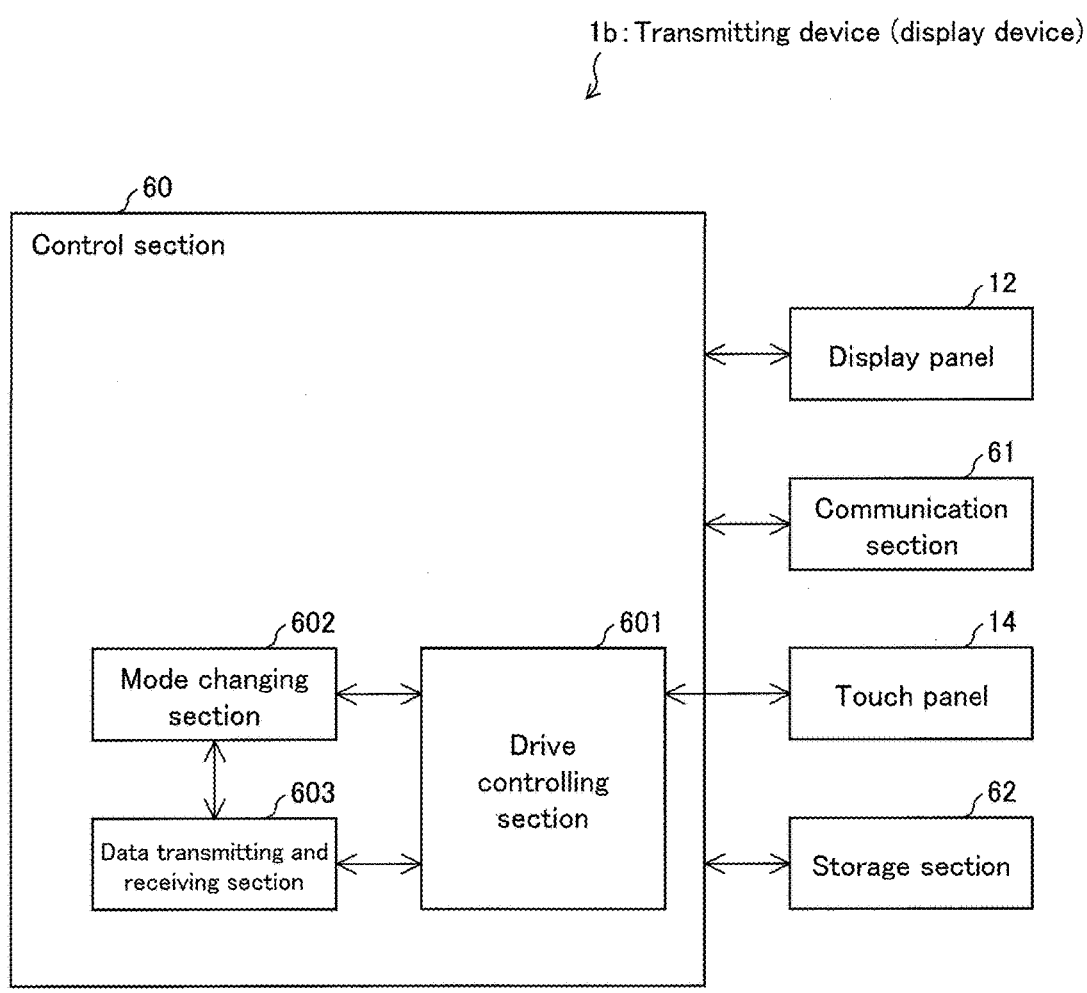

FIG. 20 is a diagram illustrating an example functional block of a control section included in each of the display devices (transmitting devices) of an embodiment of the present invention.

FIG. 21 is a diagram illustrating an example driving scheme employed for position detection, where (a) of FIG. 21 is a diagram illustrating a driving scheme of a transmitting device, and (b) of FIG. 21 is a diagram illustrating a driving scheme of a receiving device.

Figure 22:
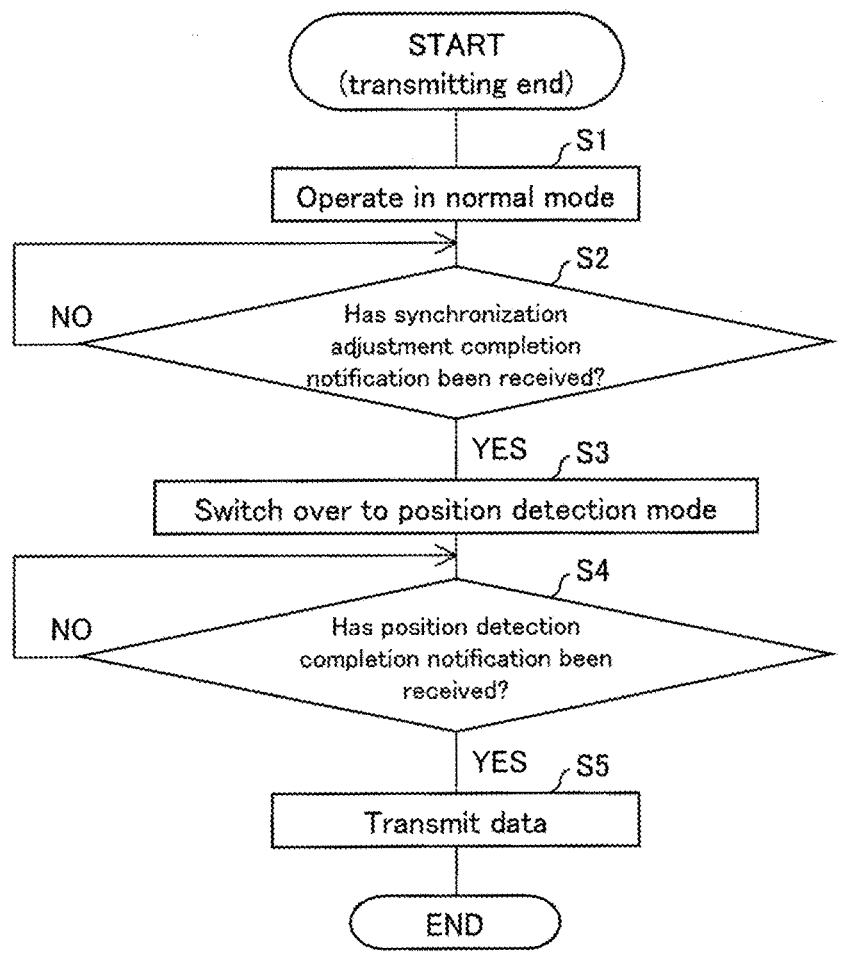

FIG. 22 is a flowchart illustrating the flow of processes performed by the transmitting device.

Figure 23:
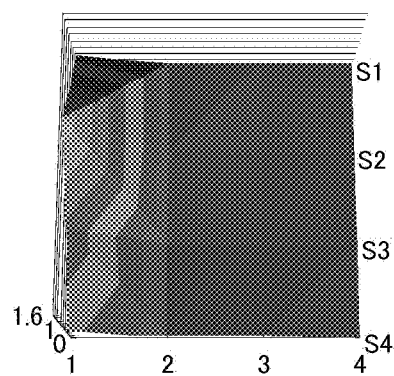

FIG. 23 is a view illustrating an example signal distribution obtained when the receiving device has detected contact of a transmitting device or approach thereof.

Figure 24:
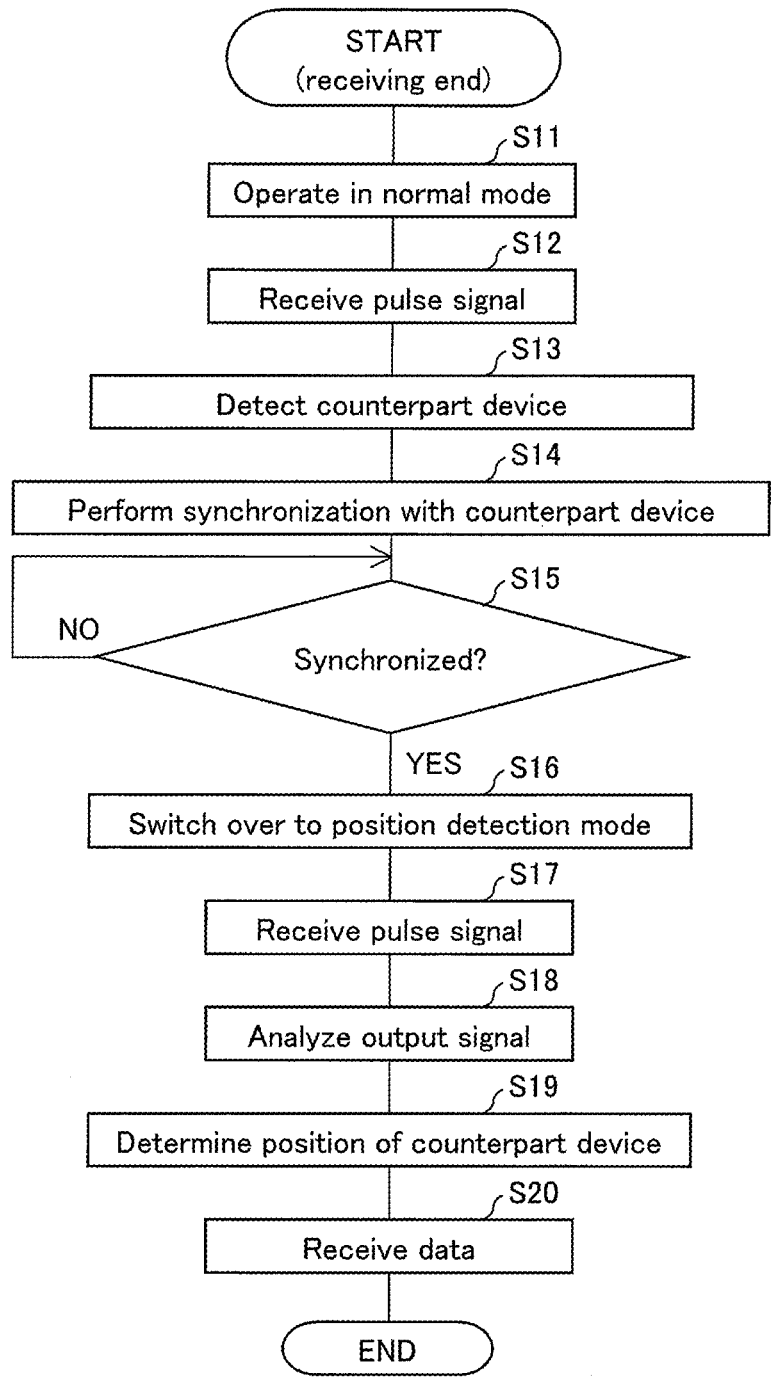

FIG. 24 is a flowchart illustrating the flow of the processes performed by the receiving device.

Figure 25:
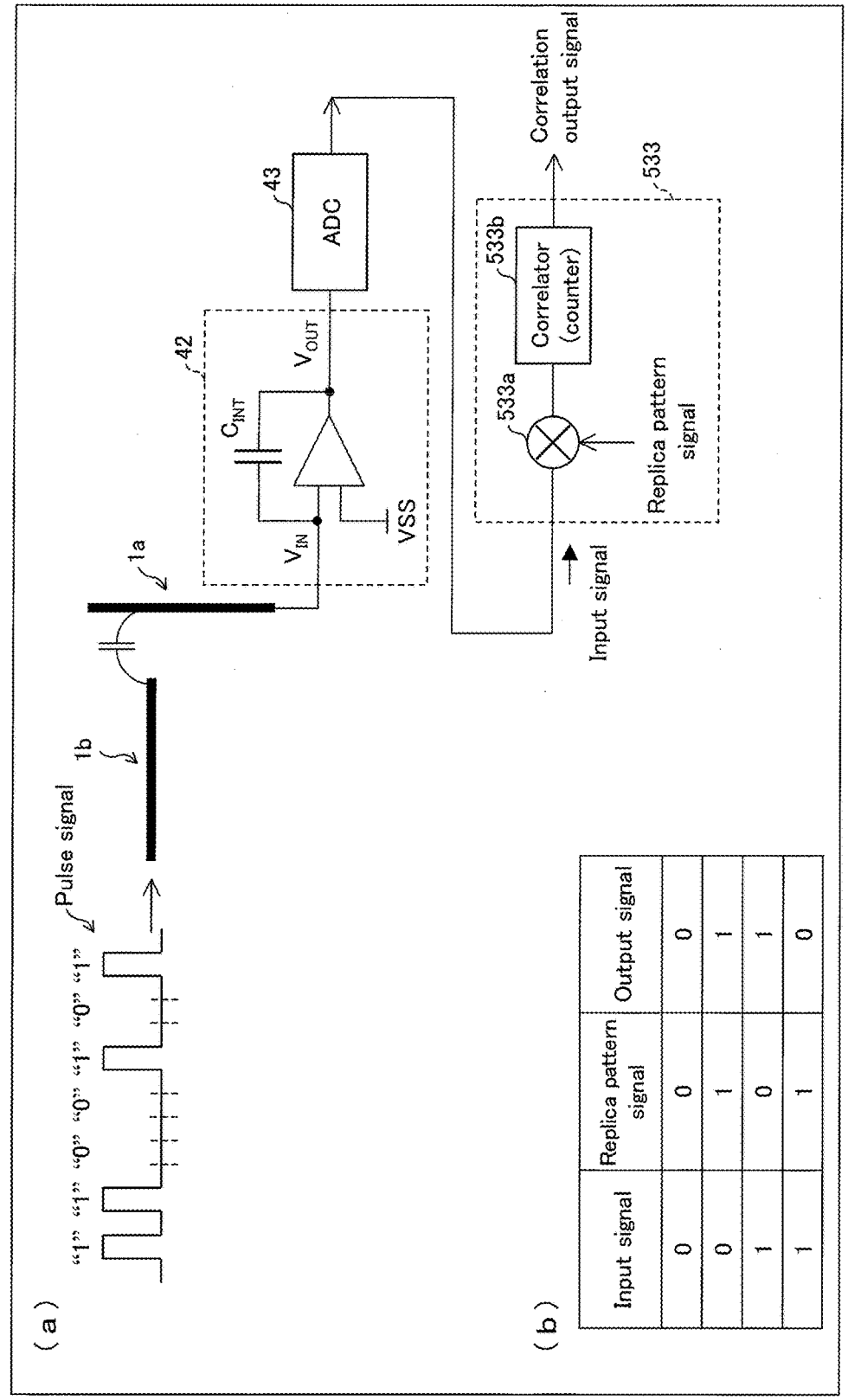

(a) of FIG. 25 is a diagram illustrating an equivalent circuit of a synchronization adjustment circuit, and (b) of FIG. 25 is a view illustrating an example input/output table to which an exclusive OR circuit refers.

Figure 26:
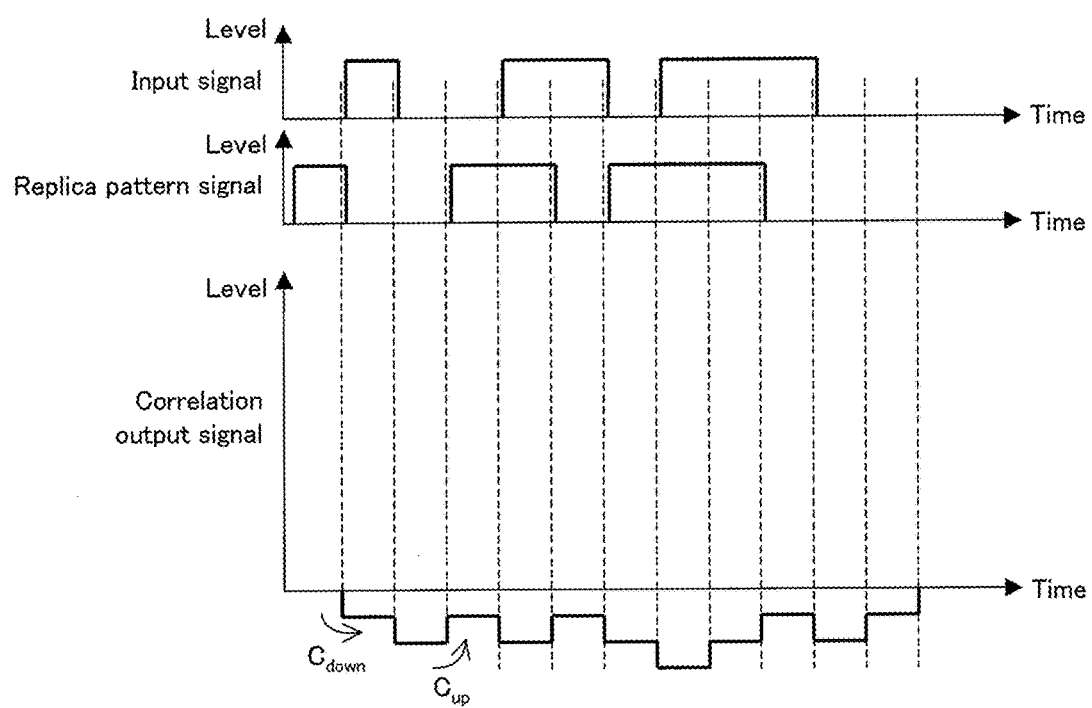

FIG. 26 is a chart illustrating an input signal, a replica pattern signal, and a correlation output signal generated by a correlator.

Figure 27:
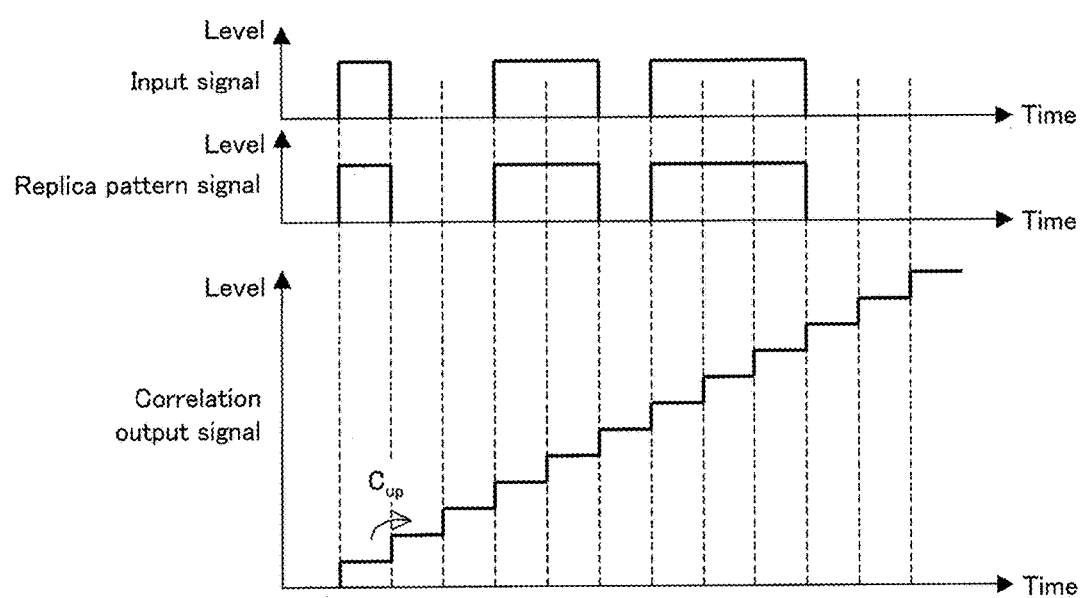

FIG. 27 is a chart illustrating an input signal, a replica pattern signal, and a correlation output signal generated by a correlator.

Figure 28:
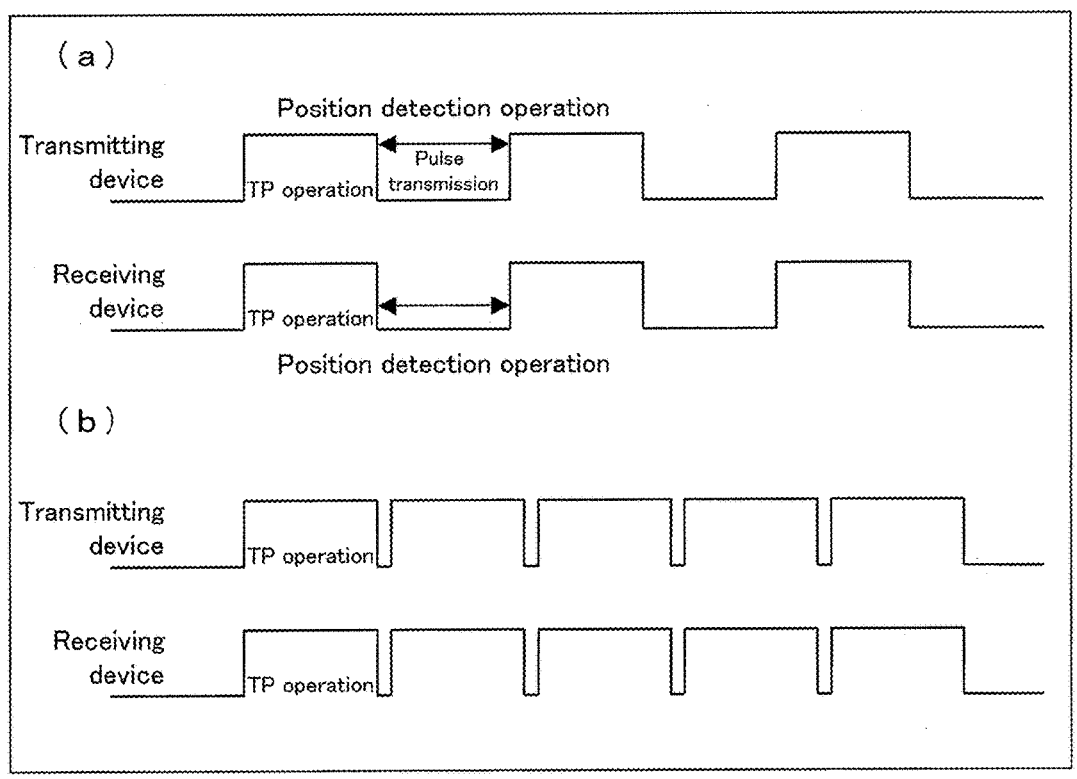

(a) and (b) of FIG. 28 are timing charts illustrating timings of a touch panel operation and a position detection operation.

Figure 29:
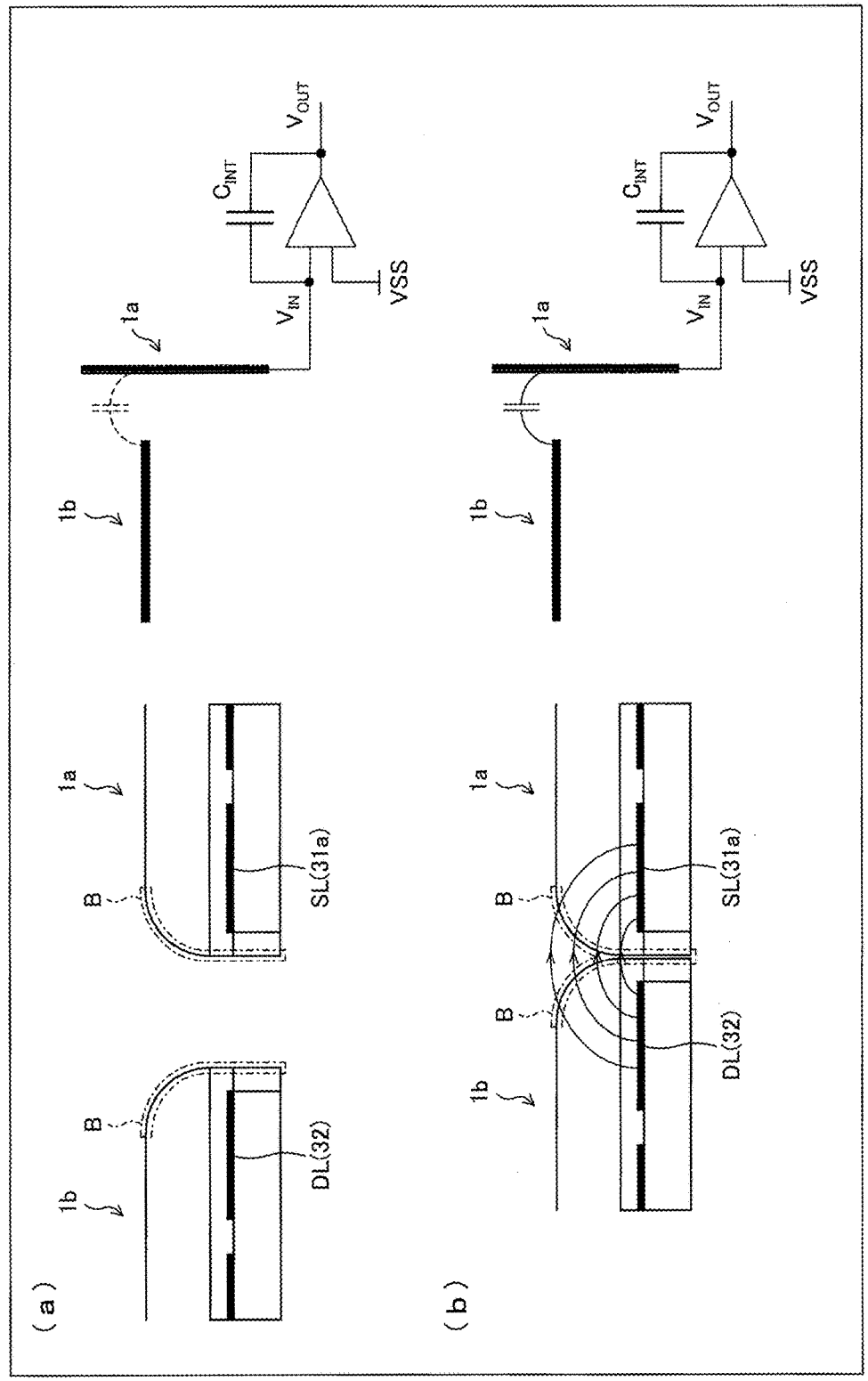

(a) of FIG. 29 is a view (i) schematically illustrating two display devices (transmitting device and receiving device) not being adjacent to each other and (ii) illustrating an equivalent circuit, and (b) of FIG. 29 is a view (i) schematically illustrating the two display devices being adjacent to each other and (ii) illustrating an equivalent circuit.

Figure 30:
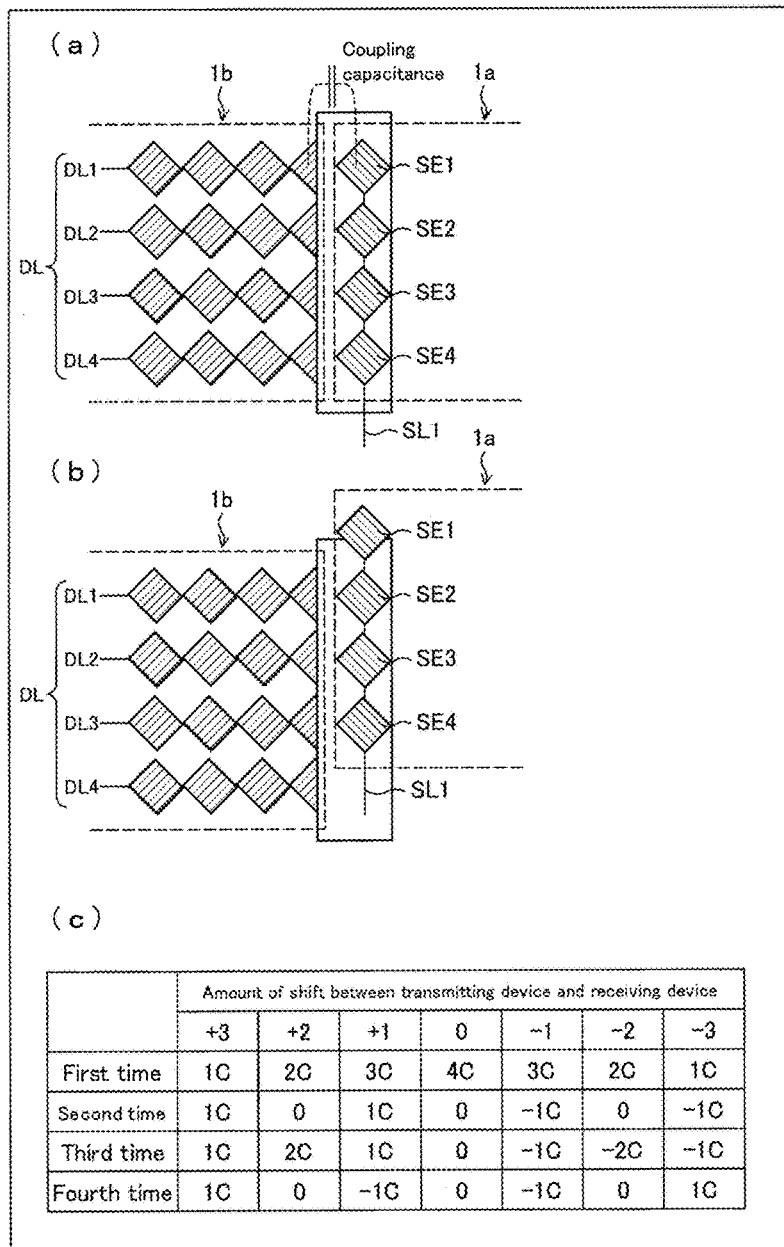

(a) and (b) of FIG. 30 are each a view illustrating a positional relation between the transmitting device and the receiving device. (c) of FIG. 30 is a view illustrating an example position detection table.

Figure 31:
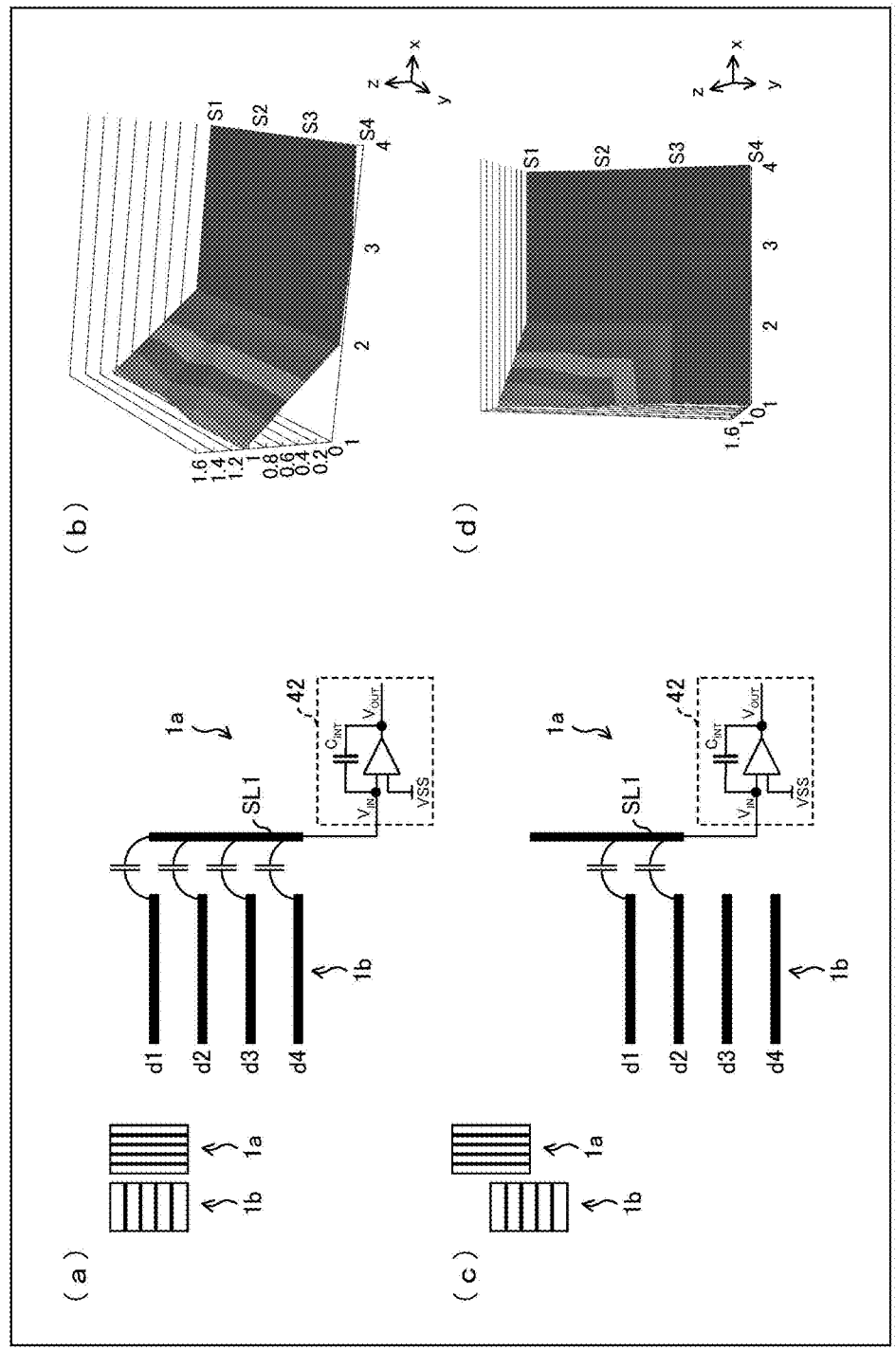

(a) and (c) of FIG. 31 are each a view schematically illustrating an equivalent circuit during the position detection, and (b) and (d) of FIG. 31 are views illustrating signal distributions corresponding to (a) and (c) of FIG. 31, respectively.

Figure 32:
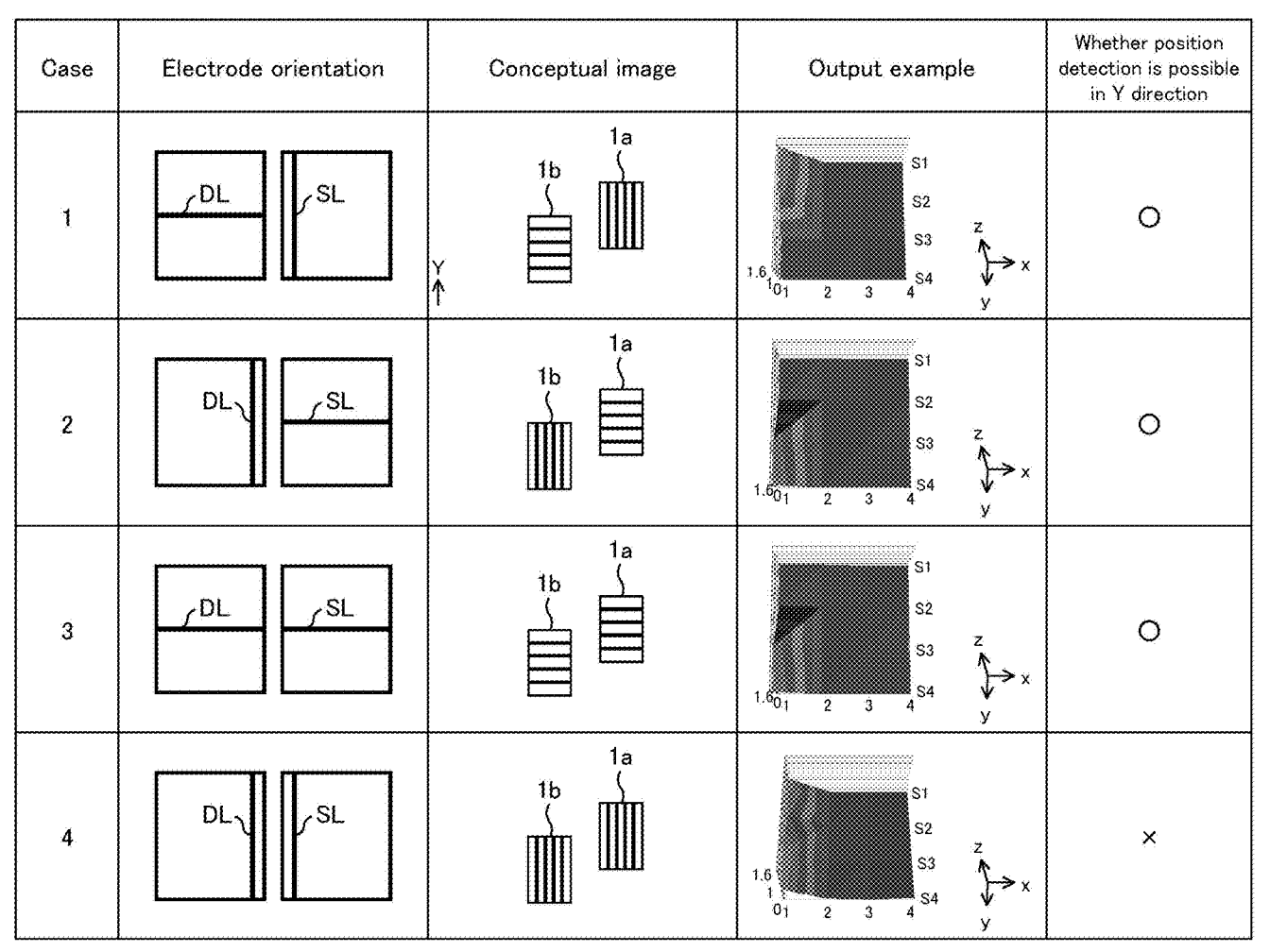

FIG. 32 is a view illustrating each of relationships between (i) electrode arrangement of the transmitting device and of the receiving device and (ii) a signal distribution obtained when contact of the transmitting device or approach thereof is detected.

Figure 33:
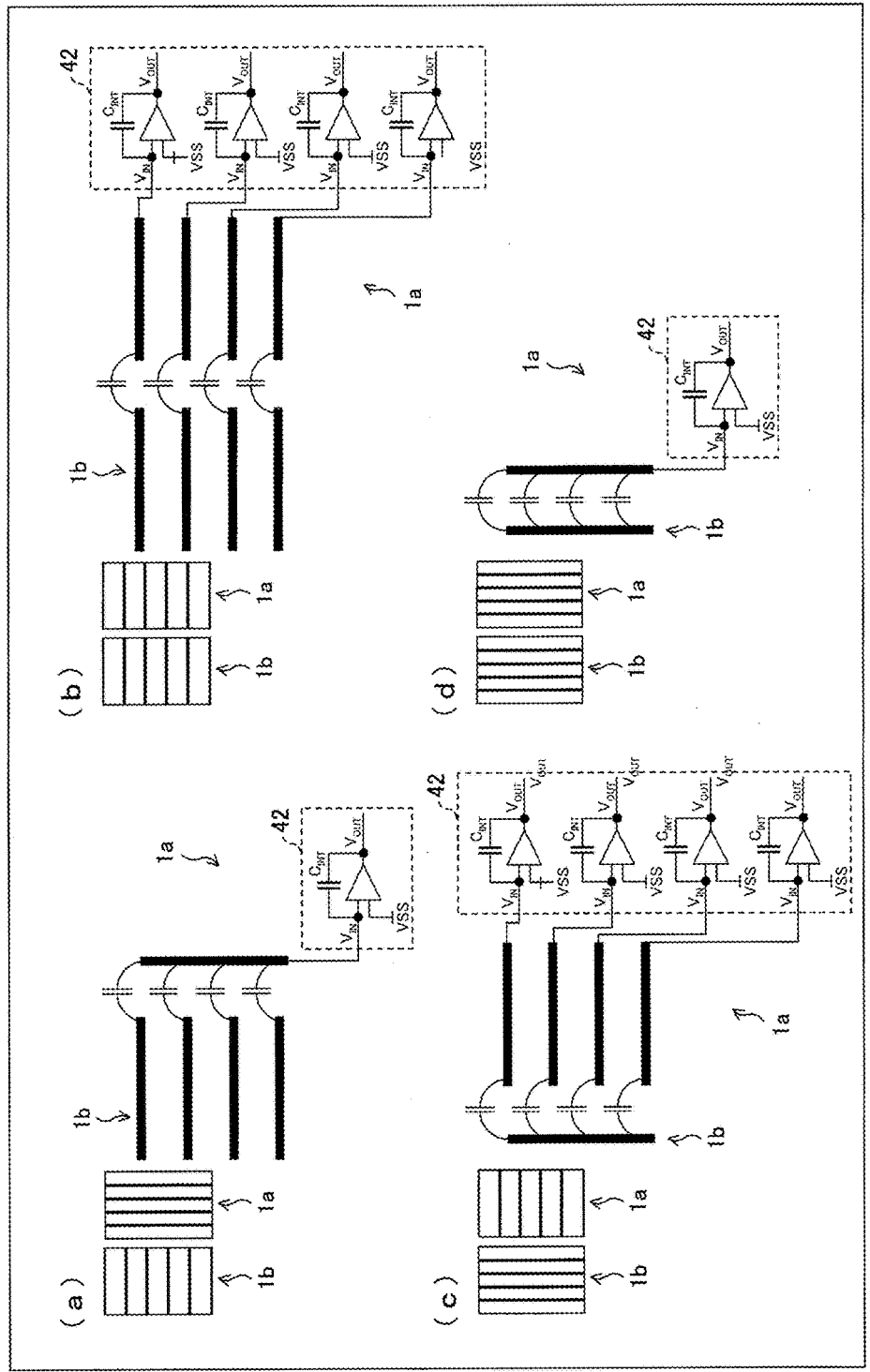

(a) through (d) of FIG. 33 illustrate equivalent circuits corresponding to cases 1 to 4 illustrated in FIG. 32, respectively, when contact of the transmitting device or approach thereof is detected.

FIG. 34 is a view illustrating each of relationships between (i) electrode arrangement of the transmitting device and of the receiving device and (ii) a signal distribution obtained when contact of the transmitting device or approach thereof is detected.

Figure 35:
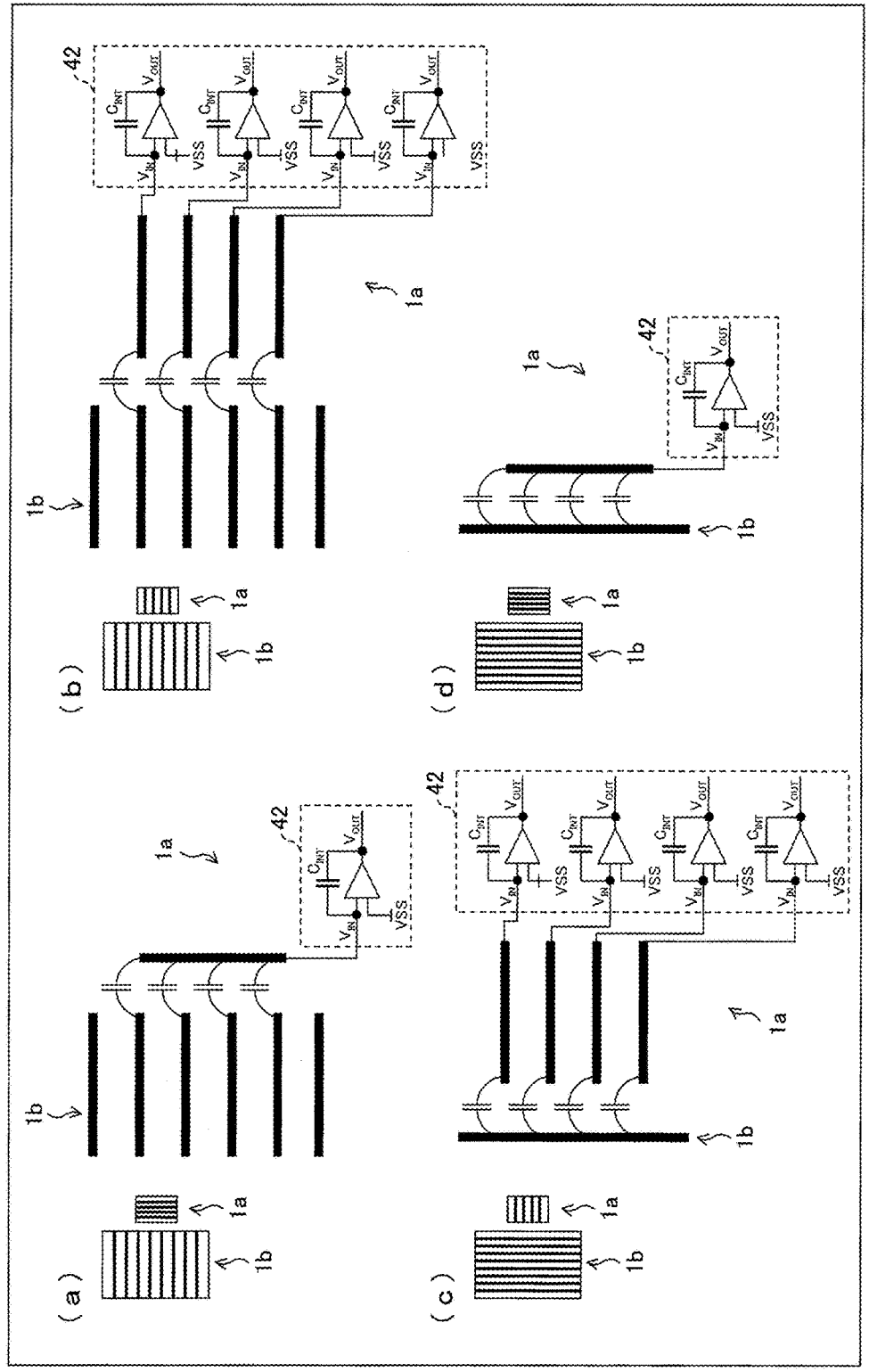

(a) through (d) of FIG. 35 illustrate example equivalent circuits corresponding to cases 1 to 4 illustrated in FIG. 34, respectively, when contact of the transmitting device or approach thereof is detected.

FIG. 36 is a view illustrating each of relationships between (i) electrode arrangement of the transmitting device and of the receiving device and (ii) a signal distribution obtained when contact of the transmitting device or approach thereof is detected.

Figure 37:
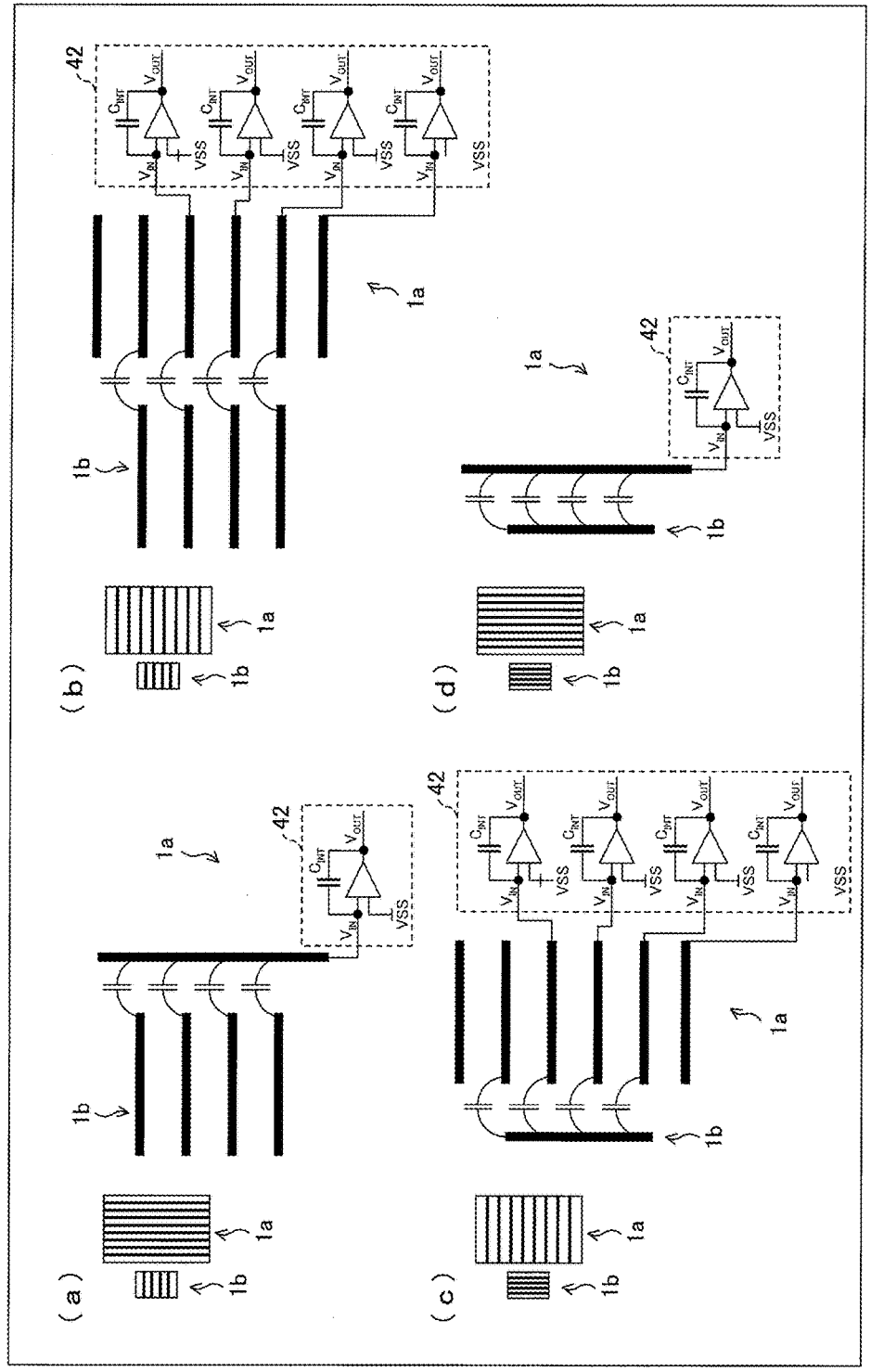

(a) through (d) of FIG. 37 illustrate example equivalent circuits corresponding to the cases 1 to 4 illustrated in FIG. 36, respectively, when contact of the transmitting device or approach thereof is detected.

Figure 13:
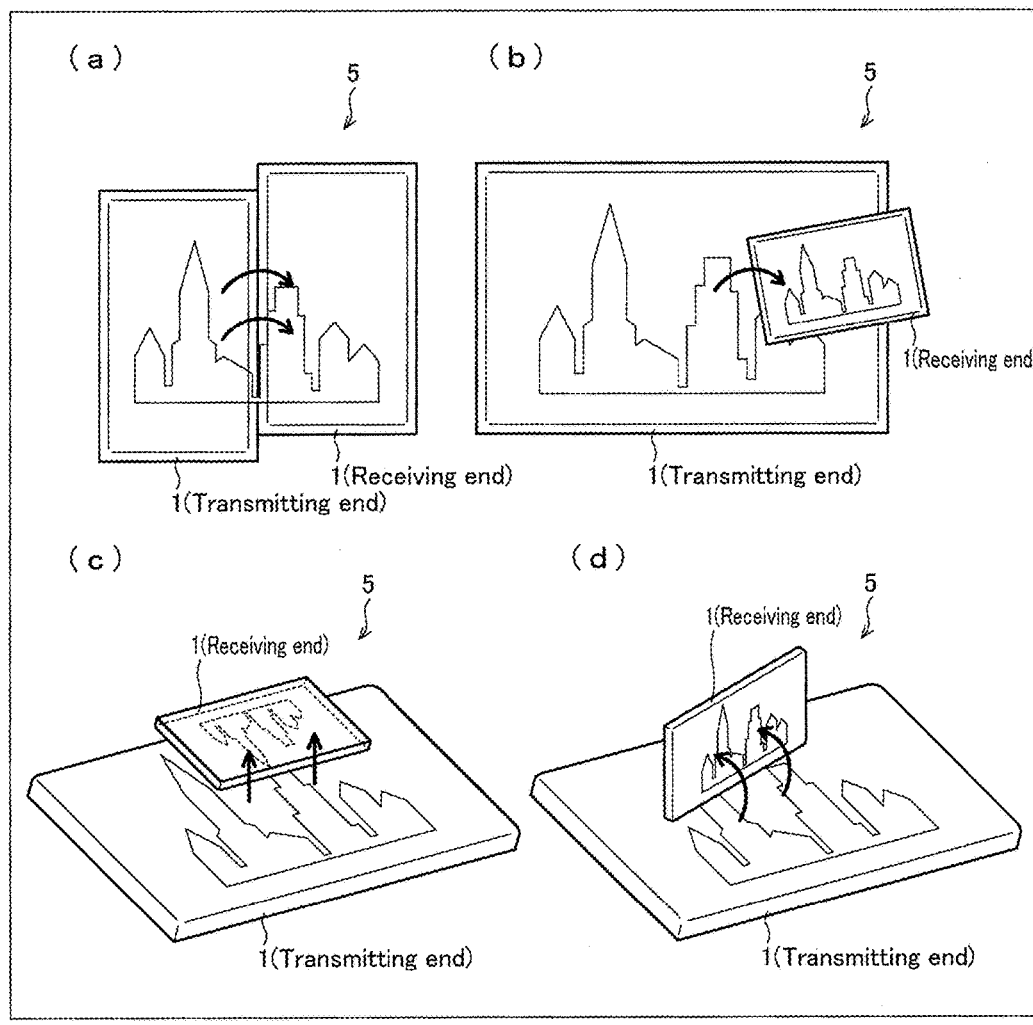
FIG. 13 is a view illustrating an example information processing system including the display devices, where (a) to (d) of FIG. 13 each illustrate an example positional relation between the display devices.
Figure 38:
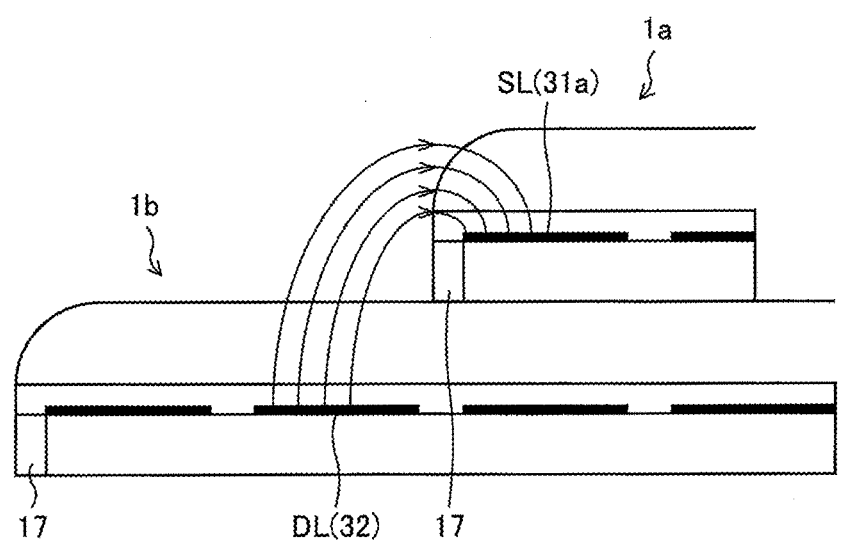

FIG. 38 is a cross-sectional view schematically illustrating the transmitting device and the receiving device in the state illustrated in (b) of FIG. 13.

Figure 39:
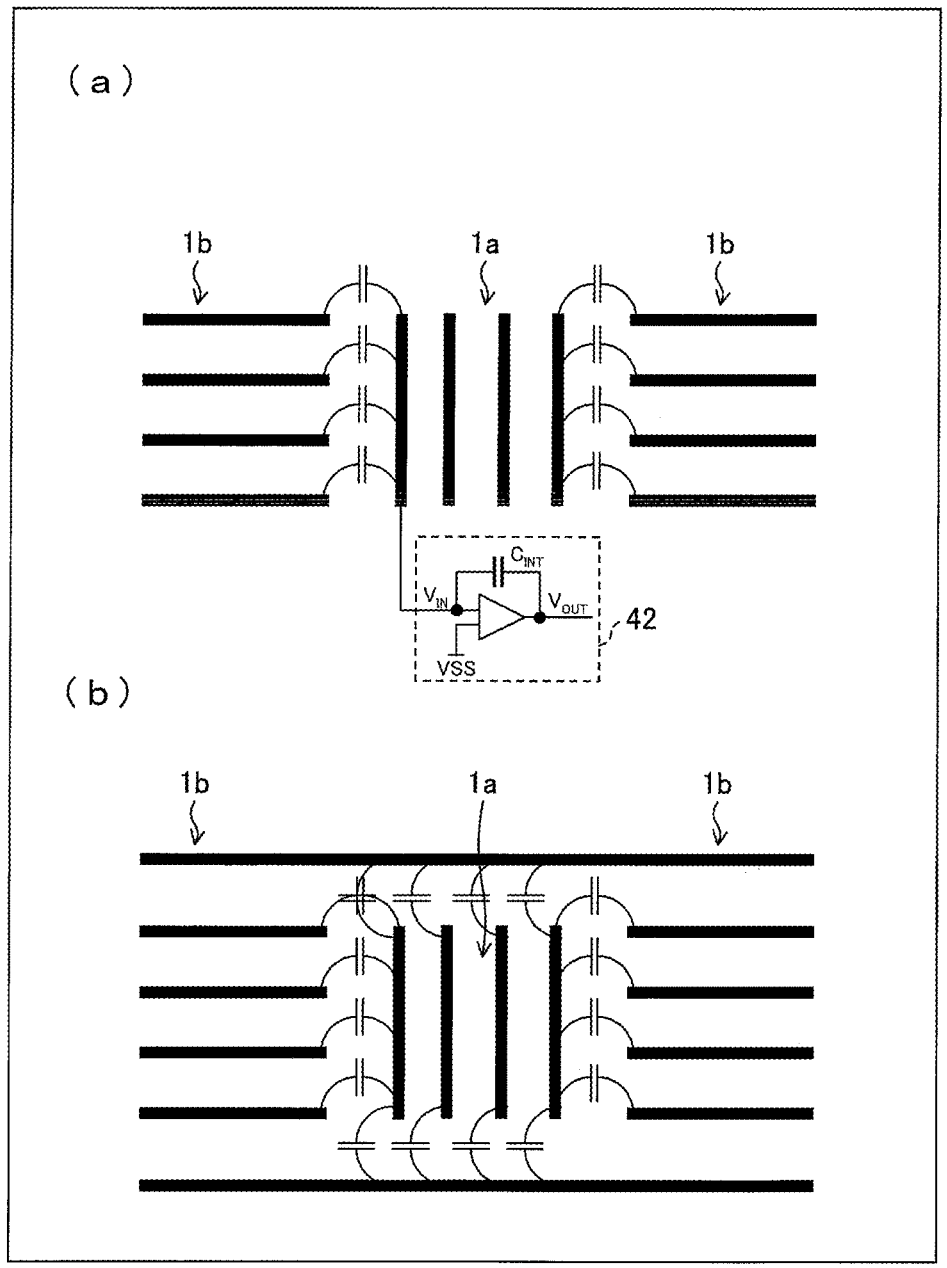

(a) and (b) of FIG. 39 are views illustrating equivalent circuits in cases where the receiving device comes into contact with or approaches the transmitting device so as to be placed on or over the transmitting device.

Figure 40:
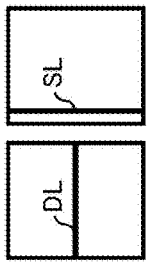

FIG. 40 is a view illustrating each of relationships between (i) electrode arrangement of the transmitting device and of the receiving device and (ii) a signal distribution obtained when contact of the transmitting device or approach thereof is detected.

Figure 41:
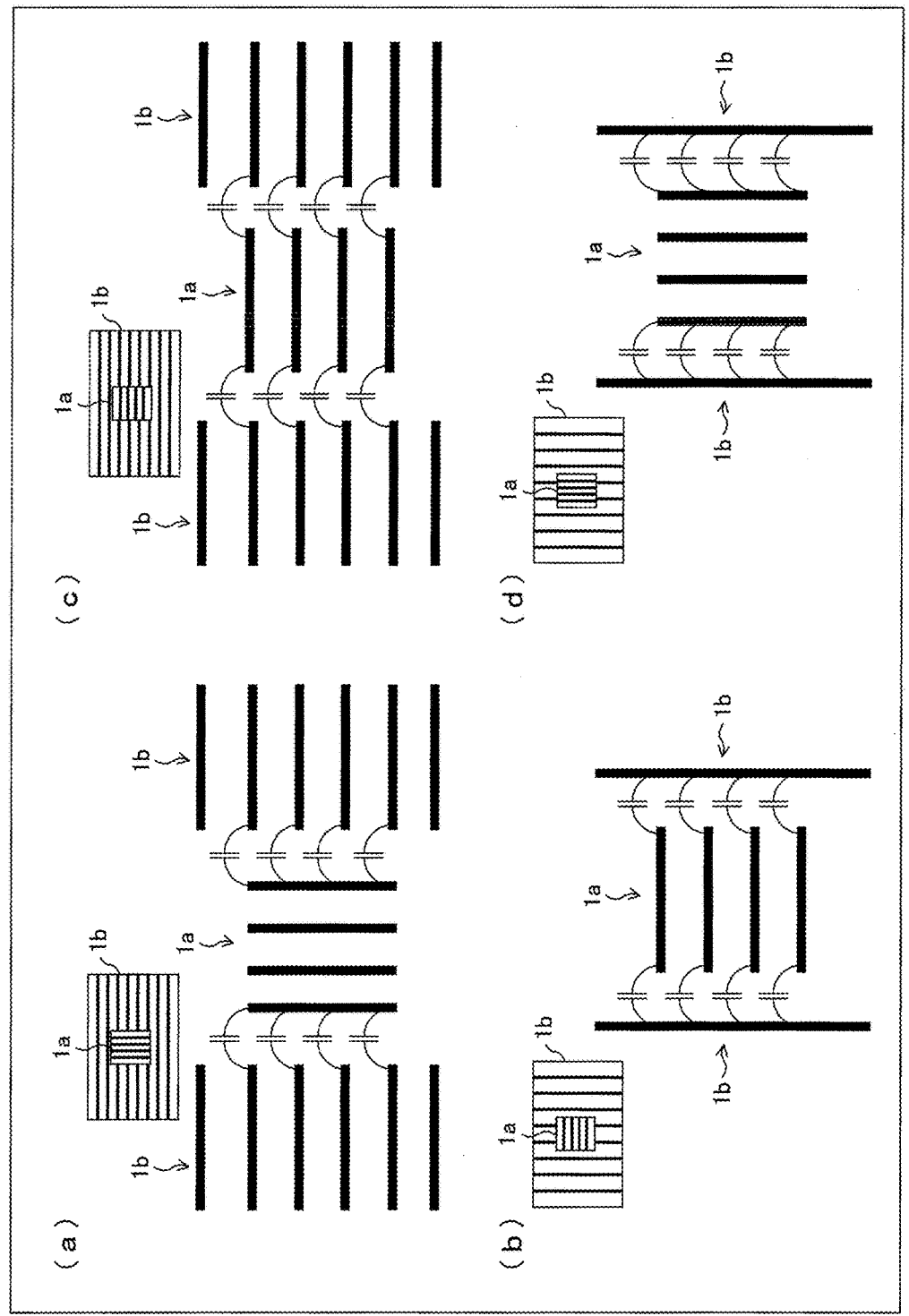

(a) through (d) of FIG. 41 illustrate example equivalent circuits corresponding to the cases 1 to 4 illustrated in FIG. 40, respectively, when the contact of the transmitting device or approach thereof is detected.

FIG. 42 is a view illustrating each of relationships between (i) electrode arrangement of the transmitting device and of the receiving device and (ii) a signal distribution obtained when contact of the transmitting device or approach thereof is detected.

Figure 43:
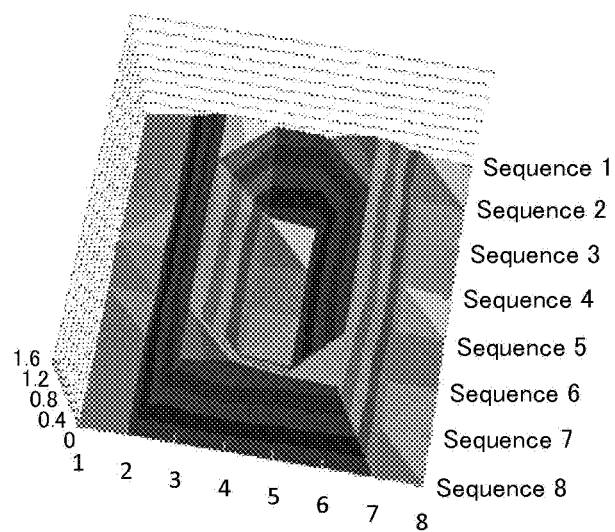

FIG. 43 is a view illustrating an example signal distribution obtained at the position detection.

Figure 44:
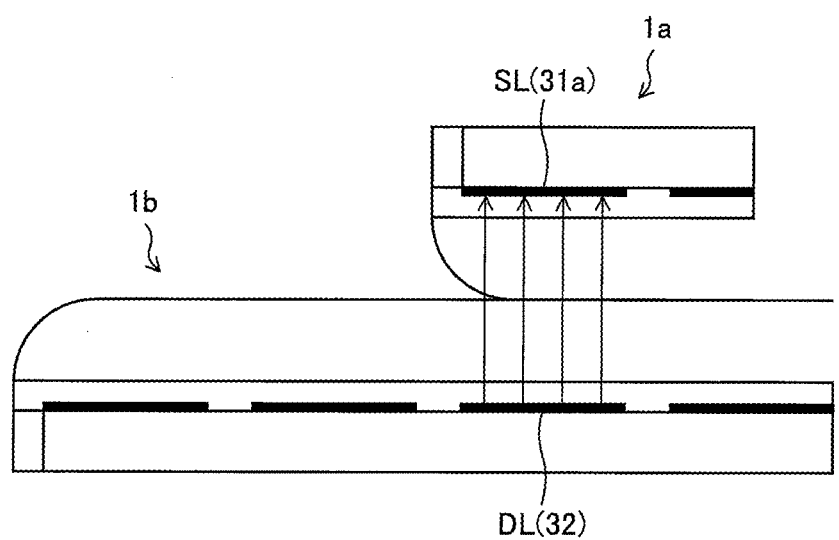

FIG. 44 is a cross-sectional view schematically illustrating the transmitting device and the receiving device in the state illustrated in (c) of FIG. 13.

Figure 45:
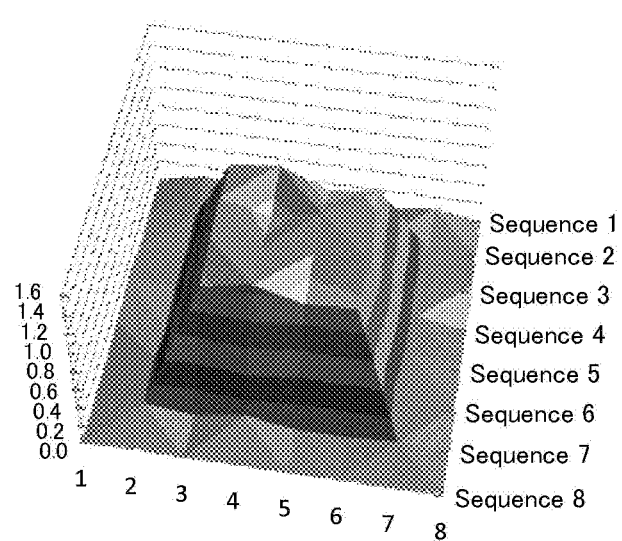

FIG. 45 is a view illustrating an example signal distribution obtained at the position detection.

Figure 46:
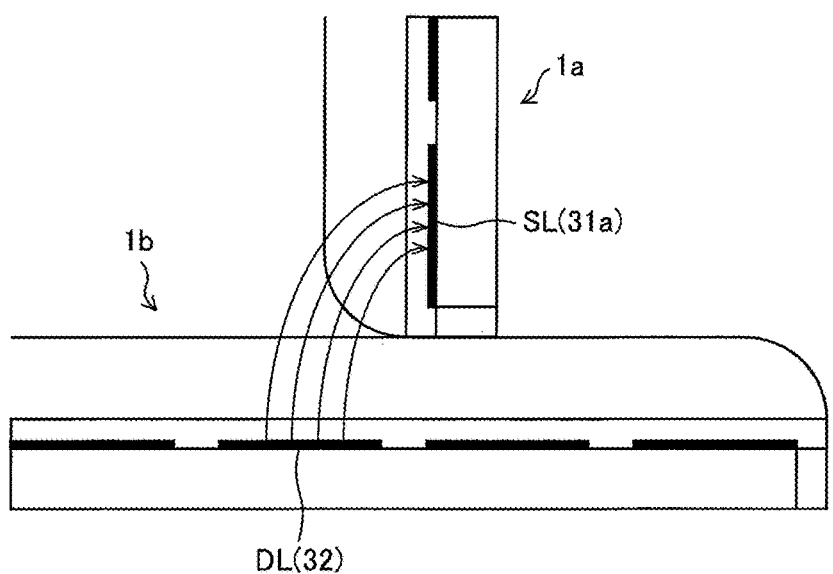

FIG. 46 is a cross-sectional view schematically illustrating the transmitting device and the receiving device in the state illustrated in (d) of FIG. 13.

Figure 47:
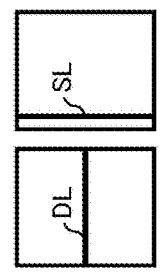

FIG. 47 is a view illustrating each of relationships between (i) electrode arrangement of the transmitting device and of the receiving device and (ii) a signal distribution obtained when contact of the transmitting device or approach thereof is detected.

FIG. 48 is a view illustrating each of relationships between (i) electrode arrangement of the transmitting device and of the receiving device and (ii) a signal distribution obtained when contact of the transmitting device or approach thereof is detected.

Figure 49:
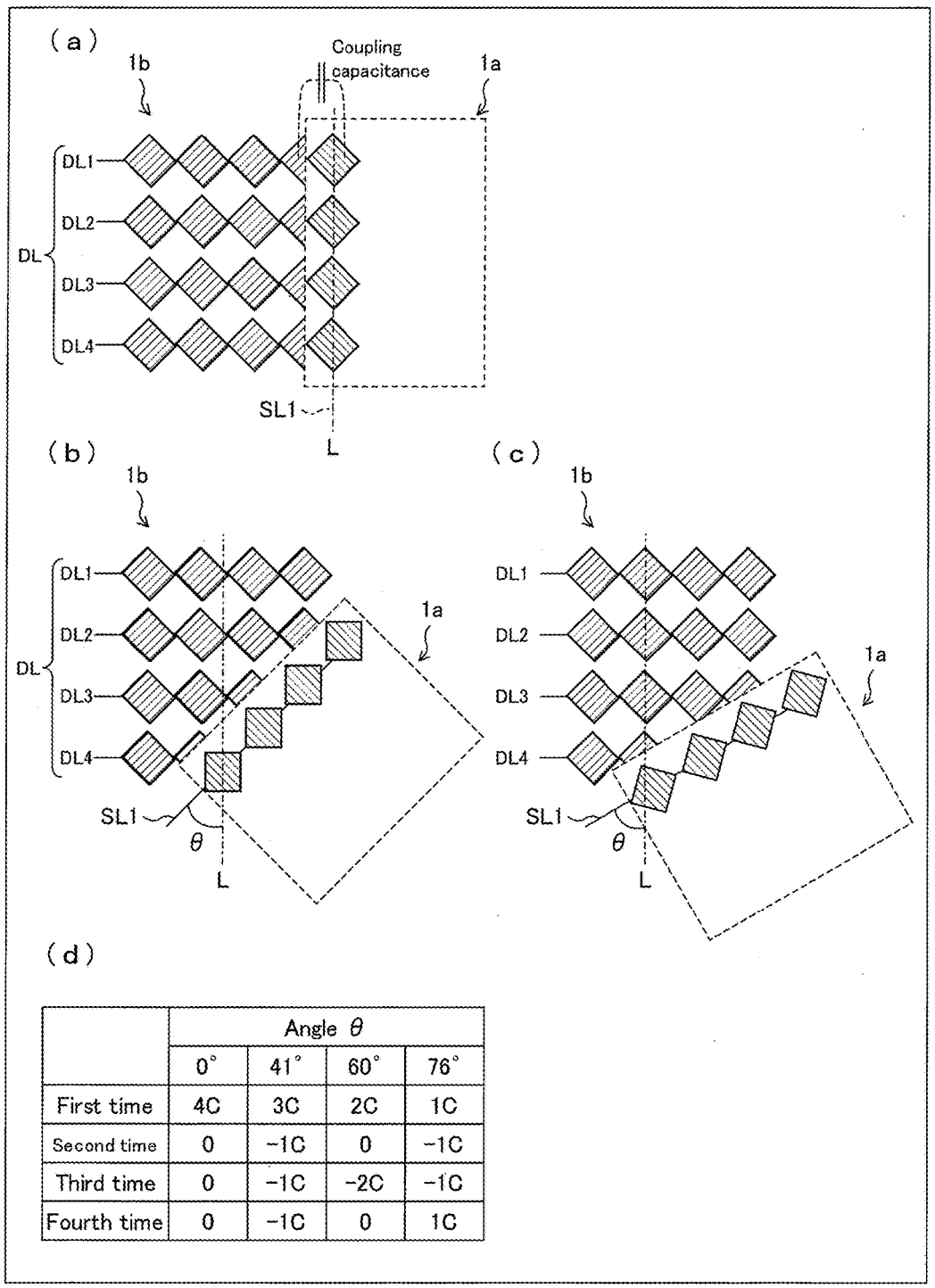

(a) through (c) of FIG. 49 are each a view illustrating a positional relation between the transmitting device and the receiving device, and (d) of FIG. 49 is a view illustrating an example tilt detection table.

Figure 50:
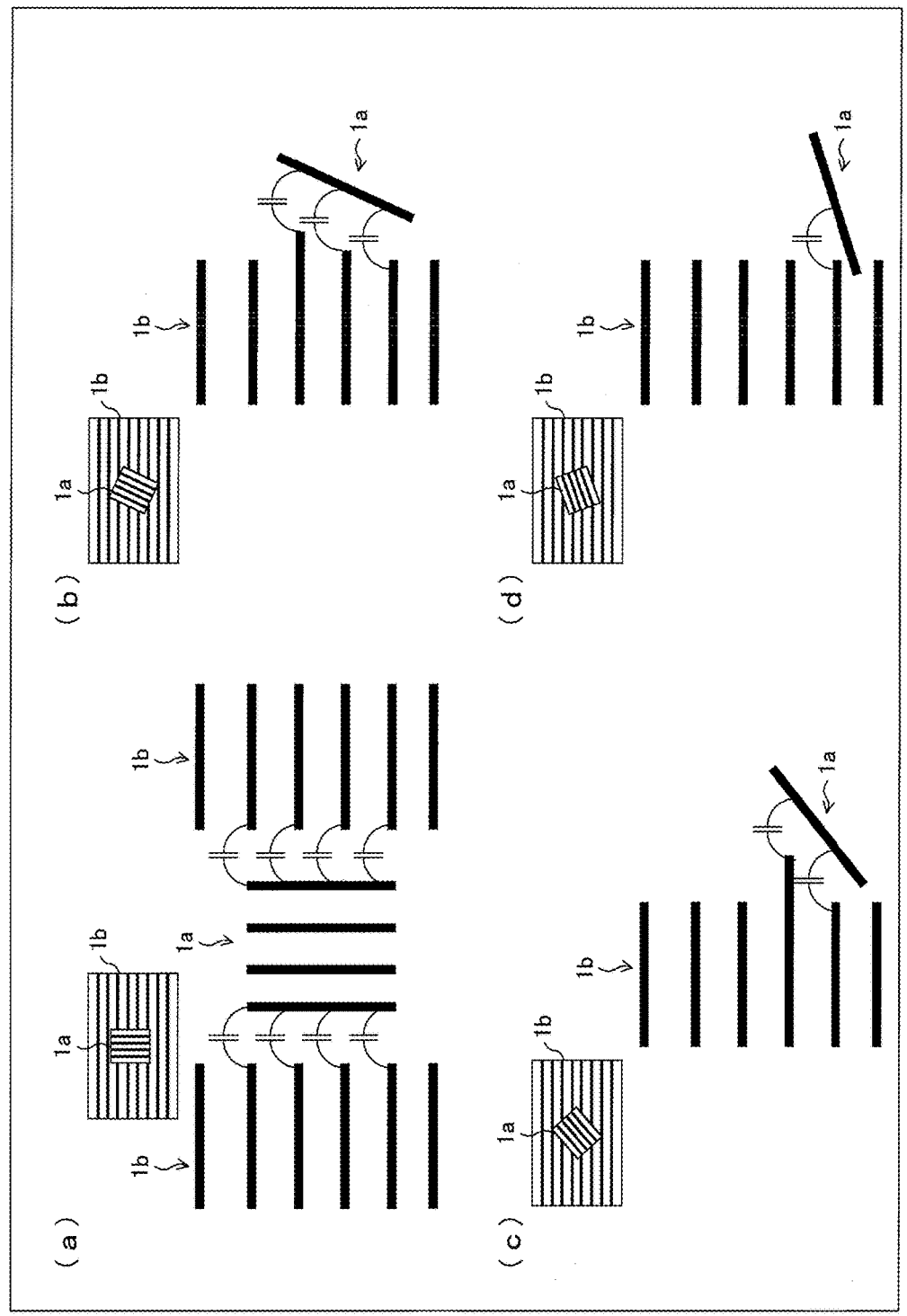

(a) through (d) of FIG. 50 are views illustrating example equivalent circuits that correspond to respective angels shown in (d) of FIG. 49.

Figure 51:
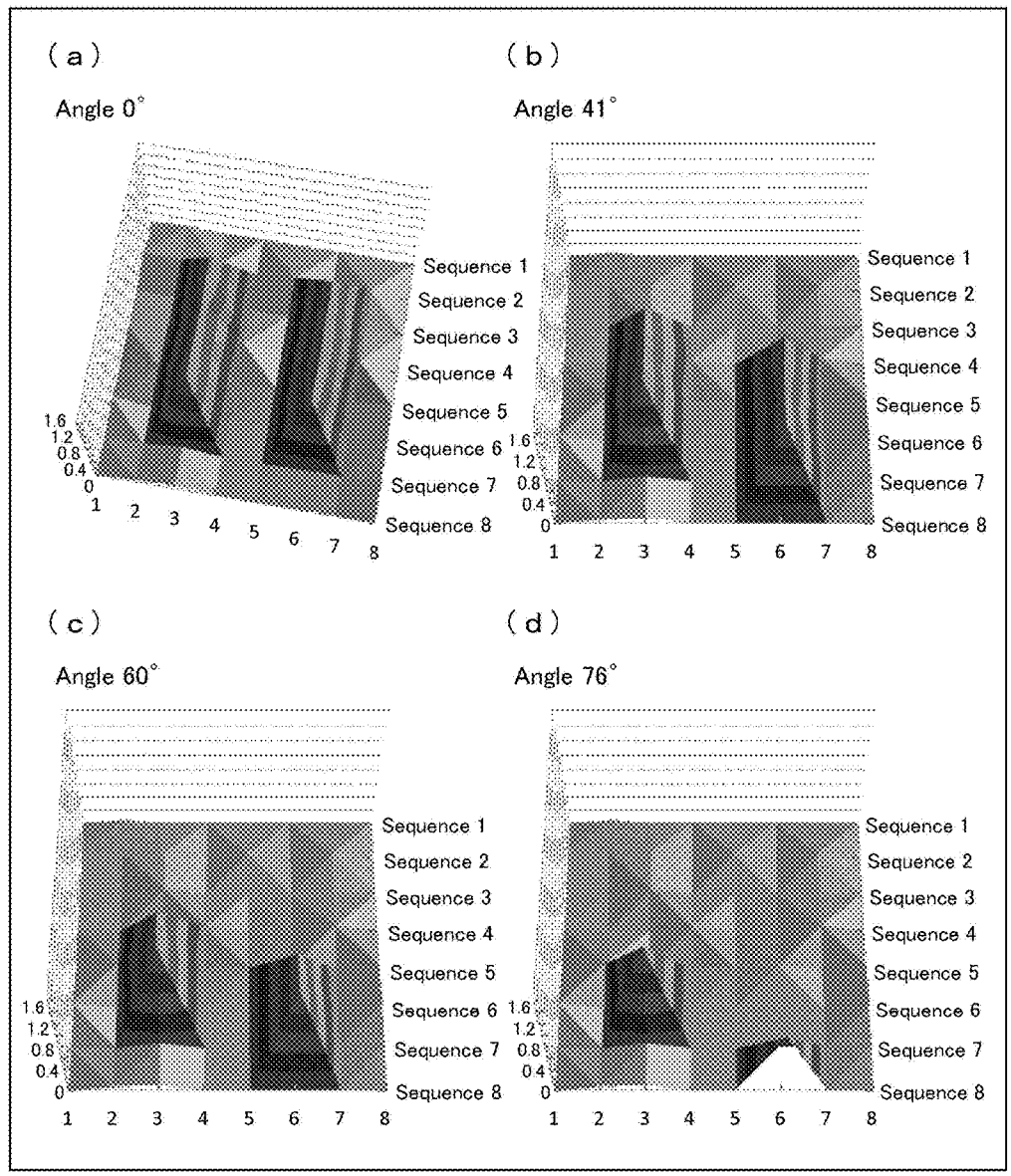

(a) through (d) of FIG. 51 are views illustrating example signal distributions corresponding to the respective angles shown in (d) of FIG. 49.

Figure 52:
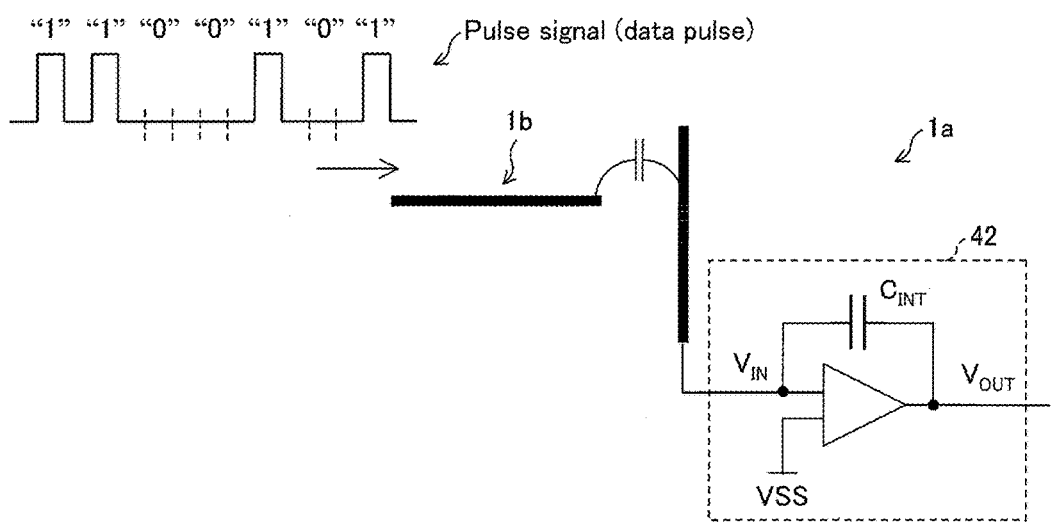

FIG. 52 is a view illustrating an equivalent circuit showing data communications between the touch panels.

Figure 53:
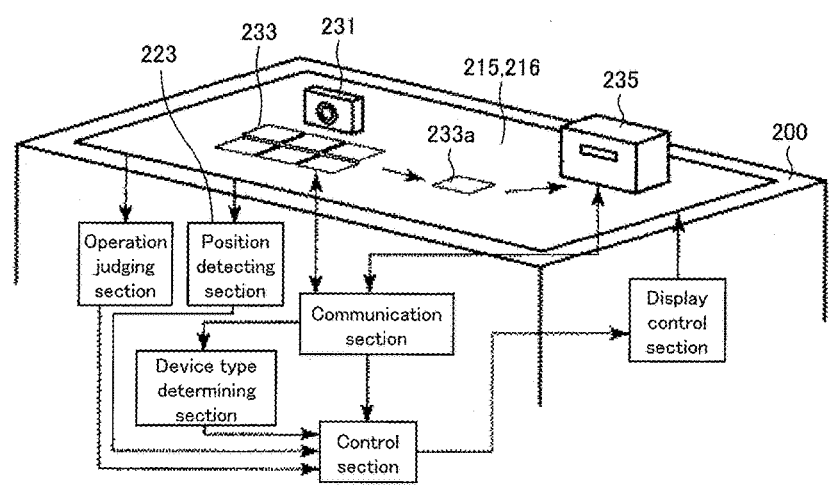

FIG. 53 is a view illustrating an example conventional table-type screen device.

Figure 54:
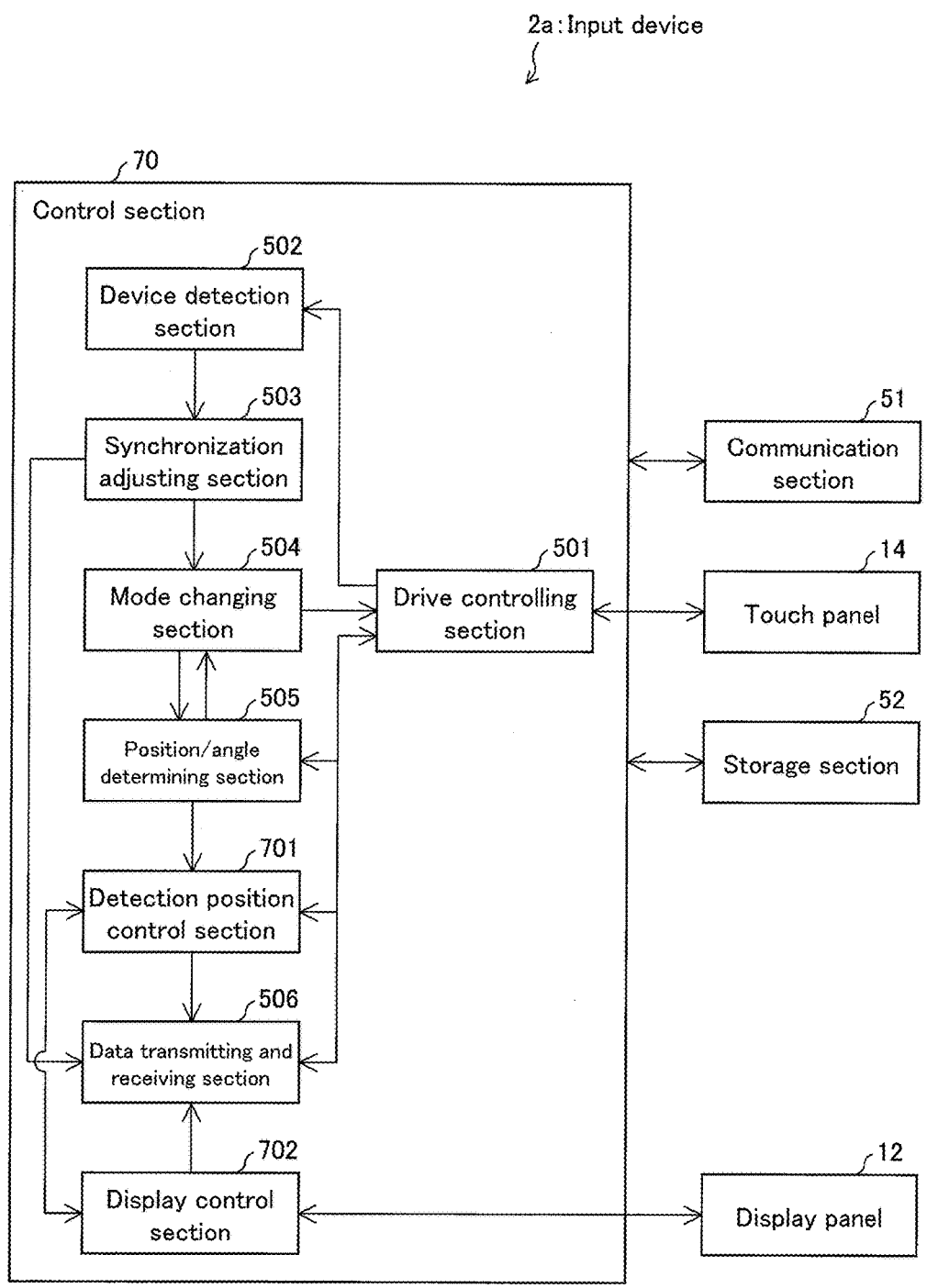

FIG. 54 is a diagram illustrating an example functional block of a control section included in an input device of an embodiment of the present invention.

Figure 55:
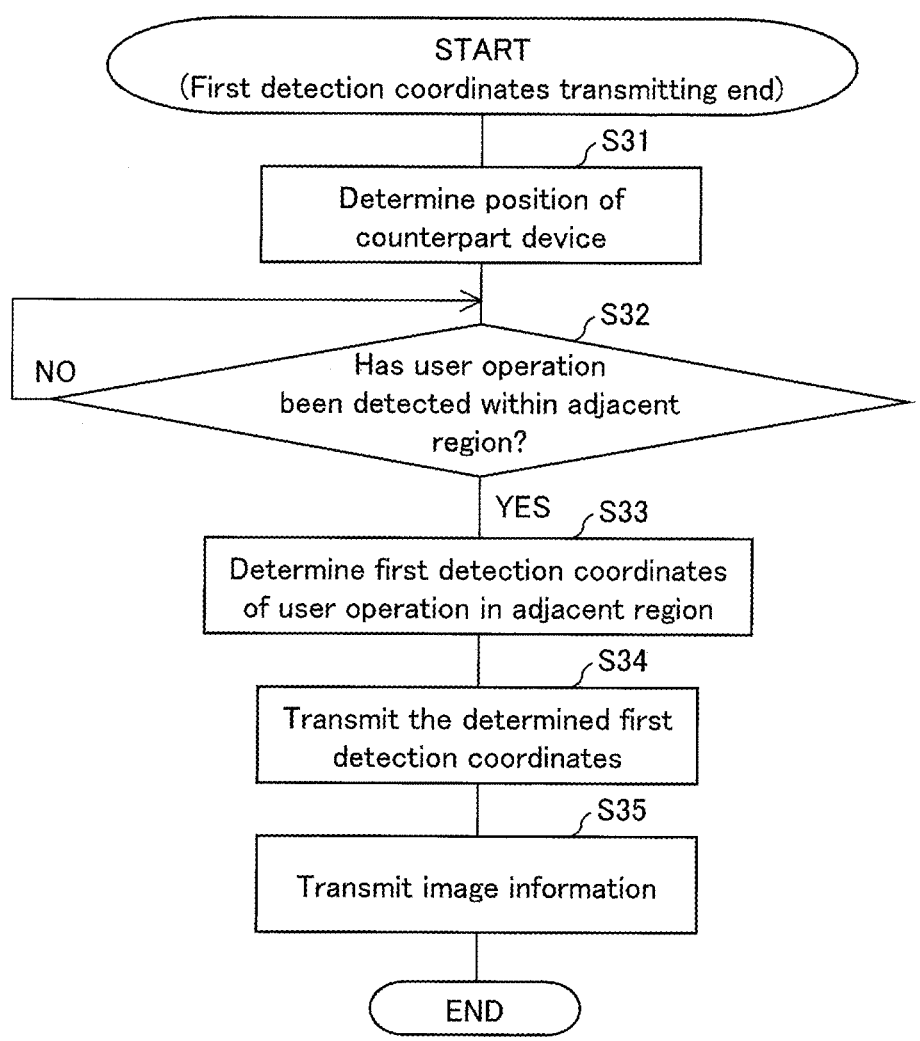

FIG. 55 is a flowchart illustrating the flow of processes performed by the input device.

Figure 56:
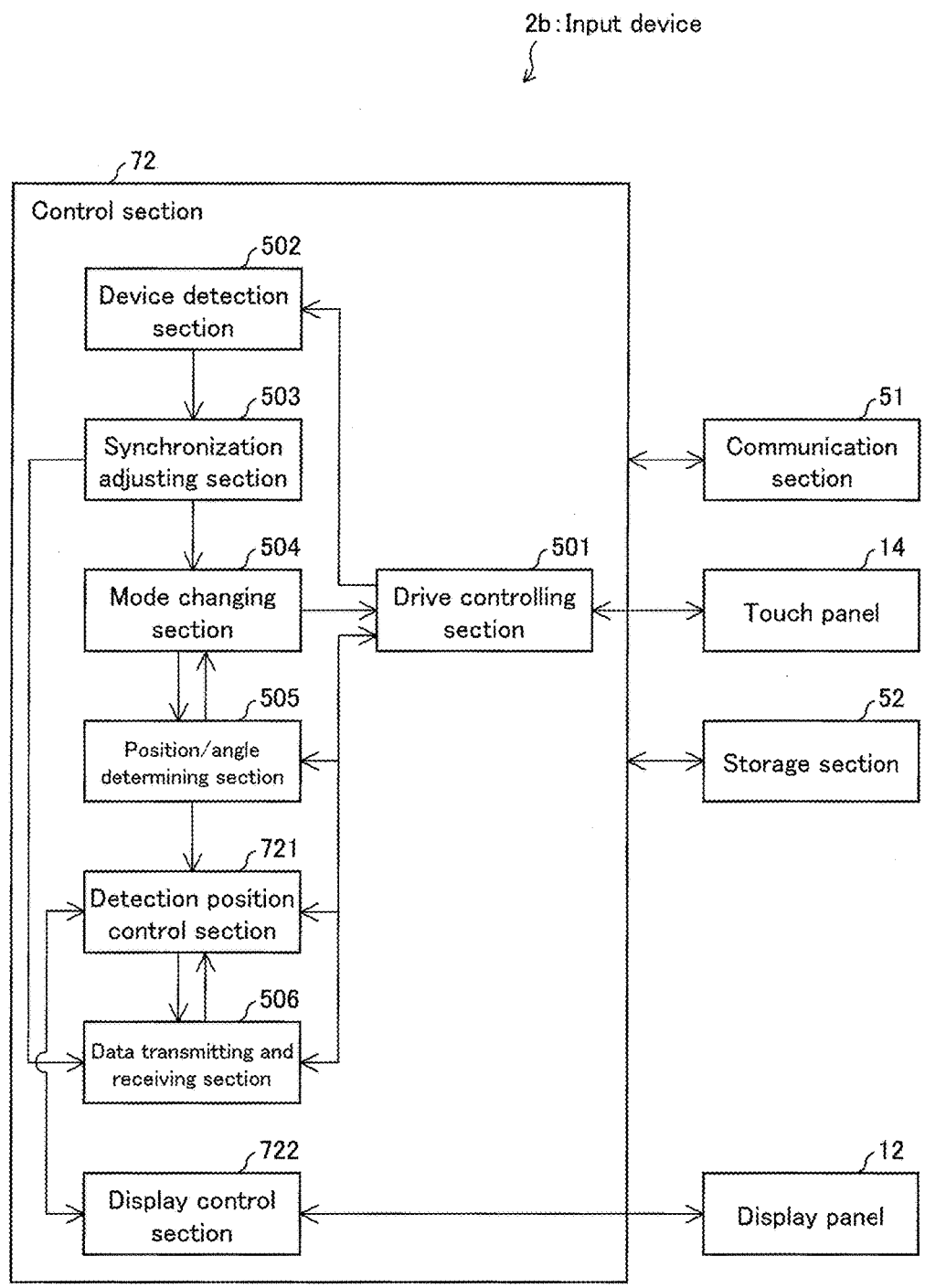

FIG. 56 is a diagram illustrating an example functional block of a control section included in an input device of an embodiment of the present invention.

Figure 57:
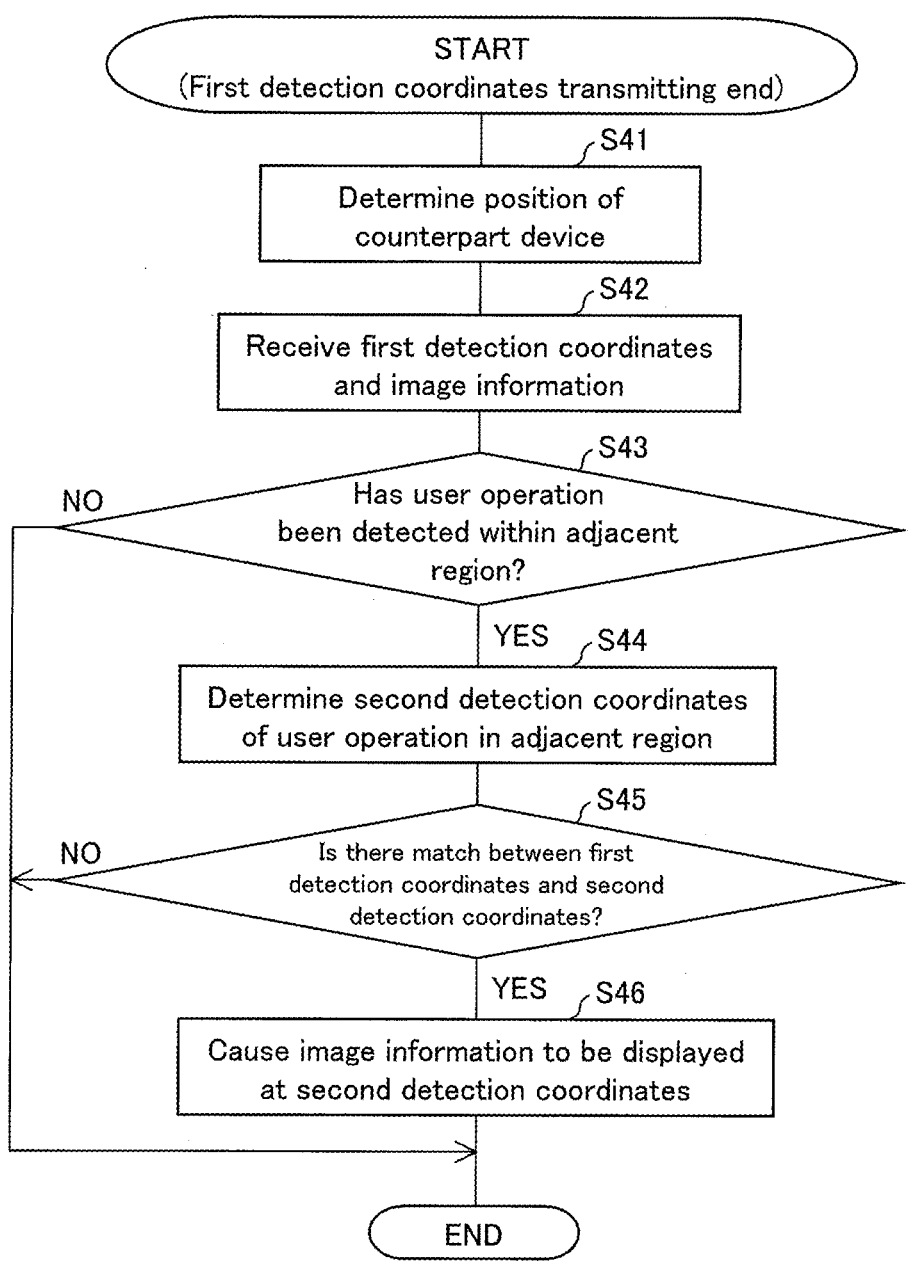

FIG. 57 is a flowchart illustrating the flow of processes performed by the input device.

Figure 58:
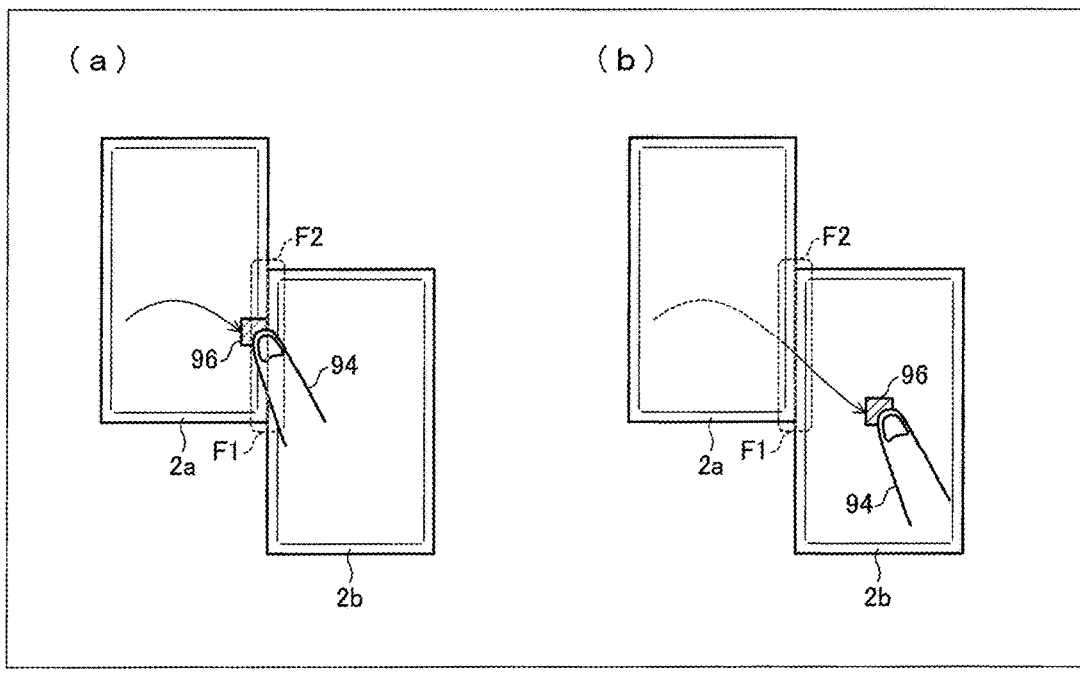

(a) and (b) of FIG. 58 are views illustrating example image transitions.

Figure 59:
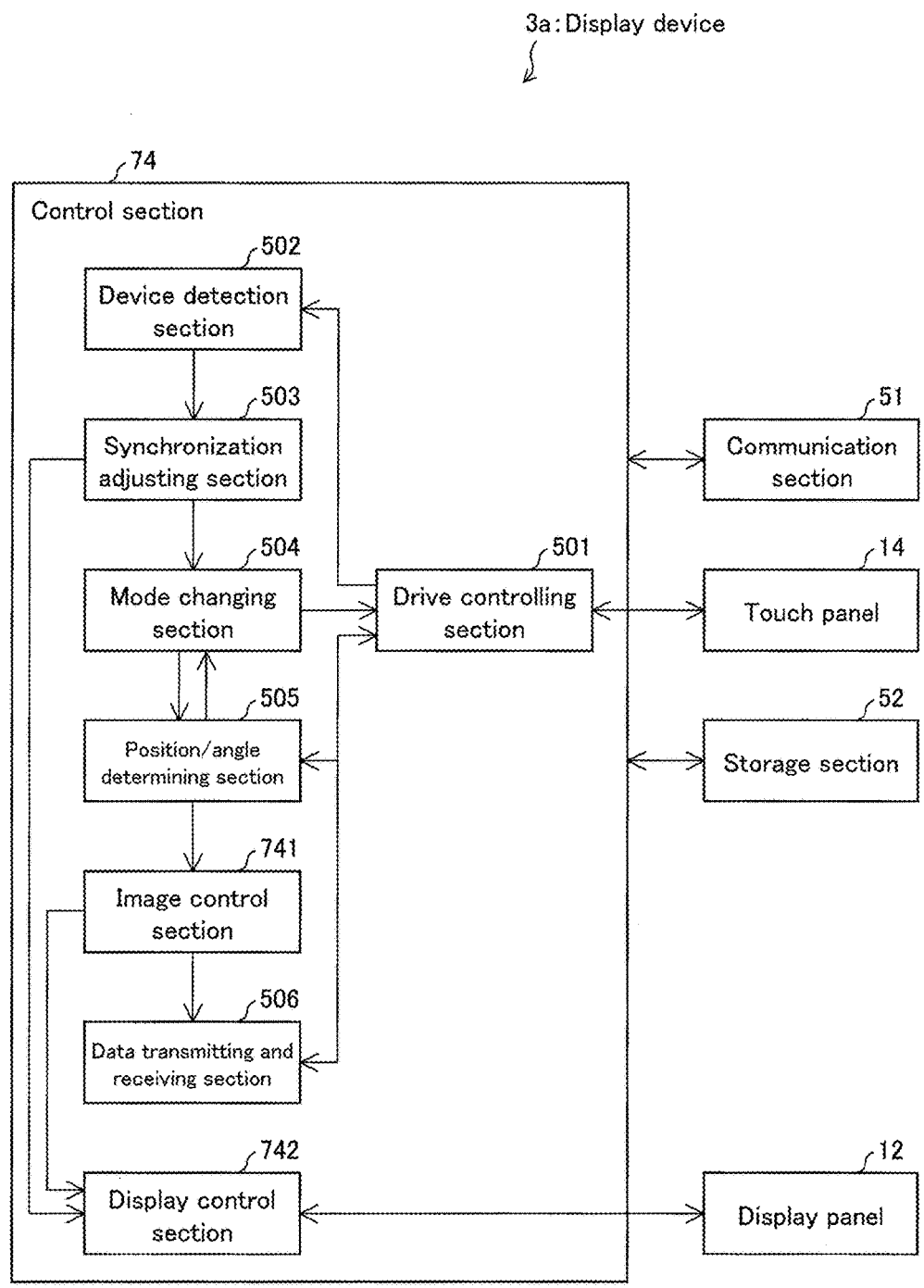

FIG. 59 is a diagram illustrating an example functional block of a control section included in a display device of an embodiment of the present invention.

Figure 60:
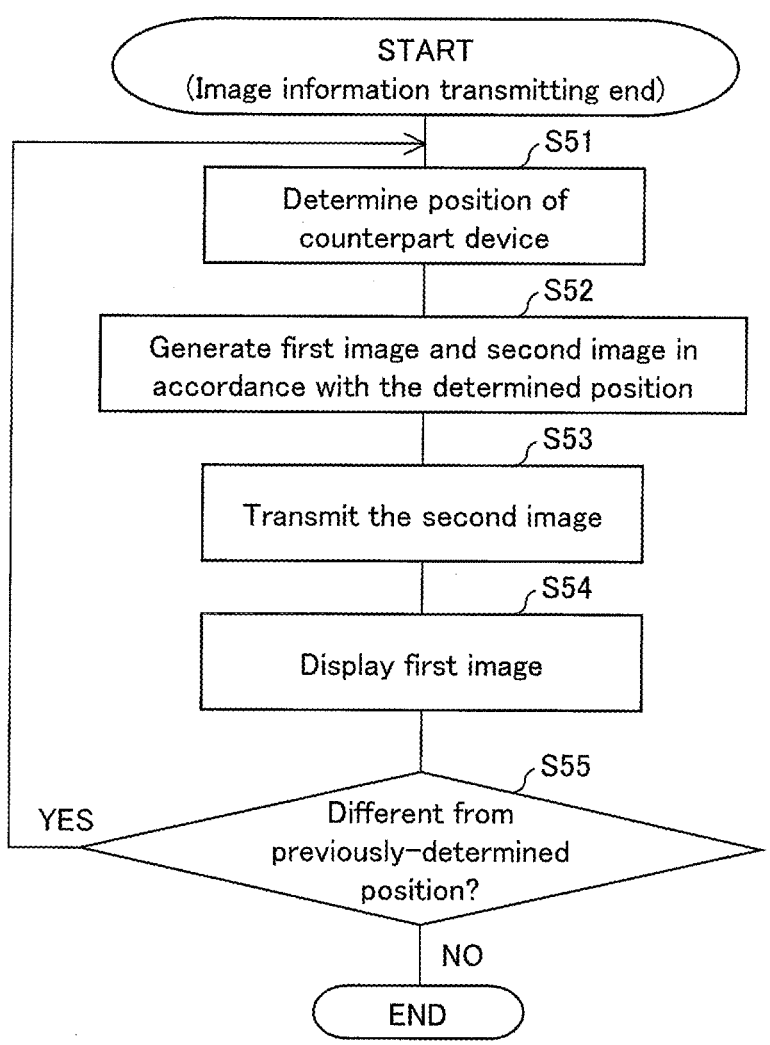

FIG. 60 is a flowchart illustrating the flow of processes performed by the display device.

Figure 61:
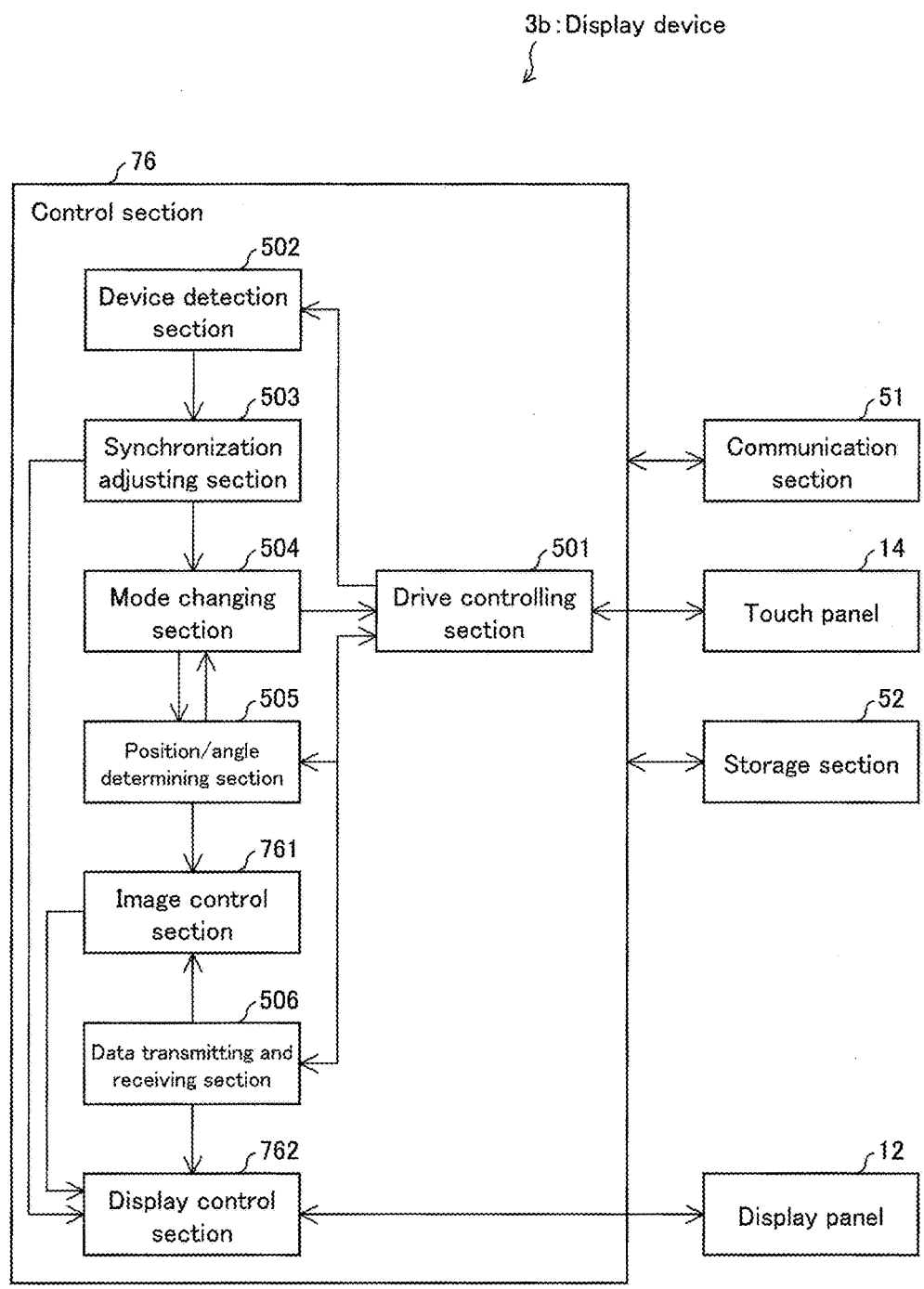

FIG. 61 is a diagram illustrating an example functional block of a control section included in a display device of an embodiment of the present invention.

Figure 62:
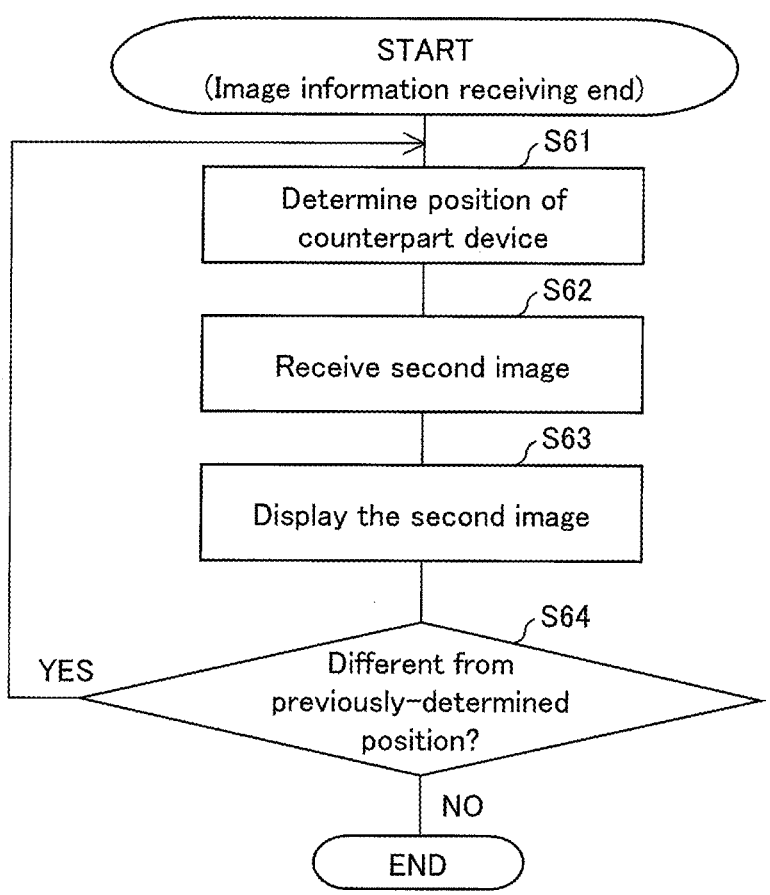

FIG. 62 is a flowchart illustrating the flow of processes performed by the display device.

Figure 63:
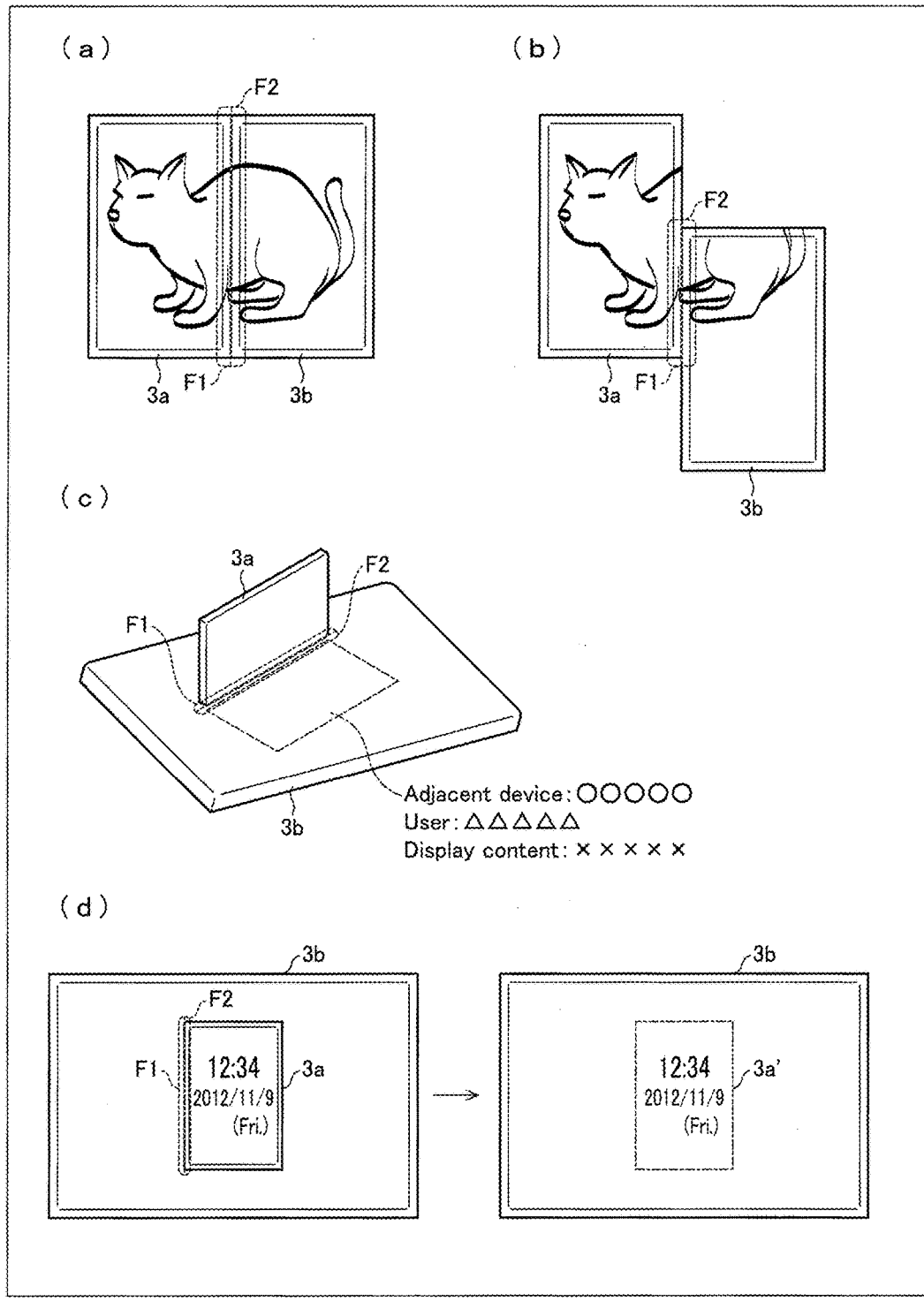

(a) to (d) of FIG. 63 are views illustrating example display images.

Figure 64:
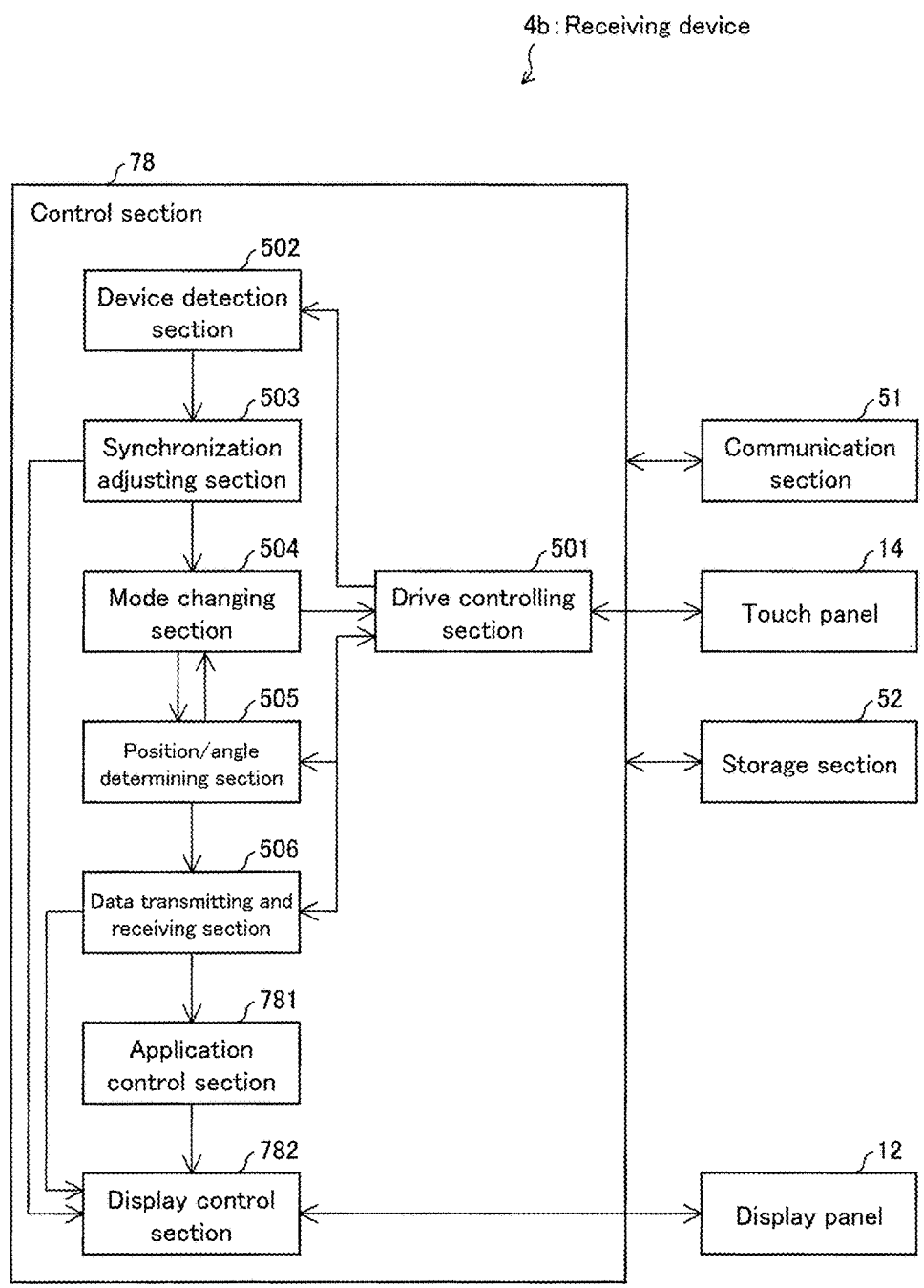

FIG. 64 is a diagram illustrating an example functional block of a control section included in a receiving device of an embodiment of the present invention.

Figure 65:
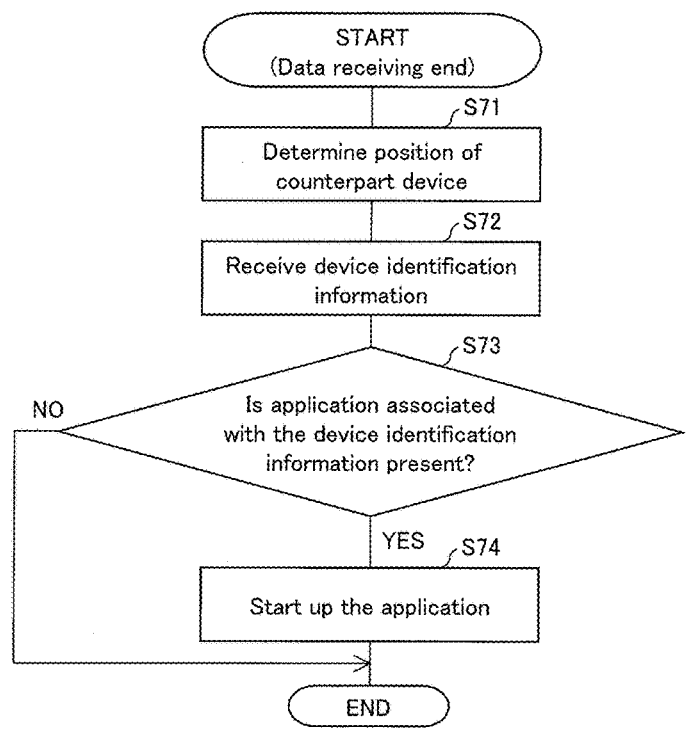

FIG. 65 is a flowchart illustrating the flow of processes performed by the receiving device.

DESCRIPTION OF EMBODIMENTS

Embodiment 1

An embodiment of the present invention is described below with reference to FIGS. 1 through 52.

[Overview of Embodiment 1]

With reference to FIG. 13, the description below first deals with an information processing system 5 including two display devices 1 (electronic devices) which include their respective touch panels 14 (which will be described later). It should be noted that the display devices 1 can be replaced by display devices 2 or 3 (electronic devices) which will be described later.

Specifically, when one display device 1 (on a receiving end) detects contact of the other display device (on a transmitting end) or approach thereof, a touch panel of the one display device 1 receives (senses) a drive signal having been applied to a touch panel of the other display device 1. Then, the one display device (on the receiving end) determines which of detection electrodes has received the drive signal in order to accurately detect a position of the other display device (on the transmitting end) relative to the one display device (on the receiving end).

In other words, the information processing system 5 constitutes a position detection system including the two display devices.

FIG. 13 is a view schematically illustrating a positional relation between the two display devices 1. As illustrated in FIG. 13, examples of a manner of contact of the two display devices 1 with each other or approach thereof to each other, for example, include the following four patterns:

(i) Side surfaces (end surfaces) of the display devices 1 are adjacent to each other (see (a) of FIG. 13).

(ii) The two display devices 1 overlap each other, while a display region of one of the display devices 1 faces a back surface of the other display device 1 (a surface of a casing which surface is opposite to the display region of the one display device) (see (b) of FIG. 13).

(iii) The two display devices 1 overlap each other, while display regions of the two display devices 1 face each other (see (c) of FIG. 13).

(iv) A side surface of the one display device 1 is adjacent to the other display device 1 (the one display device 1 is placed in an upright position on the other display device 1) (see (d) of FIG. 13).

Although the two display devices 1 shown in (a) of FIG. 13 are identical in shape and size, they may be different in shape and size. Similarly, although the two display devices 1 shown in (b) through (d) of FIG. 13 are different in shape and size, they may be identical in shape and size. The two display devices 1 shown in (a) of FIG. 13 and the smaller display devices 1 in (b) through (d) of FIG. 13 are assumed to be portable terminals or tablet computers, whereas the larger display devices 1 shown in (b) through (d) of FIG. 13 are assumed to be displays or monitors. However, this is not the only possibility.

Further, as to the relation illustrated in FIG. 13, the display devices 1 on the receiving end and the display device 1 on the transmitting end may be reversed.

The description below specifically deals with a configuration of the device which performs the position detection, a method of driving that device, and others in the above four patterns. Firstly, example display devices 1 which can be a transmitting-end device and a receiving-end device will be described below.

[Main Arrangements of Display Device 1 and Others]

The description below first deals with respective main arrangements of display devices 1 to 3 with reference to FIGS. 2 through 7. The description below assumes that the display devices 1 to 3 are each a liquid crystal display. The present invention is, however, not limited to such an arrangement: The display devices 1 to 3 may each be such a display device as a plasma display, an organic EL display, or a field emission display. The description below further assumes, unless otherwise stated, that the display devices 1 to 3 are each a plate-shaped member having a rectangular upper surface. The present invention is, however, not limited to such an arrangement: The display devices 1 to 3 may each have, for example, an elliptic or circular upper surface, or may each be not a plate-shaped member but a member having projections and depressions on a surface thereof. In other words, the display devices 1 to 3 may each have any shape as long as the display devices 1 to 3 are arranged to be capable of performing functions described below.

<Display Device 1 (Portable Terminal)>

Figure 3:
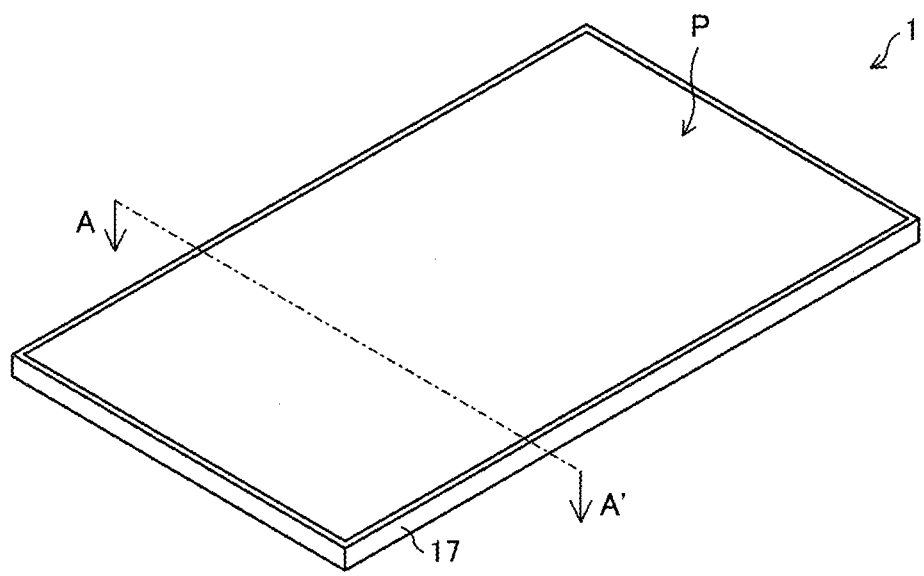
FIG. 3 is a perspective view of a portable terminal including the display device illustrated in (a) of FIG. 2, the perspective view schematically illustrating an example configuration of the portable terminal.
Figure 4:
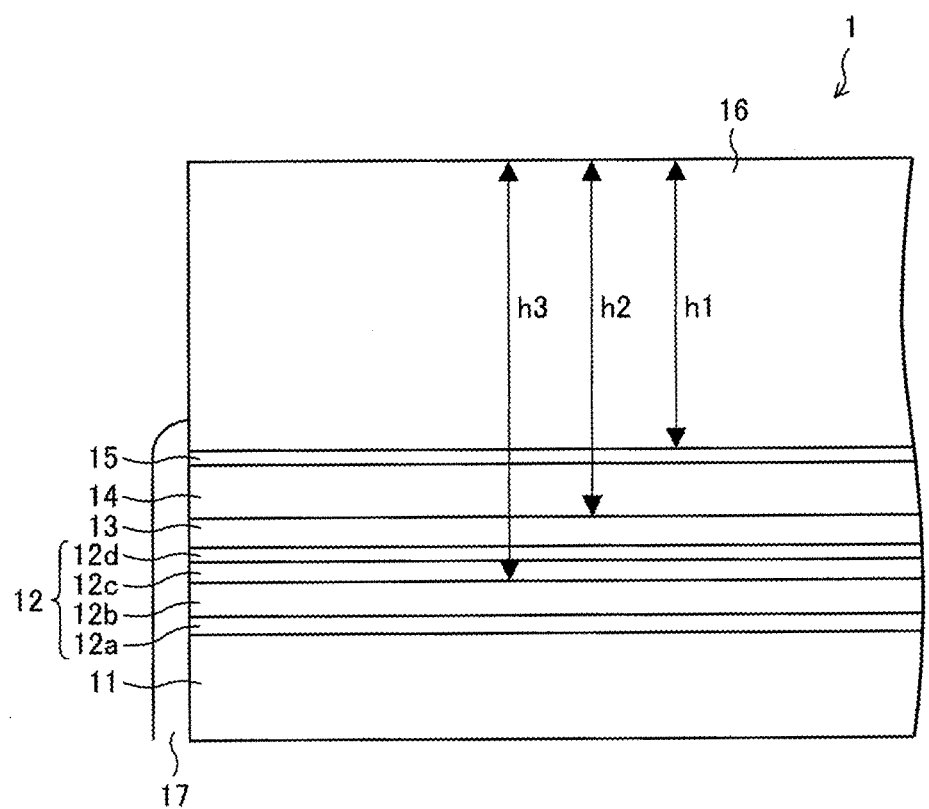
FIG. 4 is a cross-sectional view of the display device illustrated in (a) of FIG. 2, the cross-sectional view schematically illustrating an example configuration of the display device.

With reference to FIGS. 3 and 4, the description below deals with a case in which the display device 1 is included in a portable terminal (or the display device 1 functions as a portable terminal). FIG. 3 is a perspective view of a portable terminal including the display device 1, the perspective view schematically illustrating an example configuration of the portable terminal. FIG. 4 is a cross-sectional view of the display device 1 illustrated in FIG. 3, the cross-sectional view being taken along line A-A' and schematically illustrating an example configuration of the display device 1.

The display device 1 as a portable terminal displays an image, and is capable of accepting an input operation on an image. As illustrated in FIG. 3, the display device 1 has a shape defined by a casing 17 and displays an image in a display region P of a display screen (display panel 12).

More specifically, the display device 1, as illustrated in FIG. 4, includes a backlight 11, and further includes on the backlight 11 a display panel 12, a transparent adhesive layer (optical clear adhesive; OCA) 13, a touch panel 14 (operation detecting member), a transparent adhesive layer 15, and a cover glass 16 stacked on one another in that order. These members are supported by the casing 17 of the display device 1. In other words, the casing 17 contains the display panel 12 and the touch panel 14. Further, the display panel 12 and the touch panel 14 are incorporated into the casing 17.

The display panel 12 can be a known display panel. The display panel 12 includes, for example, (i) an insulating active matrix substrate (not shown) made of a material such as glass, (ii) a light-transmitting counter substrate (not shown) made of a material such as glass and facing the active matrix substrate as separated therefrom by a predetermined distance, and (iii) a liquid crystal layer sandwiched between the active matrix substrate and the counter substrate. The liquid crystal layer can be any of various types of liquid crystal layers. The example of FIG. 4 includes (i) a TFT layer 12b having thin film transistors (TFTs) and (ii) two polarizing plates 12a and 12d sandwiching the TFT layer 12b. This allows a tone display of an image. The display panel 12 further includes a color filter 12c on the counter substrate side. This allows a color display.

The display panel 12 includes (i) data signal lines extending in a column direction, (ii) scanning signal lines and capacitor lines both extending in a row direction, and (iii) pixels arranged in a matrix on the row and column directions. The data signal lines and scanning signal lines are provided on the active matrix substrate.

The pixels are identical to one another in structure: Each pixel corresponds to at least one pixel electrode, a single data signal line, a single scanning signal line, and a single capacitor line. The pixels are each so configured that on the active matrix substrate, the pixel electrode is connected to the corresponding data signal line via a thin film transistor included in the TFT layer 12b and connected to the corresponding scanning signal line. The pixel electrode, together with a counter electrode provided on the counter substrate, forms a liquid crystal capacitor between the counter electrode and itself.

The thin film transistor for each pixel has a source electrode connected to the pixel electrode, a drain electrode connected to the data signal line, and a gate electrode connected to the scanning signal line. This configuration allows (i) the transistor to be controlled to turn on and off in response to a scanning signal (gate signal) supplied from the scanning signal line, (ii) a voltage corresponding to a data signal supplied to the data signal line to be applied to the liquid crystal layer, and (iii) that voltage to be retained while the transistor is off.

The display panel 12 is controlled by various driving circuits and a display control circuit (not shown) included in the display device 1. Such various driving circuits include, for example, a data signal line driving circuit and a scanning signal line driving circuit. Controlling the display panel 12 with use of the above circuits allows an image to be displayed on the display region P.

More specifically, the display control circuit, upon detection of image display timing on the basis of a timing control signal supplied from a timing controller, generates, on the basis of display data and a sync signal both inputted from outside, a display control signal for causing an image (video) to be displayed by the display panel 12. The display control circuit then supplies the display control signal generated to various driving circuits to control their respective operations.

The scanning signal line driving circuit supplies scanning signals (gate signals) sequentially to the scanning signal lines on the basis of the display control signal outputted from the display control circuit. This operation turns on any transistor whose gate electrode corresponds to a portion of a scanning signal line that has been supplied with a scanning signal.

The data signal line driving circuit supplies data signals to the data signal lines on the basis of the display control signal. This operation causes voltages corresponding to the data signals to be applied to the liquid crystal layer via any transistor in the on state, so that image information is written into the liquid crystal layer.

The backlight 11 emits display light into the display panel 12. The backlight 11 may be external to the display device 1.

The touch panel 14 is provided so as to overlap the display panel 12, and is a member for at least detecting (i) contact of a detection target object (target object) such as a finger (or thumb [the same applies hereinafter]) of the user's and a stylus pen with the display region P of the display panel 12 or (ii) approach of the detection target object to the display region P. The touch panel 14 thus accepts an input operation performed by the user on an image displayed in the display region P and makes it possible to control execution of predetermined functions (various applications) on the basis of input operations.

The touch panel 14 of the present embodiment is, for example, a capacitive touch panel.

The display panel 12 and the touch panel 14 are separated from each other by a transparent adhesive layer 13, with which the display panel 12 and the touch panel 14 are fixed. The transparent adhesive layer 13 may be replaced with an air layer (air gap). This arrangement, however, increases reflection at the interface between the transparent adhesive layer 13 and the touch panel 14. Thus, in the case where the display device 1 is used in an environment with external light, the display device 1 may suffer from such disadvantages as a decrease in the contrast of the displayed image. Using a transparent adhesive layer 13 as in the present embodiment can improve the optical properties of the display device 1. Using a transparent adhesive layer 13 can further improve controllability over the respective thicknesses (gaps) of the individual layers. The display device 1 of the present embodiment, therefore, preferably includes a transparent adhesive layer 13.

Later descriptions will deal with how the touch panel 14 is arranged, how the touch panel 14 is driven, and others.

The transparent adhesive layer 15 is provided between the touch panel 14 and the cover glass 16, and fixes the touch panel 14 and the cover glass 16.

The cover glass 16 is a transparent plate-shaped member so provided as to cover the touch panel 14 to protect the touch panel 14 from the outside. The cover glass 16 of the present embodiment is rectangular in shape. The present invention is, however, not limited to such an arrangement: The cover glass 16 may have a cutout shape at an end (outer edge). This arrangement can reduce the distance from the outer edge of the cover glass 16 to an outer edge electrode group of the touch panel 14, that is, an electrode group of detection electrodes 31a and drive electrodes 32a (see FIG. 2). The above arrangement can thus increase the detection accuracy at an outer edge of the display device 1, that is, an outside surface A of the display device 1 which outside surface A is separate from the display region P (see FIG. 2).

The casing 17, as mentioned above, contains the display panel 12 and the touch panel 14. The casing 17 includes a material having a large dielectric constant. This "material having a large dielectric constant" refers to a material having a dielectric constant that allows the touch panel 14 to easily detect contact of a finger or the like with the outer edge of the display device 1 or approach thereof to the outer edge.

Specifically, the casing 17 is made of the same glass as the cover glass 16 with a relative permittivity of approximately 6. (The touch panel 14 is also made of the same glass. In the case of a display device 2 described below, the casing 17 is made of the glass of which a lens 18 is made.) The material of the casing 17 is, however, not limited to that, and may be another resin having a relative permittivity of approximately 3. The casing 17 is, in other words, preferably made of a material having a relative permittivity that facilitates the above detection, that is, a relative permittivity of 3 or more (preferably 6 or more).

Using such a material having a large dielectric constant for the casing 17 can increase the detection accuracy at the outer edge of the display device 1.

In the case where the display device 1 is used as a portable terminal, the individual members included in the display device 1 have, as examples, respective thicknesses specified below.

The backlight 11 has a thickness of 0.74 mm. The polarizing plate 12a has a thickness of 0.15 mm. The TFT layer 12b has a thickness of 0.25 mm. The color filter 12c has a thickness of 0.15 mm. The polarizing plate 12d has a thickness of 0.11 mm. The transparent adhesive layer 13 has a thickness of 0.2 mm. The touch panel 14 has a thickness of 0.4 mm. The transparent adhesive layer 15 has a thickness of 0.1 mm. The cover glass 16 has a thickness h1 of 2 mm. Further, the cover glass 16 has a front surface separated from the interface between the touch panel 14 and the transparent adhesive layer 13 by a distance (thickness) h2 of 2.5 mm. The front surface of the cover glass 16 is separated from the interface between the color filter 12c and the TFT layer 12b by a distance (thickness) h3 of 2.96 mm.

The above thicknesses are, of course, mere examples, and vary as appropriate according to, for example, the size of a portable terminal to include the display device 1: For example, the display panel 12 has a thickness of 0.86 mm, which may alternatively be approximately 0.7 mm. The touch panel 14 may also have a thickness of approximately 0.7 mm. The casing 17 has a length (width) along a horizontal direction which length is, as described below, not larger than a length that allows the touch panel 14 to detect (i) contact of a finger or the like with an outside surface (end surface) of the casing 17 or (ii) approach thereof to the outside surface.

<Display Device 2 (Portable Terminal)>

Figure 5:
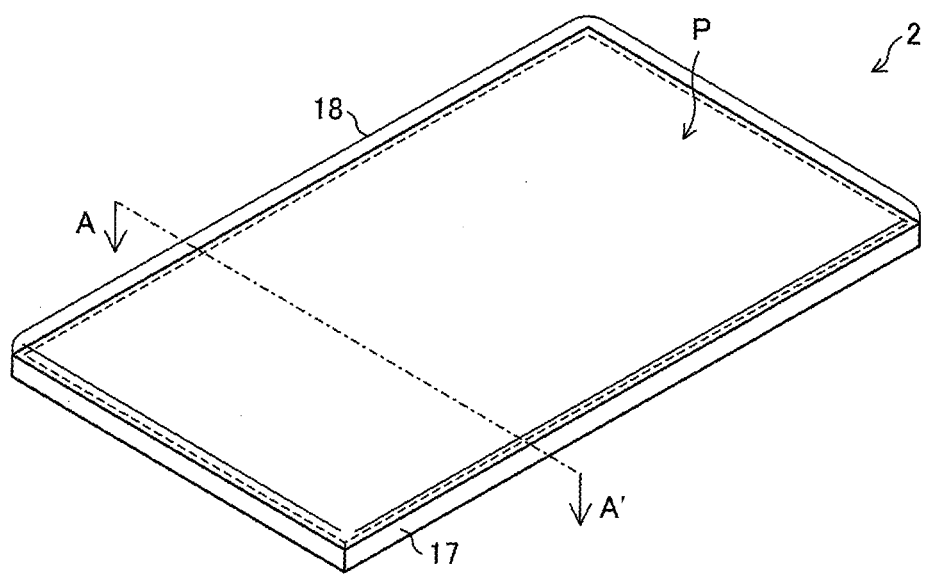
FIG. 5 is a perspective view of a portable terminal including the display device illustrated in (b) of FIG. 2, the perspective view schematically illustrating an example configuration of the portable terminal.
Figure 6:
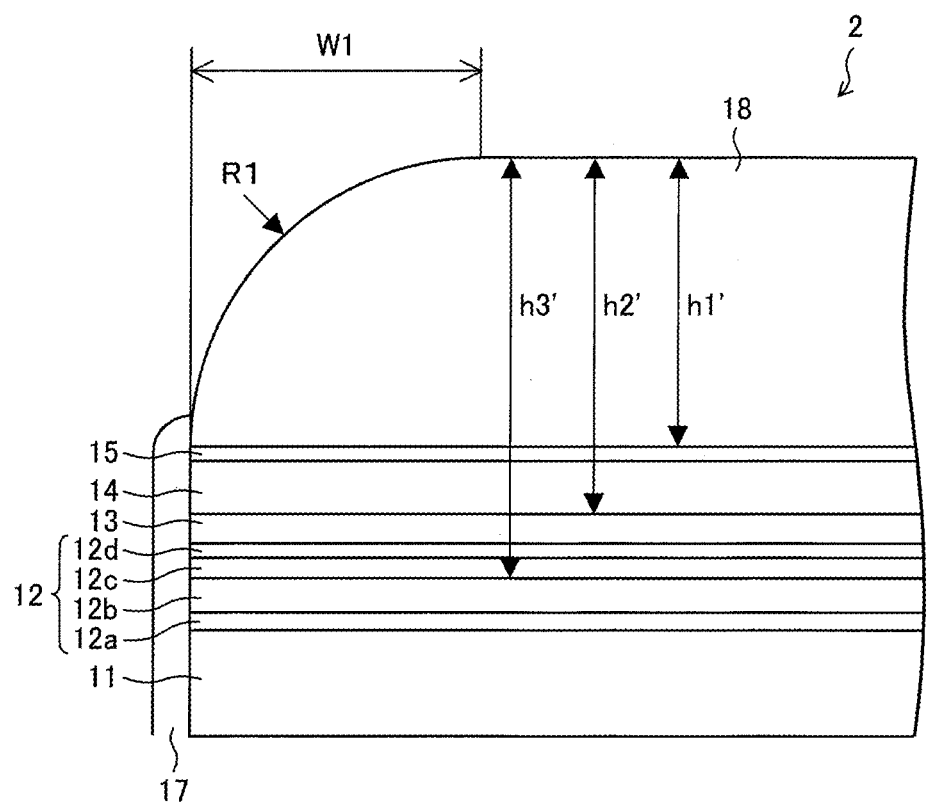
FIG. 6 is a cross-sectional view of the display device illustrated in (b) of FIG. 2, the cross-sectional view schematically illustrating an example configuration of the display device.

With reference to FIGS. 5 and 6, the description below deals with a variation of the portable terminal which variation includes a display device 2. FIG. 5 is a perspective view of a portable terminal including a display device 2 which portable terminal is a variation of the portable terminal illustrated in FIG. 3, the perspective view schematically illustrating an example configuration of the portable terminal including the display device 2. FIG. 6 is a cross-sectional view of the display device 2 illustrated in FIG. 5, the cross-sectional view being taken along line A-A' and schematically illustrating an example configuration of the display device 2.

As illustrated in FIGS. 5 and 6, the display device 2 is different from the display device 1 in that it includes a lens 18 instead of a cover glass 16, but is identical to the display device 1 in terms of the functions of the other members such as the display panel 12 and the touch panel 14. The description below thus mainly deals with how the display device 2 differs from the display device 1, and omits other points.

The display device 2, as illustrated in FIG. 6, includes a lens 18 above the touch panel 14. The lens 18 is a transparent plate-shaped member so provided as to cover the touch panel 14 to protect the touch panel 14 from the outside. The lens 18 has a cutout portion R1 (cutout shape) at an end (outer edge) to change the direction of travel of light emitted from the display panel 12.

Using a lens 18 having a cutout portion R1 can increase the detection accuracy of the touch panel 14 at the outer edge of the display device 2 as with the cover glass 16. Further, the cutout portion R1 changes the direction of travel of light emitted from pixels on an outer edge of the display panel 12 to allow such light to be emitted from a region (non-display region) located outside of the above pixels. The cutout portion R1 can thus increase the viewing angle of a display image (that is, a display region as viewed by the user). The lens 18 does not necessarily have a cutout portion R1 in the case where the function of increasing the viewing angle is unnecessary.

In the case where the display device 2 is used as a portable terminal, the individual members included in the display device 2 (other than the lens 18, which corresponds to the cover glass 16) have, as examples, respective thicknesses equal to those of the respective corresponding members of the display device 1. The lens 18 has a thickness h1' of 2.13 mm. The lens 18 has a front surface separated from the interface between the touch panel 14 and the transparent adhesive layer 13 by a distance (thickness) h2' of 2.63 mm. The front surface of the lens 18 is separated from the interface between the color filter 12c and the TFT layer 12b by a distance (thickness) h3' of 3.09 mm. Further, the cutout portion R1 has a width w1 of 2.1 mm. As with the display device 1, the above thicknesses are, of course, mere examples, and vary as appropriate according to, for example, the size of a portable terminal to include the display device 2.

The display device 1 or 2 is used for such portable terminals as multifunction mobile telephones (smart phones) and tablet computers. Additionally, the display device 1 or 2 is widely used for any device capable of displaying an image and accepting an input operation on the image, such as a television and a monitor.

[Detailed Configurations of Display Device 1 and Others]

Figure 2:
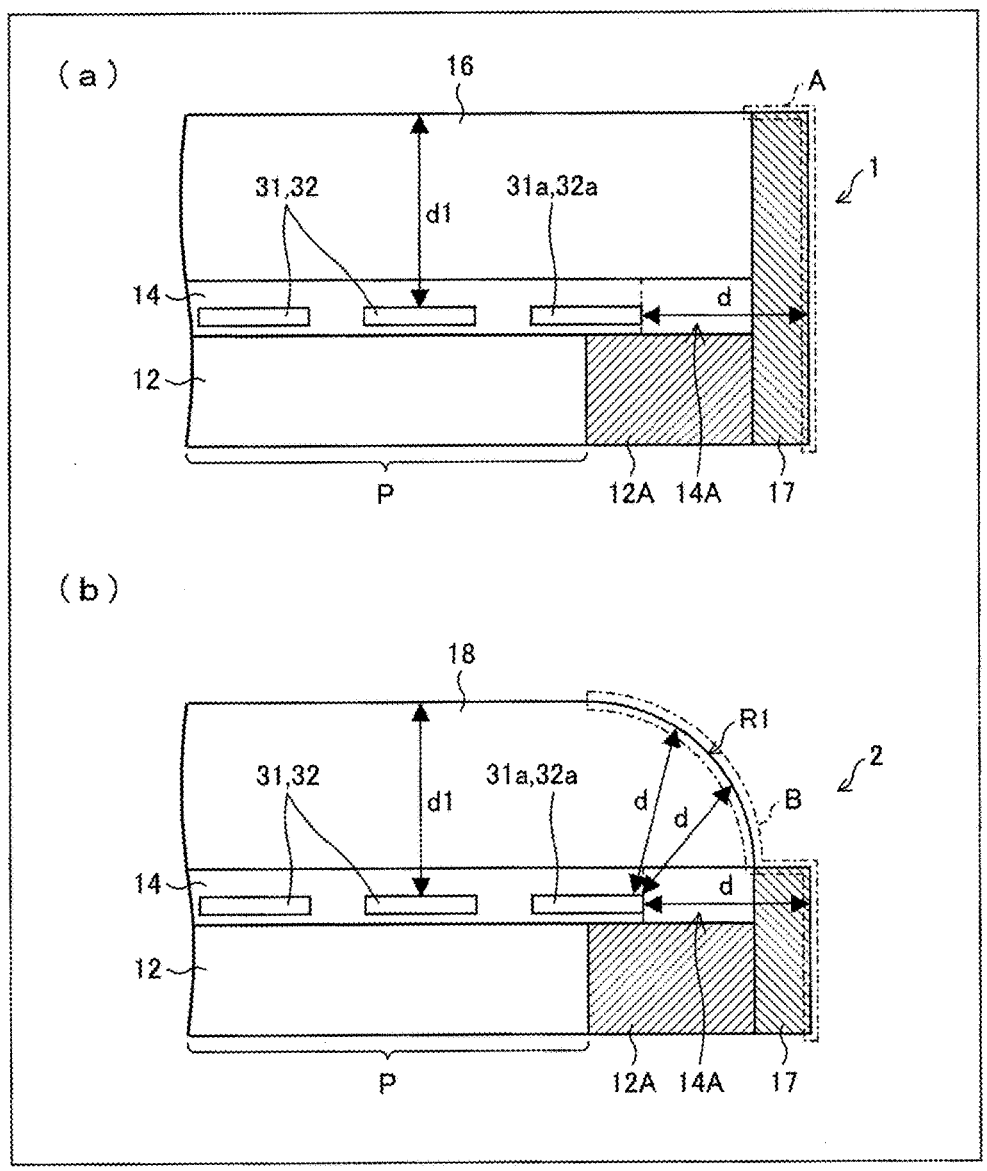
FIG. 2 shows cross-sectional views of a display device of an embodiment of the present invention, the cross-sectional views each schematically illustrating an example configuration of the display device, where (a) schematically illustrates a configuration with a cover glass, and (b) schematically illustrating a configuration with a lens.

The description below deals with detailed configurations of the display device 1 and others with reference to FIG. 2. FIG. 2 shows cross-sectional views of, for example, a display device 1 of an embodiment of the present invention, the cross-sectional views schematically illustrating example configurations of, for example, the display device 1, where (a) schematically illustrates a configuration of a display device 1 including a cover glass 16, and (b) schematically illustrates a configuration of a display device 2 including a lens 18.

<Display Device 1 (Portable Terminal)>

The description below first deals with a main configuration of the display device 1 with reference to (a) of FIG. 2. For simple descriptions, (a) of FIG. 2 omits illustrations of members such as the transparent adhesive layer 15 illustrated in FIG. 4.

The touch panel 14 includes, on a substrate, a detection electrode(s) 31 and a drive electrode(s) 32 as an electrode group for detecting contact or approach of a finger or the like. The electrode group includes a detection electrode(s) 31a and a drive electrode(s) 32a as an outer edge electrode group which are provided along an outer edge of the touch panel 14 (that is, the above substrate). In other words, out of the detection electrodes 31, which form a plurality of sense lines (SL) (see FIG. 14) of the touch panel 14, respectively, the detection electrode(s) 31a is the one provided along the outer edge of the touch panel 14.

As illustrated in (a) of FIG. 2, the display device 1 includes, (i) between the display panel 12 and the inside surface of the casing 17, a first wire containing section 12A capable of containing various wires of the display panel 12 and (ii) between the touch panel 14 and the casing 17, a second wire containing section 14A for containing various wires of the touch panel 14.

The display device 1 of the present embodiment is arranged such that the minimum distance d between the touch panel 14 and an outside surface A of the casing 17 (that is, an end surface of the casing 17) which outside surface A is separate from the display region P is not larger than a detectable distance, within which the touch panel 14 is capable of detecting (i) contact of a finger or the like with the outside surface A or (ii) approach thereof to the outside surface A. This configuration allows the touch panel 14 to detect (i) contact of a finger or the like with the outside surface A of the casing 17, the outside surface A being separate from the display region P, or (ii) approach thereof to the outside surface A. With the above configuration, the display device 1 does not necessarily detect contact of a finger or the like or approach thereof over an image displayed by the display panel 12. The display device 1 can therefore, without decreasing the viewability or operability of the image, accept an operation performed with a finger or the like.

The above arrangement allows the touch panel 14, which detects contact of a finger or the like with the display region P or approach thereof to the display region P, to detect (i) contact of a finger or the like with the outside surface A or (ii) approach thereof to the outside surface A. The above arrangement thus eliminates the need to additionally include a member (that is, a dedicated sensor) for detecting contact of a finger or the like with the outside surface A or approach thereof to the outside surface A. The above arrangement consequently makes it possible to detect (i) contact of a finger or the like with the outside surface A or (ii) approach thereof to the outside surface A without increasing the number of components of the display device 1 (that is, without complicating the detecting mechanism).

The minimum distance d corresponds, as illustrated in (a) of FIG. 2, to a first distance, which is specifically a distance between (i) the detection electrodes 31a and drive electrodes 32a as an outer edge electrode group provided on the touch panel 14 and (ii) the outside surface A. The first distance (minimum distance d) is preferably not larger than a second distance d1, which is a distance in a direction perpendicular to the display panel 12 between (i) the touch panel 14 (specifically, the detection electrodes 31 and drive electrodes 32) and (ii) an outside surface of the cover glass 16 (that is, an upper surface of the display device 1 with which surface a finger [or thumb] or the like comes into contact). This arrangement allows the touch panel 14 to reliably detect (i) contact of a finger or the like with the outside surface A of the casing 17 or (ii) approach thereof to the outside surface A.

The display device 1 is, in other words, designed so that the minimum distance d is defined to allow the touch panel 14 to detect (i) contact of a finger or the like with the outside surface A of the casing 17 or (ii) approach thereof to the outside surface A, and is thus designed to have a narrow frame (or to be frameless). This allows the touch panel 14 to sense (i) contact of a finger or the like with the outside surface A (that is, the outer edge [terminal edge] of the display device 1) or (ii) approach thereof to the outside surface A. Further, narrowing the frame can also improve the design of the display device 1.

The minimum distance d simply needs to be not larger than the detectable distance at least at an end surface of the casing 17, which end surface is a portion of the outside surface A of the casing 17. This arrangement allows the touch panel 14 to detect (i) contact of a finger or the like with at least such an end surface or (ii) approach thereof to at least such an end surface.

<Display Device 2 (Portable Terminal)>

The description below now deals with a main configuration of the display device 2 with reference to (b) of FIG. 2. For simple descriptions, (b) of FIG. 2 omits illustrations of members such as the transparent adhesive layer 15 illustrated in FIG. 6. The display device 2, as described above, differs from the display device 1 in that it includes a lens 18 instead of a cover glass 16.

The display device 2 is so designed that the minimum distance d between the touch panel 14 and an outside surface B of the casing 17 (that is, an end surface of the casing 17) which outside surface B is separate from the display region P is not larger than a detectable distance, within which the touch panel 14 is capable of detecting (i) contact of a finger or the like with the outside surface B or (ii) approach thereof to the outside surface B. This configuration, as with the configuration of the display device 1, allows the touch panel 14 to detect (i) contact of a finger or the like with the outside surface B of the casing 17, the outside surface B being separate from the display region P, or (ii) approach thereof to the outside surface B.

The outside surface B covers not only an outside surface of the casing 17 which outside surface corresponds to the outside surface A illustrated in (a) of FIG. 2, but also an outside surface of the cutout portion R1 of the lens 18. The present embodiment, in other words, defines the outside surface B of the casing 17 as covering the above two outside surfaces.

The minimum distance d (first distance) for the display device 2 is, as illustrated in (b) of FIG. 2, a distance between (i) the detection electrodes 31a and drive electrodes 32a as an outer edge electrode group provided on the touch panel 14 and (ii) the outside surface B. As with the display device 1, the minimum distance d is preferably not larger than the second distance d1, and simply needs to be not larger than the detectable distance at least at an end surface of the casing 17, which end surface is a portion of the outside surface B of the casing 17.

<Variation>

Figure 7:
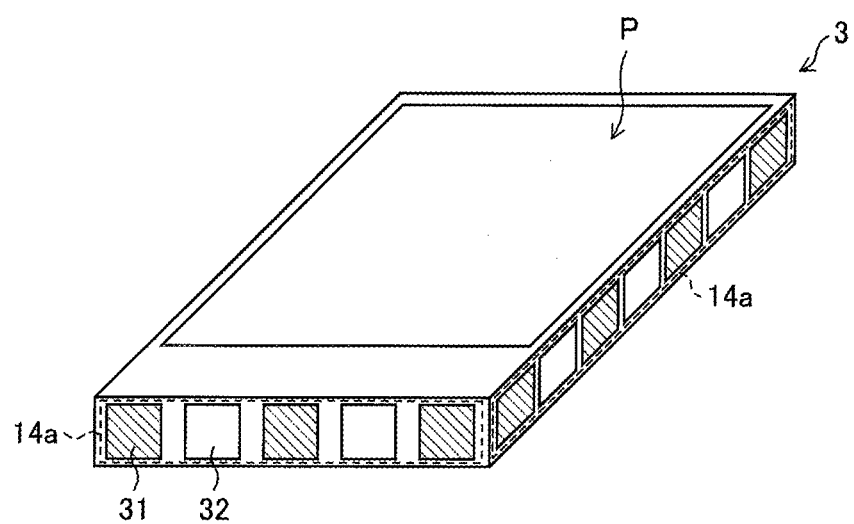
FIG. 7 is a perspective view of a display device according to a variation of an embodiment of the present invention, the perspective view schematically illustrating an example configuration of the display device.

With reference to FIG. 7, the description below deals with a main arrangement of the display device 3 according to a variation of the display devices 1 and 2.

As with the display devices 1 and 2, the display device 3 includes (although not shown in FIG. 7) (i) a display panel 12, (ii) a touch panel 14 (first operation detecting member) provided so as to overlap with the display panel 12 and configured to detect contact of a finger or the like with a display region P of the display panel 12 or approach thereof to the display region P, and (iii) a casing 17 containing the display panel 12 and the touch panel 14.

The display devices 1 and 2 are arranged such that the minimum distance d (see FIG. 2) is not larger than the detectable distance, within which the touch panel 14 is capable of detecting contact of a finger or the like with the outside surface A or B or approach thereof to the outside surface A or B, and eliminate the need to additionally include a member for detecting, for example, the contact with the outside surface A or B. The present invention is, however, not limited to such an arrangement. As with the display device 3 illustrated in (a) of FIG. 7, the touch panel 14 may be replaced with another member, that is, a touch panel 14a (second operation detecting member), to detect contact of a finger or the like with the outside surface A or B of the casing 17 or approach thereof to the outside surface A or B.

The display device 3 is, as described above, also arranged to detect (i) contact of a finger or the like with the outside surface A or B of the casing 17, the outside surface A or B being separate from the display region P, or (ii) approach thereof to the outside surface A or B. With the above configuration, the display device 3 does not necessarily detect contact of a finger or the like or approach thereof over an image displayed by the display panel 12. The display device 3 can therefore, without decreasing the viewability or operability of the image, accept an operation performed with use of a finger or the like.

The touch panel 14a illustrated in FIG. 7 includes detection electrodes 31 and drive electrodes 32 arranged alternately on a single line. The present invention is, however, not limited to such an arrangement. A touch panel alternative to the touch panel 14a may include electrodes on a plurality of lines, depending on the height of the end surface (side surface) of the casing 17, that is, the length of the casing 17 which length is in a direction perpendicular to the front surface of the cover glass 16 or lens 18 (that is, the upper surface of the display device 3). With this arrangement, intervals of the detection electrodes 31 and intervals of the drive electrodes 32 are smaller than those in the touch panel 14a illustrated in FIG. 7. This allows one device to detect the position of the counterpart device relative to the one device with a higher degree of accuracy.

Configurations of the touch panels 14 and 14a are similar to each other except for that arrangement. The description below takes the touch panel 14 as an example.

[Capacitive Touch Panel]

<Overview of Structure and Driving of Touch Panel>

Figure 8:
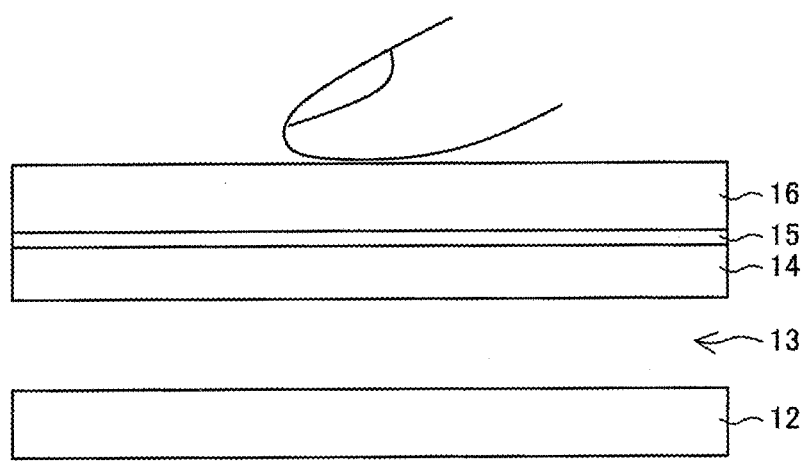
FIG. 8 is a cross-sectional view of a touch panel included in the display device, the cross-sectional view schematically illustrating a configuration of the touch panel.

The description below deals with a detailed arrangement of the touch panel 14 with reference to FIGS. 8 through 12. FIG. 8 is a cross-sectional view of the touch panel 14 included in the display device 1 and the like, the cross-sectional view schematically illustrating a configuration of the touch panel 14.

The display device 1 and the like each include a display panel 12, a transparent adhesive layer 13, a touch panel 14, a transparent adhesive layer 15, and a cover glass 16 (or lens 18) as described above. Stated differently, these components achieve a touch panel function.

The touch panel 14 of the present embodiment is preferably a capacitive touch panel. With the capacitive touch panel as employed, it is possible to perform, for example, (i) processing to detect the location of a counterpart device coming into contact or approaching the display device 1 or the like and (ii) processing to perform data communications with the counterpart device via the touch panel 14, as will be described later.

The touch panel 14 is not limited to the capacitive touch panel and can be any of various types of touch panels that can perform the aforementioned processing. The description below deals with a configuration in which a capacitive touch panel is included, in particular, a configuration in which an out-cell or on-cell touch panel is mounted on the outer side of the display panel 12. The out-cell or on-cell touch panel may be replaced by an in-cell touch panel. A capacitive touch panel detects a change in capacitance which change occurs in the case where a user has brought a finger, a stylus or the like into contact with a front surface of, for example, the display device 1 (specifically, a front surface of the cover glass 16 or lens 18, or the outside surface A or B), and thus detects the position of the contact. This arrangement makes it possible to detect the position of contact through a simple operation.

FIG. 9 shows diagrams each illustrating an example capacitive touch panel. (a) of FIG. 9 is a plan view of a touch panel, the plan view illustrating how electrodes of the touch panel are arranged. (b) of FIG. 9 is a cross-sectional view of the touch panel, the cross-sectional view being taken along line A-B shown in (a) of FIG. 9. (c) of FIG. 9 is a diagram illustrating an operation of the touch panel which operation is performed in the case where a finger (that is, a detection target object) has touched the touch panel.

FIG. 9 shows the reference numeral 21 to indicate a substrate made of a transparent insulator (dielectric), the substrate having a surface on which a plurality of detection electrodes 31 and a plurality of drive electrodes 32 are provided. The surface on which the detection electrodes 31 and drive electrodes 32 are provided is covered by a cover glass 16. The cover glass 16 is made of an insulator (for example, a transparent glass) having a predetermined dielectric constant.

Although (a) of FIG. 9 does not illustrate details of the connection, the drive electrodes 32 are connected to one another for each row in the X-axis direction, whereas the detection electrodes 31 are connected to one another for each column in the Y-axis direction. Applying a driving voltage to the drive electrodes 32 and detection electrodes 31 forms capacitances, as illustrated in (b) of FIG. 9, between the drive electrodes 32 and detection electrodes 31 through the substrate 21 and cover glass 16 to form lines of electric force as illustrated.

A fingertip 94 touching the front surface of the cover glass 16 with a driving voltage applied as above forms a capacitance 95 between (i) ground and (ii) the drive electrodes 32 and detection electrodes 31 through the human body as illustrated in (c) of FIG. 9, thereby causing part of the lines of electric force to be grounded through the fingertip 94. This indicates a large change in capacitance between the drive electrodes 32 and detection electrodes 31 at a portion at which the fingertip 94 has touched the front surface. The touch panel 14 can detect such a change to detect the position at which the fingertip 94 has touched the front surface.

The present embodiment can use a known circuit (see, for example, Patent Literature 2) as a position detecting circuit for detecting the coordinate position of a detection target object. The position detecting circuit is not limited to any particular circuit.

Figure 10:
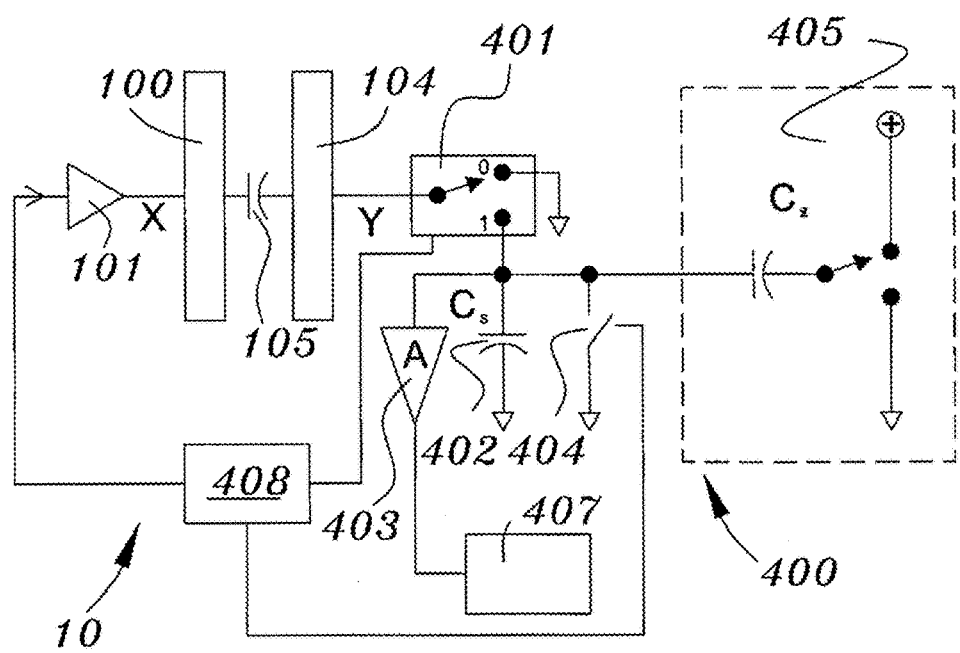
FIG. 10 is a circuit diagram illustrating a position detecting circuit for a mutual capacitive touch panel.
Figure 11:
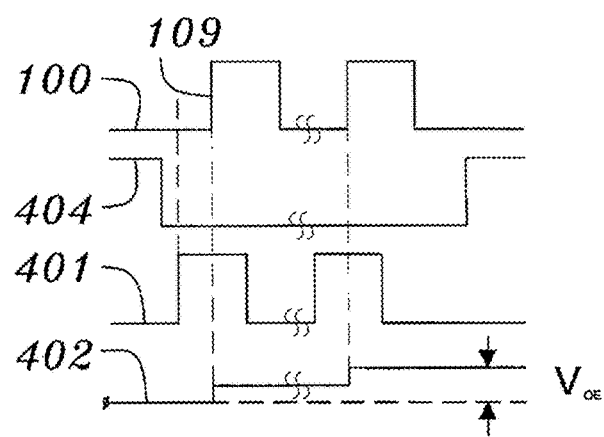
FIG. 11 is a timing chart illustrating an operation of the circuit illustrated in FIG. 9.

FIG. 10 is a circuit diagram illustrating a position detecting circuit for a mutual capacitive touch panel (which is a mainstream capacitive touch panel) disclosed in Patent Literature 2. FIG. 11 is a timing chart illustrating an operation of the circuit.

The circuit includes a transmitting electrode (drive electrode) 100 and a receiving electrode (detection electrode) 104 connected to each other through a cross capacitor 105. The circuit further includes on the receiving electrode side a switch 401, a storage capacitor 402 (corresponding to capacitance Cf), a reset switch 404, and an output amplifier 403. The transmitting electrode 100 generates a rectangular waveform 109 with the aid of an amplifier 101. The circuit is first reset, allows electric charge to be transferred and held repeatedly, and then measures a voltage difference. Specifically, since the cross capacitor 105 changes depending on whether a finger is in contact with the touch panel (for example, placing a finger on the touch panel reduces the cross capacitor), measuring a difference in an output voltage allows detection of a position at which a fingertip has touched the touch panel.

Other examples of an equivalent circuit of a mutual capacitive touch panel and a driving method of driving the mutual capacitive touch panel will be further described in detail with reference to FIGS. 14 through 19.

Figure 12:
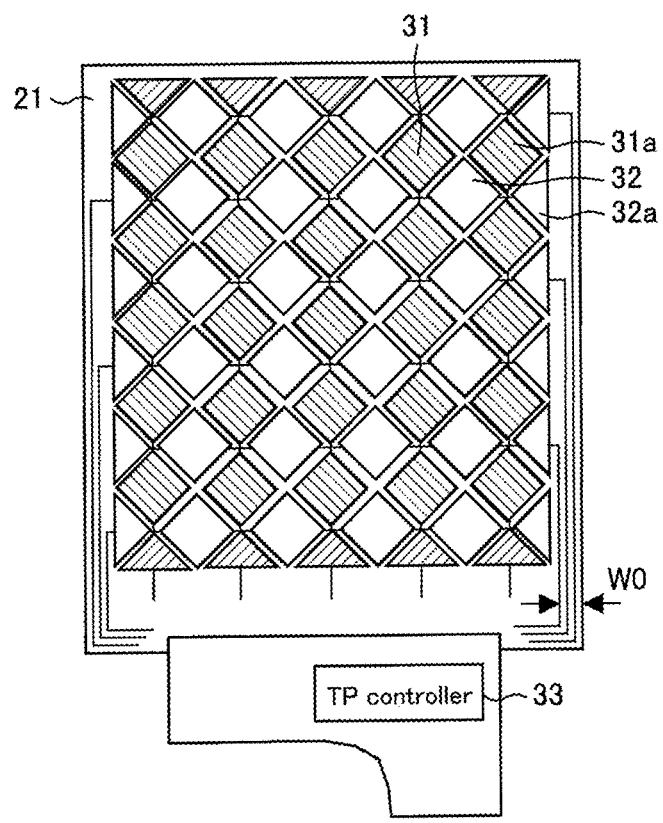
FIG. 12 is a top view of an example of the touch panel, the top view schematically illustrating the touch panel.

FIG. 12 is a top view of the touch panel 14 of the present embodiment, the top view schematically illustrating a configuration of the touch panel 14. The touch panel 14, as illustrated in FIG. 12, includes on the substrate 21 detection electrodes 31 and drive electrodes 32 arranged in a matrix as an electrode group for detecting contact of a finger or the like or approach thereof. The electrode group includes detection electrodes 31a and drive electrodes 32a as an outer edge electrode group which are provided along an outer edge of the touch panel 14 (that is, the substrate 21). The detection electrodes 31 and drive electrodes 32 (that is, the circuit illustrated in FIGS. 10 and 11) are controlled by a TP controller (touch panel controller) 33.

The display device 1 and others of the present embodiment are arranged to detect contact of a finger or the like with the outside surface A or B of the casing 17 or approach thereof to the outside surface A or B. The second wire containing section 14A of the touch panel 14 (that is, the frame wiring width w0 of the touch panel 14) is thus preferably not larger than 1 mm for the display devices 1 and 2 each used as a portable terminal.

The display device 2, which includes the lens 18, is preferably arranged such that the electrodes and second wire containing section 14A are so positioned as not to block the path of light emitted from the display panel 12.

As the touch panel 14 of the present embodiment, not only the aforementioned mutual capacitive touch panel but also a self-capacitance touch panel can be adopted. The self-capacitance touch panel is such that the TP controller 33 causes pulse signals to be applied to a plurality of first electrode lines and a plurality of second electrode lines which cross each other at a right angle. Then, (i) capacitance (self-capacitance) provided between the first electrode line and a detection target object and (ii) capacitance (self-capacitance) provided between the second electrode line and the detection target object are detected, in order to determine the position of contact of the detection target object or approach thereof.

Unfortunately, the self-capacitance touch panel detects a single touch (input at a single point at a time) only and decreases an S/N ratio due to parasitic capacitance. In contrast, the mutual capacitive touch panel is capable of detecting a multi-touch (simultaneous inputs at a plurality of points at a time) and is also capable of canceling parasitic capacitance, thanks to its electric charge transfer technique, thus increasing an S/N ratio.

<Mutual Capacitive Scheme>

Figure 14:
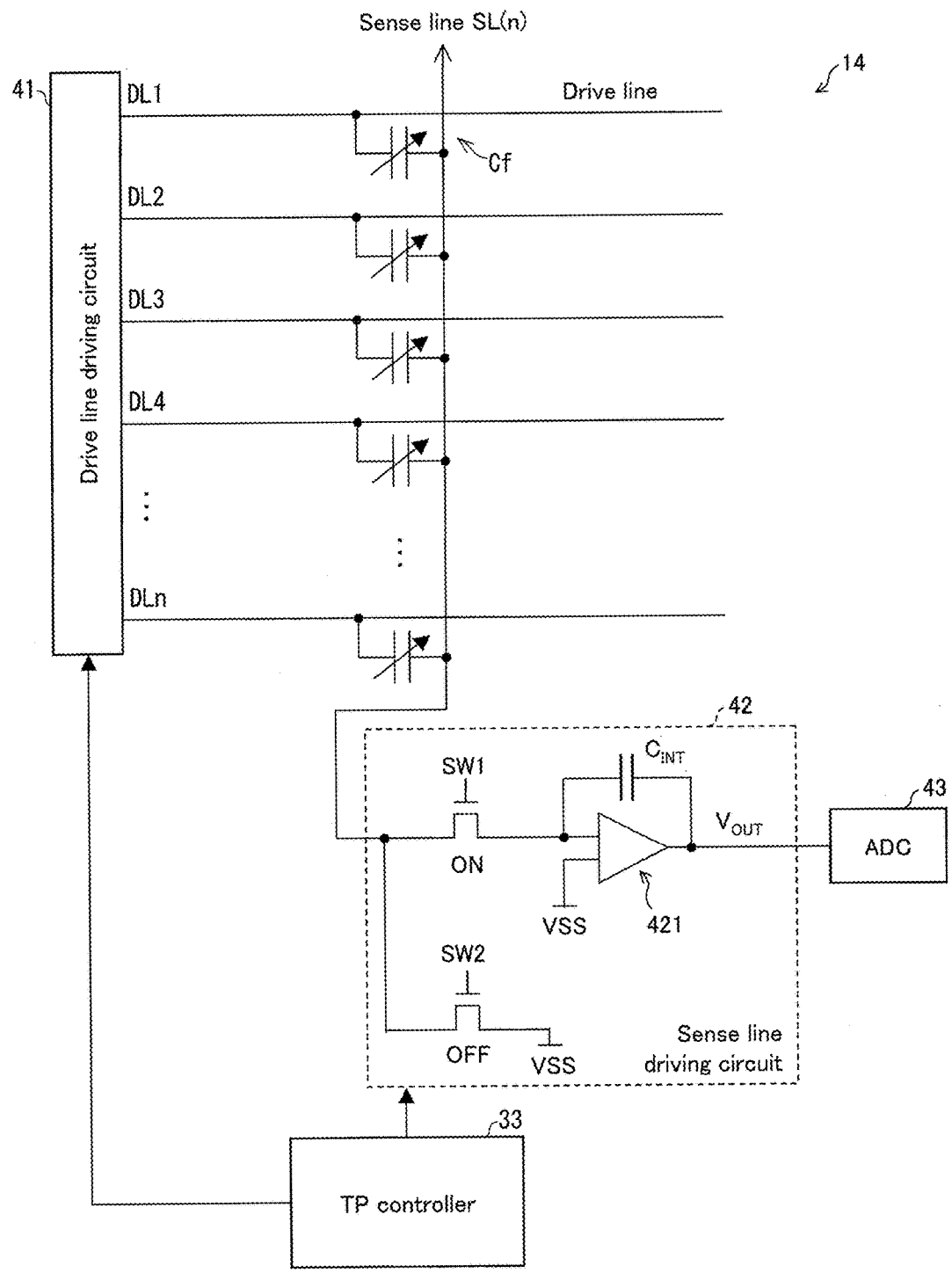
FIG. 14 is a diagram illustrating an equivalent circuit of a mutual capacitive touch panel.

The description below specifically deals with the mutual capacitive scheme (mutual capacitive detection scheme) with reference to FIG. 14 through FIG. 19. FIG. 14 is a view illustrating a configuration of an equivalent circuit of a touch panel 14 of the mutual capacitive scheme.

In the mutual capacitive scheme, the touch panel 14 includes, as described earlier, a plurality of detection electrodes 31 and a plurality of drive electrodes 32 in a matrix manner. The detection electrodes 31 are arranged so as to form a plurality of sense lines SL(n), and the drive electrodes 32 are arranged so as to form a plurality of drive lines DL1 through DLn.

The drive lines DL1 through DLn of the touch panel 14 are connected to a drive line driving circuit 41, and the sense lines SL(n) are connected to their respective sense line driving circuits 42 (see FIG. 14). Under control of the TP controller 33, the drive line driving circuit 41 and the sense line driving circuit 42 drive the drive lines DL1 through DLn and the sense lines SL(n), respectively. Further, variable capacitance (capacitance) Cf whose capacitance value varies in response to contact of a detection target object such as a finger or the like, is formed at each point of intersection between a corresponding one of the drive lines DL1 through DLn and a corresponding one of the sense lines SL(n).

The sense line driving circuit 42 includes: an operational amplifier 421 with first input grounded; an integral capacitance Cint provided between an output of the operational amplifier 421 and a second input of the operational amplifier 421; a transistor SW1 connected to the second input of the operational amplifier 421; and a transistor SW2 connected to the transistor SW1 in parallel. A configuration of the sense line driving circuit 42 is described later with reference to FIG. 15.

The sense line driving circuits 42 are connected to an ADC 43. Outputs from each capacitance Cf (capacitance Cf for each sense line SL) which has been integrated by a corresponding one of the sense line driving circuits 42 is supplied to the ADC 43.

The ADC 43 carries out an AD conversion with respect to the outputs from each capacitance Cf, the outputs each having been integrated by a corresponding one of the sense line driving circuits 42, and supplies the resulting outputs to a control 50 or a control 60 (described later). This allows the control section 50 to detect a position of contact of a finger or a counterpart device or approach thereof or allows the control section 60 to detect a position of contact of a finger or a counterpart device or approach thereof.

The description below deals with a driving principle of the mutual capacitive touch panel with reference to FIG. 15. FIG. 15 is a diagram illustrating the driving principle of the mutual capacitive touch panel, wherein (a) of FIG. 15 is a timing chart of the touch panel 14 being driven, and (b) and (c) of FIG. 15 are diagrams illustrating equivalent circuits of the touch panel 14 being driven.

The drive line driving circuit 41 sequentially applies pulses (High) each having a voltage value Vdrive to the respective drive lines DL1 through DLn (corresponding to "DL" in FIG. 15) at a predetermined interval (see (a) of FIG. 15). In other words, the drive line driving circuit 41 applies pulse signals to the respective drive lines DL1 through DLn.

Meanwhile, the sense line driving circuit 42 causes a signal to be applied to the transistor SW2 to be High at a timing when the pulse signals having been applied to the respective drive lines DL1 through DLn go High (at a pulse rise; at a timing indicated by (i) in (a) of FIG. 15), so that the transistor SW2 is turned on. Accordingly, the capacitance Cf is grounded as illustrated in (b) of FIG. 15. At that time, the pulses are being applied to the drive lines DL1 through DLn, and the capacitance Cf thus stores the electric charge as illustrated in (c) of FIG. 15. Then, during a time when the pulse signals applied to the drive lines DL1 through DLn are High, and before the transistor SW1 is turned on, the signal to be applied to the transistor SW2 goes Low so that the transistor SW2 is turned off.

Subsequently, the sense line driving circuit 42 causes a signal to be applied to the transistor SW1 to be High at a timing when the pulse signals having been applied to the respective drive lines DL1 through DLn go Low (at a pulse fall; at a timing indicated by (ii) in (a) of FIG. 15), so that the transistor SW1 is turned on. Accordingly, electric charge stored in the capacitance Cf transfers to the integral capacitance Cint (see (c) of FIG. 15). Then, during a time when the pulse signals applied to the drive lines DL1 through DLn are Low, and before the transistor SW2 is turned on, the signal to be applied to the transistor SW1 goes Low so that the transistor SW1 is turned off.

Repeating the above operation causes the integral capacitance Cint to store electric charge, thus enabling maintaining (holding) the electric charge. For example, in a case where the number of times the storage is carried out (the number of times integral calculation is performed) Nint is four times, transferring the electric charge from the capacitance Cf to the integral capacitance Cint and maintaining (holding) the electric charge in the integral capacitance Cint are repeated four times. Thereafter, the output signal Vout is outputted to the ADC 43 (i.e. the control section 50 or the control section 60) from the operational amplifier 421 (see FIG. 19).

In a case where no contact of the detection target object with the touch panel 14 or no approach thereof to the touch panel 14 is made (no touch is made), each transfer of electric charge allows a predetermined amount of electric charge to be stored. On the other hand, in a case where contact of the detection target object with the touch panel 14 or approach thereof to the touch panel 14 is made (a touch is made), a portion of electric charge stored in the capacitance Cf is released via the detection target object. Accordingly, an amount of electric charge stored is smaller than the predetermined amount.

Thus, a voltage value applied when a touch is made is lower than a voltage value applied when no touch is made, as indicated by the output signal Vout in (a) of FIG. 15. This allows the control section 50 or the control section 60 to analyze the output signal Vout from the operational amplifier 421 (i.e. the sense line driving circuit 42), thereby performing detection as to whether the touch panel is touched or not.

(Sequential Driving Scheme)

The description below deals with a sequential driving scheme, which is one kind of mutual capacitive scheme, with reference to FIG. 16. FIG. 16 is a diagram illustrating a driving principle of the sequential driving scheme.

For simple description, an example case where four drive lines (DL1 through DL4) are provided with respect to any one of sense lines SL is taken in FIG. 16. The drive line driving circuit 41 applies pulses each having a voltage value V to the respective drive lines DL1 through DL4. "1" indicates a state in which a pulse is applied, and "0" indicates a state in which no pulse is applied (a state in which capacitances Cf1 through Cf4 are grounded). Further, the capacitances Cf formed by the drive lines DL1 through DL4 and the sense line SL are capacitances Cf1 through Cf4 (capacitance values are respectively C1 through C4).

The drive line driving circuit 41 sequentially applies pulse "1" to the drive lines DL1 through DL4 (see FIG. 16). In other words, the drive line driving circuit 41 sequentially applies, by sequential driving, the pulse to the drive line DL1 through the drive line DL4. As a result, as the outputs from the sense line driving circuit 42, output signals are obtained as follows:

an output signal Vout(X1) obtained upon application to the drive line DL1 is expressed by Vout(X1)=C1·V/Cint;

an output signal Vout(X2) obtained upon application to the drive line DL2 is expressed by Vout(X2)=C2·V/Cint;

an output signal Vout(X3) obtained upon application to the drive line DL3 is expressed by Vout(X3)=C3·V/Cint; and an output signal obtained upon application to the drive line DL4 is expressed by Vout(X4)=C4·V/Cint.

(Parallel Driving Scheme)

The description below deals with a parallel driving scheme, which is another kind of mutual capacitive scheme, and particularly an orthogonal sequence driving scheme, with reference to FIG. 17. FIG. 17 is a diagram illustrating a driving principle of the orthogonal sequence driving scheme. A driving technique according to the orthogonal sequence driving scheme as used herein is, for example, the technique disclosed in Patent Literature 3. The description below deals with an overview of the orthogonal sequence driving scheme.

First, the orthogonal sequence driving scheme prepares code sequences di (=di1, di2, . . . , diN, where i=1, . . . , M). The code sequences di are orthogonal to one another and include +1 and −1. Further, the code sequences di each have a code length N. The orthogonality of the code sequences di (=di1, di2, . . . , diN, where i=1, . . . , M) each with a code length N means that the code sequences di satisfy the following condition:

$$di \cdot dk = \sum_{j=1}^{N} dij \times dkj \quad \text{[Math. 1]}$$
$$= N \times \delta ik$$

where $\delta ik = 1$ if $i = k$ $\delta ik = 0$ if $i \neq k$

The drive line driving circuit 41 drives the M drive lines DL1 through DLM (n=M in the drive lines DLn) in parallel on the basis of the code sequences di so that a voltage +V is applied to each capacitance corresponding to +1 and a voltage −V is applied to each capacitance corresponding to −1. The capacitances Cij (where i=1 to M, and j=1 to L) (corresponding to capacitance Cf) consequently each store an electric charge (signal) ±Cij·V in accordance with a corresponding element (+1 or −1) in the code sequences.

The sense line driving circuits 42 then each (i) add, via its connection to a corresponding sense line, electric charges stored in capacitances connected to the sense line and thus (ii) read out a signal for its corresponding sense line. The sense line driving circuits 42 consequently obtain output sequence vectors sj (=sj1, sj2, . . . , sjN, where j=1, . . . , L) as output signals Vout.

More specifically, the drive lines DL1 through DLM are driven in parallel each at +V or −V in accordance with each value (+1 or −1) of d11, d21, d31, . . . , dM1 in a code sequence. This causes each corresponding capacitance to store an electric charge ±CV in accordance with a corresponding element ±1 of the code sequence. Then, a corresponding one of the sense line driving circuits 42 (i) adds, via its connection to a corresponding sense line, electric charges stored in the capacitances connected to the sense line and thus (ii) reads out a signal for its corresponding sense line. As the output signal Vout outputted from the sense line driving circuit 42, an output sequence vector sji is expressed as $$sji = G \times \sum_{k=1}^{M} (Ckj \times V \times dki) \quad \text{[Math. 2]}$$

In the circuit illustrated in FIG. 17, G=−1/Cint where G is a gain when the signal represented by the above electric charge is read out via the sense line.

Further, the output sequence vector sji is expressed as $$sj = \sum_{k=1}^{M} (Ckj \times V \times dk) \quad \text{[Math. 3]}$$

Calculation to find an inner product di·sj of a code sequence di and an output sequence vector sj is expressed as $$di \cdot sj = di \cdot G \times \sum_{k=1}^{M} (Ckj \times V \times dk) \quad \text{[Math. 4]}$$
$$= G \times \sum_{k=1}^{M} (Ckj \times V \times di \cdot dk)$$
$$= G \times \sum_{k=1}^{M} (Ckj \times V \times N \times \delta ik)$$
$$= G \times Cik \times V \times N$$

where $\delta ik = 1$ if $i = k$ $\delta ik = 0$ if $i \neq k$

The drive line driving circuit 41 thus drives the M drive lines in parallel so that for each of a first capacitance column Cip (where p is not smaller than 1 and not larger than (L−1), and i=1, . . . , M) and a second capacitance column Ciq (where p<q, q is not smaller than 2 and not greater than L, and i=1, . . . , M), a voltage value +V corresponding to "+1" of the code sequence di or a voltage value −V corresponding to "−1" of the code sequence di, is applied to each of the M drive lines in accordance with the code sequences di (=di1, di2, . . . , diN, where i=1, . . . , M) which are orthogonal to one another and include elements of +1 and −1 and each of which has a length N. The drive section 4 then causes (i) the first capacitance column to output sFirst (=sp1, sp2, . . . , spN) and (ii) the second capacitance column to outputs sSecond (=sq1, sq2, . . . , sqN).

The outputs sFirst (=sp1, sp2, . . . , spN) from the first capacitance column are each integrated by a corresponding sense line driving circuit 42, whereas the outputs sSecond (=sq1, sq2, . . . , sqN) from the second capacitance column are also each integrated by a corresponding sense line driving circuit 42. The sense line driving circuits 42 respectively corresponding to the sense lines SL1 through SLL are sequentially switched, so that outputs from each capacitance column which have each been integrated by a corresponding sense line driving circuit 42 are supplied to the ADC 43.

A drive controlling section 501 (described later) in the control section 50 or a drive controlling section 601 (described later) in the control section 60 estimates, with reference to data stored in a storage section 52 or a storage section 62 (described later), (i) a capacitance value in the first capacitance column, the capacitance value corresponding to a k1-th drive line (where 1≤k1<M), by computing an inner product of a corresponding output sFirst and a corresponding code sequence di and (ii) a capacitance value in the second capacitance column, the capacitance value corresponding to a k2-th drive line (where k1<k2, and 1<k1≤M), by computing an inner product of a corresponding output sSecond and a corresponding code sequence di. Accordingly, a processing time to obtain these capacitance values becomes long. This achieves accurately detecting the position of the detection target object.

With reference to FIG. 18, the description below deals with example outputs from the sense line driving circuit 42 via any one of the sense lines SL with use of four drive lines DL1 through DL4.

Note that the description below assumes that code sequences di=(di1, di2, di3, di4) is set as illustrated in FIG. 18. A voltage value +V corresponding to "1" of the code sequence di or a voltage value −V corresponding to "−1" of the code sequence di, is applied to each of the drive lines DL1 through DL4. Further, the capacitances Cf formed by the drive lines DL1 through DL4 and the sense line SL are assumed to be capacitances Cf1 through Cf4 (capacitance values are C1 through C4).

The drive line driving circuit 41 applies, by parallel driving, the voltage value +V or −V corresponding to each of the code sequences di1 through di4 to each of the drive lines DL1 through DL4 (see FIG. 18). In FIG. 18, the four drive lines are provided. Accordingly, the voltage value +V or −V is applied to each of the drive lines DL1 through DL4 four times on the basis of the code sequences di1 through di4. As a result, as the outputs from the sense line driving circuit 42, output signals are obtained as follows:

an output signal Vout (Y1) obtained upon application to the drive line DL1 is expressed by Vout(Y1)=(C1+C2+C3+C4)·V/Cint;

an output signal Vout(Y2) obtained upon application to the drive line DL2 is expressed by Vout(Y2)=(C1−C2+C3−C4)·V/Cint;

an output signal Vout(Y3) obtained upon application to the drive line DL3 is expressed by Vout(Y3)=(C1+C2−C3−C4)·V/Cint; and an output signal Vout(Y4) obtained upon application to the drive line DL4 is expressed by Vout(Y4)=(C1−C2−C3+C4)·V/Cint.

In other words, the outputs are obtained as output sequence vectors s4=(s41, s42, s43, s44)=(Vout(Y1), Vout(Y2), Vout(Y3), Vout(Y4)).

Then, the control section 50 or the control section 60 performs inner product operation di·s4 of the code sequence di and the output sequence vector s4. Resultant values are as follows:

$$1·Y1+1·Y2+1·Y3+1·Y4=4C1·V/Cint; \quad (i)$$

$$1·Y1+(-1)·Y2+1·Y3+(-1)·Y4=4C2·V/Cint; \quad (ii)$$

$$1·Y1+1·Y2+(-1)·Y3+(-1)·Y4=4C3·V/Cint; \text{ and} \quad (iii)$$

$$1·Y1+(-1)·Y2+(-1)·Y3+1·Y4=4C4·V/Cint. \quad (iv)$$

On the basis of these values, the control section 50 or the control section 60 determines the detection of the position of the detection target object.

(Difference in Sensing Time)

FIG. 19 shows diagrams each illustrating how parallel driving effectively reduces the time taken for a touch panel to carry out sensing.

(a) of FIG. 19 shows sensing time $T_{sense}$ in the case of sequential driving, and (b) of FIG. 19 shows sensing time $T_{sense}$ in the case of parallel driving.

In a case where a DL wave period $T_{drive}$ is the same between (a) and (b) of FIG. 19 and the number of times $N_{int}$ an integral is calculated is the same between (a) and (b) of FIG. 19, the sensing time $T_{sense}$ in the case of parallel driving becomes shorter than the sensing time $T_{sense}$ in the case of sequential driving, because the parallel driving allows for driving of a plurality of drive lines at the same time.

Accordingly, it is possible to increase the number of times the sensing is carried out (the number of times an integral is calculated) within a limited length of an idle period. This makes it possible to realize a display device 1 and the like including a touch panel which has an improved SN ratio and is capable of carrying out position detection with a high degree of accuracy.

It should be noted that, although the code sequences in the present embodiment are M-sequence signals, the code sequences are not limited to the M-sequence signals. For example, the code sequences may be Hadamard code sequences or the like.

[Details of (Transmitting-End and Receiving-End) Display Devices]

The description below specifically deals with a position detection method in which a position of a counterpart device, which is one of two display devices 1 or the like included in the information processing system 5 illustrated in FIG. 13, i.e. a position of a counterpart device as the detection target object, is detected.

For simple description, the description below specifically deals with the display devices 2. Unless otherwise noted, the description below assumes that the orthogonal sequence driving scheme is adopted as each driving scheme used for the touch panels 14 included in the respective two display devices 2. This, however, is not the only possibility. Alternatively, the aforementioned sequential driving scheme may be adopted.

Further, the description below deals with a main configuration of the transmitting device 1b (electronic device) and a main configuration of the receiving device 1a (electronic device). However, the transmitting device 1b may be arranged to have a receiving function, while the receiving device 1a may be arranged to have a transmitting function. That is, the transmitting device 1b and the receiving device 1a may each serve as transmitting and receiving devices.

[Details of (Transmitting-End) Display Device]

The description below first deals with a case where the display device 2 is a transmitting end that transmits a pulse signal, i.e. a case where the display device 2 is the transmitting device 1b. The description below particularly deals with processing carried out in a case the transmitting device 1b contacts or approaches the display device 2 (receiving device 1a) which is the counterpart device.

<Configuration of Control Section>

The description below deals with a configuration of the control section 60 of the transmitting device 1b with reference to FIG. 20. FIG. 20 is a functional block diagram schematically illustrating an example configuration of the control section 60.

The transmitting device 1b mainly includes the display panel 12 (transmitting-end display screen), the touch panel 14 (transmitting-end touch panel), the control section 60, a communication section 61, and the storage section 62. The display panel 12 and the touch panel 14 have been described earlier, and descriptions thereof are therefore omitted.

Further, the transmitting device 1b is arranged such that a minimum distance between the touch panel 14 and an outside surface B of the casing 17 (transmitting-end casing) is not larger than a detectable distance, within which the touch panel 14 is capable of detecting (i) contact of the detection target object with the outside surface B or (ii) approach thereof to the outside surface B (In other words, the transmitting device 1b has a narrow frame).

The control section 60 mainly includes the drive controlling section 601 (transmitting-end drive controlling section), the mode changing section 602, and the data transmitting and receiving section 603. The control section 60 (i) reads a program from the storage section 62 into a temporary memory section (not shown) including, for example, a random access memory (RAM) and (ii) executes that program to cause various processes to be performed, for example, to cause any of the members to perform a process.

The drive controlling section 601, by controlling the TP controller 33, controls driving of the drive line driving circuit 41 and the sense line driving circuit 42 in the touch panel 14 according to a mode determined by the mode changing section 602, i.e. according to either a "normal mode" or a "position detection mode". In other words, the drive controlling section 601 controls (i) application of a pulse signal for detecting contact of the detection target object with at least one of the drive lines DL1 through DLn (transmitting-end drive lines) or approach thereof to the drive lines DL1 through DLn and (ii) driving of the sense lines SL for detecting a change in capacitance value of the capacitance Cf formed between at least one of the drive lines DL1 through DLn and at least one of the sense lines SL (transmitting-end sense lines).

In the "normal mode", the drive controlling section 601 performs drive control in accordance with the aforementioned orthogonal sequence driving scheme (or the sequential driving scheme) (CASE 1 in (a) of FIG. 21).

In the "position detection mode", the drive controlling section 601 controls the drive line driving circuit 41 to perform drive control (control of application of pulse signals to the drive lines DL1 through DLn) in accordance with the orthogonal sequence driving scheme (or the sequential driving scheme), whereas the drive controlling section 601 controls the sense line driving circuit 42 so that the sense line driving circuit 42 stops driving of the sense line SL by setting the sense line SL to have a constant potential or a high impedance (Hi Z) (CASE 2 in (a) of FIG. 21). For example, setting the sense line SL to have a constant potential is achieved by turning on the transistor SW2, whereas setting the sense line SL to have high impedance is achieved by turning off the transistors SW1 and SW2.

Even in the "position detection mode", the drive controlling section 601 may perform drive control in accordance with the aforementioned orthogonal sequence driving scheme (or the sequential driving scheme) in the same manner as in the "normal mode". This allows the receiving device 1a to detect the position of the transmitting device 1b while maintaining a normal operation of the touch panel 14 (operation to detect approach of the detection target object or contact thereof).

That is, the drive controlling section 601 controls, in either of these operation modes, so that pulse signals (coded pulse signals) are fed to the drive lines DL1 through DLn. This allows the touch panel 14 included in the receiving device 1a to receive at least one of the pulse signals when the receiving device 1a as the counterpart device contacts or approaches. This, in turn, allows the receiving device 1a to determine the position of the transmitting device 1b.

The mode changing section 602 selects the operation mode of the touch panel 14 between the "normal mode" and the "position detection mode". The "normal mode" is a mode in which the touch panel 14 performs a normal operation to detect approach of the detection target object or contact thereof. The "position detection mode" is a mode in which, while the touch panel 14 does not detect the position of the detection target object, the counterpart device detects the position of the detection target object.

The data transmitting and receiving section 603 transmits predetermined data stored in the storage section 62 via the touch panel 14. Data transmission and reception between the touch panels 14 is described later. Alternatively, the data transmitting and receiving section 603 may transmit the predetermined data via the communication section 61.

The data transmitting and receiving section 603 receives a synchronization adjustment completion notification or a position detection completion notification, via the communication section 61 from the receiving device 1a which is the counterpart device. The synchronization adjustment completion notification indicates the completion of synchronization adjustment between the touch panels 14. The position detection completion notification indicates the completion of detection of the position of the transmitting device 1b.

The communication section 61 performs data transmission and reception. Wireless communications used by the communication section 61 are short-range wireless communications including, for example, WiFi, NFC, and Bluetooth (registered trademark).

The storage section 62 stores, for example, the control programs to control the members and application programs, wherein the control programs and the application programs are executed by the control section 60. The storage section 62 is constituted by a non-volatile storage device including, for example, Read Only Memory (RAM) and a flash memory. As described earlier, the temporary memory section is constituted by a volatile storage device such as RAM. Alternatively, the storage section 62 may further serve as the temporary memory section.

<Flowchart>

With reference to FIG. 22, the description below deals with a flow of processes performed by the transmitting device 1b. FIG. 22 is a flowchart illustrating the flow of the processes performed by the transmitting device 1b.

First, the touch panel 14 included in the transmitting device 1b is assumed to be operating in the "normal mode" (S1). The data transmitting and receiving section 603 determines whether it has received a synchronization adjustment completion signal indicating that, after the receiving device 1a which is the counterpart device detected contact of the transmitting device 1b or approach thereof, the receiving device 1a has performed adjustment for synchronization and then completed that adjustment (S2). In a case where the data transmitting and receiving section 603 has received the synchronization adjustment completion signal (YES in S2), the data transmitting and receiving section 603 notifies the mode changing section 602 of the reception of the synchronization adjustment completion signal.

The mode changing section 602, upon receipt of the notification, switches the mode to the "position detection mode" (S3). The drive controlling section 601 controls driving of the touch panel 14 according to the "position detection mode". Then, the data transmitting and receiving section 603 determines whether the position detection completion notification has been received (S4). In a case where the data transmitting and receiving section 603 has received the position detection completion notification (YES in S4), the data transmitting and receiving section 603 transmits the predetermined data via the communication section 61 or the touch panel 14 (S5).

[Details of (Receiving-End) Display Device]

The description below deals with a case where the display device 2 is a receiving end that receives a pulse signal, i.e. a case where the display device 2 is the receiving device 1a.

Note that in a case where the transmitting device 1b, which is the counterpart device, contacts or approaches the display region P of the receiving device 1a, the touch panel 14 included in the receiving device 1a simply needs to detect that contact or that approach within the display region P (see (b) through (d) of FIG. 13).

Thus, in this arrangement, the receiving device 1a does not necessarily require to be such that a minimum distance between the touch panel 14 and the outside surface B of the casing 17 (receiving-end casing) is not larger than a detectable distance, within which the touch panel 14 is capable of detecting (i) the contact of the detection target object with the outside surface B or (ii) the approach of the detection target object to the outside surface B (i.e. the receiving device 1a does not necessarily require to have a narrow frame).

<Configuration of Control Section>

Figure 1:
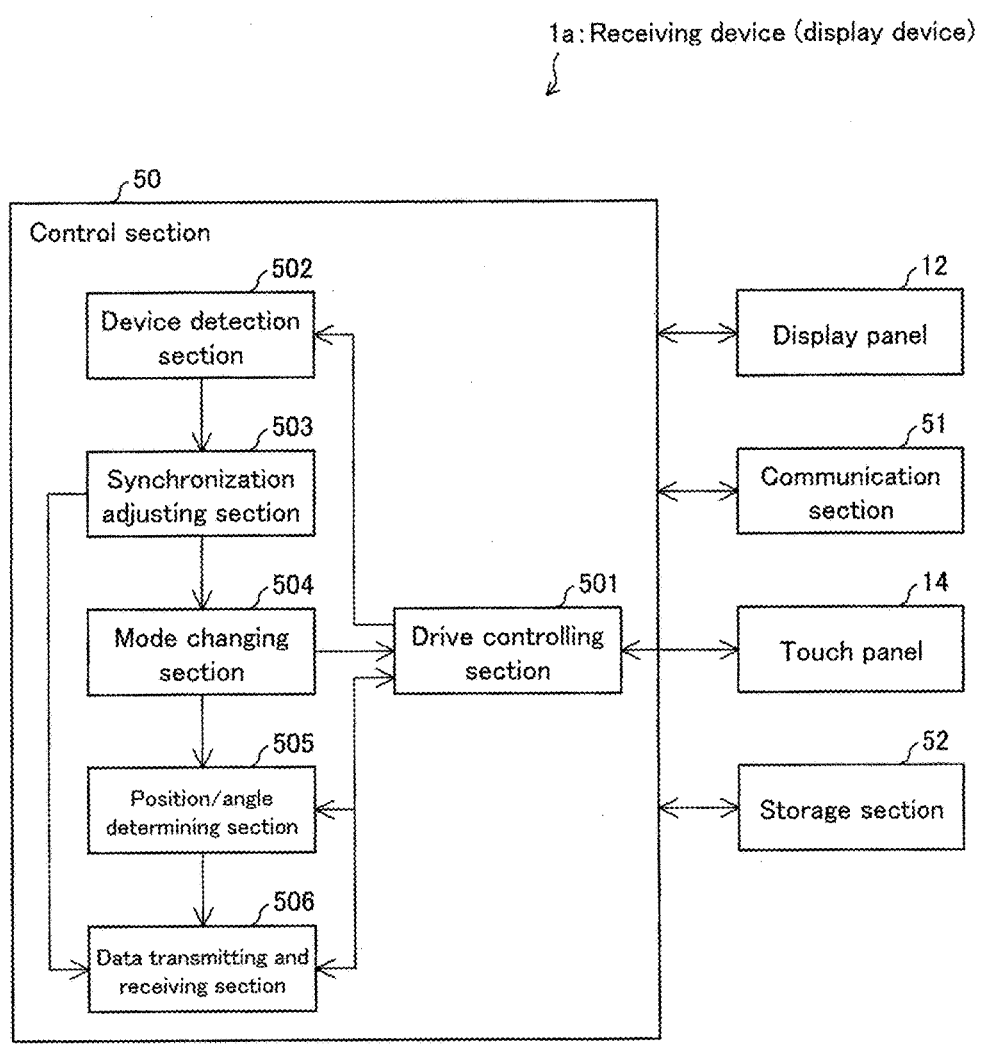
FIG. 1 is a diagram illustrating an example functional block of a control section included in a display device (receiving device) of an embodiment of the present invention.

The receiving device 1a mainly includes the display panel 12 (receiving-end display screen), the touch panel 14 (receiving-end touch panel), the control section 50, a communication section 51, and a storage section 52 (see FIG. 1). The display panel 12 has been described earlier, and descriptions thereof are therefore omitted. Further, the control section 50, the communication section 51, and the storage section 52 have the same basic functions as those of the control section 60, the communication section 61, and the storage section 62, respectively. Thus, descriptions of the control section 50, the communication section 51, and the storage section 52 are omitted.

The touch panel 14 has the basic configuration as described earlier. The sense line SL of the touch panel 14 included in the receiving device 1a is capable of receiving at least one of the pulse signals applied to the respective drive lines DL1 through DLn of the touch panel 14 included in the transmitting device 1b which has contacted or approached the receiving device 1a.

The control section 50 mainly includes the drive controlling section 501 (receiving-end drive controlling section), a device detection section 502, a synchronization adjusting section 503 (changing section), a mode changing section 504, a position/angle determining section 505 (determining section), and a data transmitting and receiving section 506.

In the same manner as the drive controlling section 601, the drive controlling section 501, by controlling the TP controller 33, controls driving of the drive line driving circuit 41 and the sense line driving circuit 42 in the touch panel 14 according to a mode determined by the mode changing section 504, i.e. according to either the "normal mode" or the "position detection mode".

In the "normal mode", the drive controlling section 501 performs drive control in accordance with the aforementioned orthogonal sequence driving scheme (or the sequential driving scheme) (CASE 2 in (b) of FIG. 21).

In the "position detection mode", the drive controlling section 501 controls the sense line driving circuit 42 to perform drive control in accordance with the orthogonal sequence driving scheme (or the sequential driving scheme), whereas the drive controlling section 501 controls the drive line driving circuit 41 so that the drive line driving circuit 41 stops application of pulse signals to the drive lines DL1 through DLn (receiving-end drive lines) by setting the drive lines DL1 through DLn to have a constant potential or a high impedance (Hi Z) (CASE 1 in (a) of FIG. 21). In the CASE 1, an increase in performance (S/N ratio) of the touch panel 14, i.e. an increase in accuracy of position detection is achieved.

Even in the "position detection mode", the drive controlling section 501, as with the drive controlling section 601, may perform drive control in accordance with the aforementioned orthogonal sequence driving scheme (or the sequential driving scheme) in the same manner as in the "normal mode".

The drive controlling section 501 controls, in either of these operation modes, so that a process of reading electric charge (output signal Vout) from the sense line SL (receiving-end sense line) is performed. This allows, when the transmitting device 1b contacts or approaches the receiving device 1a, determining which of the sense lines SL in the touch panel 14 included in the receiving device 1a has received the pulse signal having been transmitted from the touch panel 14 included in the transmitting device 1b.

The device detection section 502 detects whether the transmitting device 1b as the counterpart device has contacted or approached the receiving device 1a, (1) by determining whether coupling capacitance has occurred between (i) the sense line SL of the touch panel 14 included in the receiving device 1a and (ii) any of the drive lines DL1 through DLn of the touch panel 14 included in the transmitting device 1b or (2) by determining whether a change in capacitance Cf (mutual capacitance) has occurred.

The determination (1) is performed in, for example, a situation where the touch panel 14 included in the transmitting device 1b is being driven. In this case, contact of the transmitting device 1b with the receiving device 1a or approach thereof to the receiving device 1a causes the occurrence of coupling capacitance, with which a change in output signal Vout occurs. The change in output signal Vout serves as a trigger for detection of the transmitting device 1b.

At the time when the determination is performed by the device detection section 502, the adjustment for synchronization is not performed by the synchronization adjusting section 503. Accordingly, a pulse signal transmitted from the transmitting device 1b is received as merely noise by the receiving device 1a. The device detection section 502 generates a signal distribution as illustrated in FIG. 23 by analyzing the output signal Vout indicating that noise. That is, obtaining the signal distribution (noise distribution) as illustrated in FIG. 23 allows the device detection section 502 to determine that the transmitting device 1b has contacted or approached.

The determination (2) is performed in, for example, a situation where the touch panel 14 included in the transmitting device 1b is not being driven (e.g. low-frequency driving during standby). In this case, the coupling capacitance occurring in the case (1) does not occur. Thus, as in the case with normal detection, i.e. detection of contact of a finger or the like or approach thereof, a change in output signal Vout due to a decrease in capacitance Cf serves as a trigger for detection of contact of the transmitting device 1b or approach thereof.

The synchronization adjusting section 503 adjusts synchronization between a pulse signal received from the touch panel 14 included in the transmitting device 1b and a pulse signal applied to the touch panel 14 included in the receiving device 1a so that these pulse signals are brought into synchronization with each other. This allows the position/ angle determining section 505 to analyze an output signal based on the pulse signal transmitted from the transmitting device 1b. Details of processes performed by the synchronization adjusting section 503 are described later.

The mode changing section 504, as with the mode changing section 602, selects the operation mode of the touch panel 14 between the "normal mode" and the "position detection mode."

The position/angle determining section 505 determines the position of the transmitting device 1b in relation to the receiving device 1a by judging which of a plurality of sense lines SL in the touch panel 14 included in the receiving device 1a has received the pulse signal transmitted from the touch panel 14 included in the transmitting device 1b.

Further, the position/angle determining section 505 performs the judgment as to which of the sense lines SL has received the pulse signal, by detecting a change in capacitance value which change occurs in at least one of the sense lines SL of the receiving device 1a due to a coupling capacitance that has occurred between the at least one of the sense lines of the receiving device 1a and at least one of the drive lines DL of the transmitting device 1b.

Details of processes performed by the position/angle determining section 505 are described later.

The data transmitting and receiving section 506 receives, via the touch panel 14, the predetermined data transmitted from the transmitting device 1b. Alternatively, the data transmitting and receiving section 506 may receive the predetermined data via the communication section 51. Further, the data transmitting and receiving section 506 transmits the synchronization adjustment completion notification or the position detection completion notification to the transmitting device 1b, which serves as the counterpart device, via the communication section 61.

<Flowchart>

With reference to FIG. 24, the description below deals with a flow of processes performed by the receiving device 1a. FIG. 24 is a flowchart illustrating the flow of the processes performed by the receiving device 1a.

First, the touch panel 14 included in the receiving device 1a is assumed to be operating in the normal mode (S11).

When the transmitting device 1b contacts or approaches the receiving device 1a, a coupling capacitance occurs between (i) any one of the drive lines DL1 to DLn of the touch panel 14 included in the transmitting device 1b and (ii) a sense line SL of the touch panel 14 included in the receiving device 1a. This causes the sense line SL to receive a pulse signal transmitted from the touch panel 14 of the transmitting device 1b (S12). By recognizing the receipt of the pulse signal (i.e. the receipt of an output signal Vout based on the pulse signal), the device detection section 502 detects that the transmitting device 1b has contacted or approached the receiving device 1a (S13).

Next, upon receiving from the device detection section 502 a notification indicating that the transmitting device 1b has been detected, the synchronization adjusting section 503 adjusts synchronization of pulse signals as described above (S14), and then determines whether or not the pulse signals have been synchronized (S15). In a case where it is determined that the pulse signals have been synchronized (YES in S15), the synchronization adjusting section 503 notifies the mode changing section 504 that the pulse signals have been synchronized. In so doing, the synchronization adjusting section 503 causes the data transmitting and receiving section 506 to transmit, via the communication section 51, a synchronization adjustment completion notification to the transmitting device 1b.

Upon receiving the notification, the mode changing section 504 makes switching to the "position detection mode" (S16). The drive controlling section 501 (i) controls driving of the touch panel 14 in accordance with the position detection mode and (ii) notifies the position/angle determining section 505 that the switching has been made. Then, upon receiving, via the sense line SL of the receiving device 1a, the output signal Vout based on the pulse signal supplied in the touch panel 14 of the transmitting device 1b (S17), the drive controlling section 501 notifies the position/angle determining section 505 that the output signal Vout has been received.

Then, the position/angle determining section 505 analyzes the incoming output signal Vout based on the pulse signal (S18), and then determines a position (or angle) of the transmitting device 1b (S19). In so doing, the position/angle determining section 505 causes the data transmitting and receiving section 506 to transmit, via the communication section 51, a position detection completion notification to the transmitting device 1b.

Then, the data transmitting and receiving section 506 receives predetermined data which has been transmitted from the transmitting device 1b via the communication section 61 or via the touch panel 14 of the transmitting device 1b (S20). This allows a process in accordance with a predetermined function being performed by the transmitting device 1b to be carried out.

<Synchronization Process>

Next, the description below deals with synchronization adjustment (synchronization adjustment between the touch panels 14) performed by the synchronization adjusting section 503, with reference to FIGS. 25 through 28.

The above-described synchronization adjusting section 503 described above adjusts synchronization of the two pulse signals by making a change to a timing with which a pulse signal is applied to a drive line DL of the receiving device 1a. Specifically, the change is made in accordance with a correlation value (autocorrelation value) between (i) a pulse signal which was applied to at least one of the drive lines DL1 to DLn of the touch panel 14 of the transmitting device 1b and then was received by a sense line SL of the touch panel 14 of the receiving device 1a and (ii) a predetermined pattern signal (replica pattern signal) corresponding to a pulse signal applied to at least one of the drive lines DL1 to DLn of the touch panel 14 of the receiving device 1a.

(a) of FIG. 25 is a diagram illustrating an equivalent circuit of a synchronization adjustment circuit 533 that generates a correlation output signal with which the synchronization adjusting section 503 performs synchronization adjustment. (b) of FIG. 25 is a view illustrating an example input/output table to which an exclusive OR circuit 533a refers.

As illustrated in (a) of FIG. 25, the synchronization adjustment circuit 533 includes the exclusive OR circuit 533a and a correlator 533b.

In a case where a sense line SL of the receiving device 1a receives an encoded pulse signal from a drive line DL of the transmitting device 1b, the pulse signal as an input signal is supplied to the exclusive OR circuit 533a.

Upon receiving the input signal and a replica pattern signal, the exclusive OR circuit 533a transmits, to the correlator 533b, an output signal in accordance with the input/output table illustrated in (b) of FIG. 25. The replica pattern signal is a signal to be synchronized with a pulse signal applied to a drive line DL of the receiving device 1a. In a case where an offset and/or period of the replica pattern signal are/is changed, an offset and/or period of the pulse signal are/is changed accordingly.

An example of the replica pattern signal is a pseudo-random pattern signal. That is, for an adjustment of synchronization of the two signals, an autocorrelation characteristic of a pseudo-random code is to be used.

In order to adjust the synchronization of the two pulse signals, for example, an autocorrelation characteristic of a pseudo-random code is to be used. During the adjustment of the synchronization, an encoded pulse signal (pseudo-random pattern signal) received from the drive line DL of the transmitting device 1b is a signal unknown to the receiving device 1a. Specifically, a sequence, a code length, a timing, and a period of a pseudo-random code of the pulse signal are unknown.

Therefore, in order to search for a sequence (e.g. M sequence) or the like of the pseudo-random code, the replica pattern signal is changed such that a correlation output signal becomes at a maximum value. Specifically, the maximum value of a correlation value is searched for by making changes to the sequence, the code length, the deviation (offset) of the timing, and the period of the pseudo-random code of the replica pattern signal. Then, when the maximum value is obtained, the pseudo-random code of the pulse signal received from the drive line DL of the transmitting device 1b becomes known. A timing, with which a pulse signal is applied to the drive line DL of the receiving device 1a, is changed by use of the pseudo-random code that has become thus known, so that the timing is in line with a timing with which a pulse signal is applied to the drive line DL of the transmitting device 1b. This allows the receiving device 1a and the transmitting device 1b to be synchronized with each other.

Upon receiving the output signal, the correlator 533b (i) generates a correlation output signal representing a correlation between the input signal and the replica pattern signal and then (ii) transmits the correlation output signal to the synchronization adjusting section 503. The correlator 533b is designed to (i) count upwards in a case where a value of the output signal illustrated in (b) of FIG. 25 is 0, that is, in a case where the two inputs match each other and (ii) count downwards in a case where the value of the output signal is 1, that is, in a case where the two inputs are different.

FIGS. 26 and 27 are charts each illustrating an input signal, a replica pattern signal, and a correlation output signal which is generated by the correlator 533b. FIG. 26 illustrates a case where the input signal and the replica pattern signal are not synchronized, whereas FIG. 27 illustrates a case where the input signal and the replica pattern signal are synchronized.

In the case where, as illustrated in FIG. 26, the input signal and the replica pattern signal are not synchronized, the upward counting (Cup) and the downward counting (Cdown) both appear. This causes the value of the correlation output signal to be around 0. Note that while FIG. 26 illustrates only offsets in terms of deviation, there also exists deviations of timings as well.

On the other hand, in a case where, as illustrated in FIG. 27, the input signal and the replica pattern signal are synchronized, only the upward counting (Cup) appears. This causes the correlation value to be at the maximum value. Assuming that the code length of the encoded pulse signal (pseudo-random code) from the drive line DL of the transmitting device 1b is n, the maximum value of the correlation value is n.

Therefore, by receiving the correlation output signal from the correlator 533b and then determining whether the correlation value indicated by the correlation output signal is at a value around 0 or at the maximum value (n), the synchronization adjusting section 503 can determine whether or not there is synchronization between (i) a pulse signal applied to at least one of the drive lines DL1 to DLn of the transmitting device 1b and (ii) a pulse signal applied to at least one of the drive lines DL1 to DLn of the receiving device 1a.

Specifically, in a case where it is determined that the correlation value is a value around 0, the synchronization adjusting section 503 determines that the two pulse signals at are not synchronized. In contrast, in a case where it is determined that the correlation value is the maximum value, the synchronization adjusting section 503 determines that there is synchronization between (i) the pulse signal applied to at least one of the drive lines DL1 to DLn of the transmitting device 1b and (ii) the pulse signal applied to at least one of the drive lines DL1 to DLn of the receiving device 1a.

In a case where it is determined that the two pulse signals are not synchronized, the synchronization adjusting section 503 makes a change(s) to the offset and/or period of the replica pattern signal until the correlation value becomes the maximum value. Along with the change(s), a timing with which a pulse signal is applied to the drive line DL of the receiving device 1a is also changed. This is how the synchronization adjusting section 503 performs the synchronization adjustment of the two pulse signals.

Note that in a case where the position of the transmitting device 1b is to be detected, there are (i) a driving scheme to be employed in the case of the "normal mode" and (ii) a driving scheme to be employed in the case of the "position detection mode" (see FIG. 21).

In a case where the position of the transmitting device 1b is to be detected while the transmitting device 1b and the receiving device 1a are each switched to the "position detection mode," the two pulse signals are synchronized so that the position detection operation is possible during normal operations (TP operations) of the touch panels 14 as illustrated in (a) of FIG. 28. On the other hand, in a case where the position of the transmitting device 1b is to be detected while the transmitting device 1b and the receiving device 1a each continue operating in the "normal mode," the two pulse signals are synchronized so that the position detection operation is possible during the normal operations of the touch panels 14 as illustrated in (b) of FIG. 28.

Upon completion of the synchronization adjustment, the receiving device 1a notifies the transmitting device 1b that the synchronization adjustment has been completed, and then receives, from the transmitting device 1b, basic information on the touch panel 14 of the transmitting device 1b. The basic information can be received via the communication section 61 or via data communications between the touch panels 14.

(Function of Transmitting Device 1b During Synchronization Process)

On the other hand, the transmitting device 1b can be considered as a device which is, in order to realize the synchronization process, configured to cause, when the receiving device 1a approaches or comes into contact with the transmitting device 1b, the touch panel 14 of the receiving device 1a to receive a pulse signal applied to at least one of the drive lines DL1 to DLn of the touch panel 14 of the transmitting device 1b, so that the receiving device 1a is enabled to change a timing with which a pulse signal is applied to at least one of the drive lines DL1 to DLn of the receiving device 1a.

In this case, the information processing system 5 illustrated in FIG. 13 can be considered as a synchronization processing system including the transmitting device 1b and the receiving device 1a which are configured to perform the synchronization process.

Note that a method of synchronizing the two pulse signals does not need to be based on the process of the receiving device 1a receiving a pulse signal from the transmitting device 1b. For example, the synchronization adjustment performed by the synchronization adjusting section 503 can be realized by receiving information from the transmitting device 1b via wireless communications. In such a case, the transmitting device 1b transmits, to the receiving device 1a, information on a pulse signal applied to a drive line DL of the transmitting device 1b (i.e. information containing information on (i) a sequence of a code for use in encoding of the pulse signal, (ii) a code length, (iii) a period, and the like). Then, the receiving device 1a adjusts, in accordance with the information thus received, a timing with which a pulse signal is applied to a drive line DL of the receiving device 1a. This causes the pulse signal applied to the drive line DL to be synchronized with the pulse signal used in the transmitting device 1b.

<Position Detection Process>

A position detection process while the transmitting end and the receiving end have a positional relation as illustrated in each of (a) through (d) of FIG. 13 will be described next. Note that in the following description, the drive lines DL1 to DLn will be collectively referred to as a drive line DL.

(Detection of Positions of Adjacent Devices)

With reference to FIGS. 29 through 31, the following description will first discuss an example of the position detection process in a case where an outside surface (herein referred to as "outside surface B") of the casing 17 of the transmitting device 1b is adjacent to an outside surface B of the casing 17 of the receiving device 1a (i.e. in the case illustrated in (a) of FIG. 13).

(a) of FIG. 29 is a view (i) schematically illustrating the receiving device 1a and the transmitting device 1b with the two outside surfaces B not being adjacent to each other and (ii) illustrating an equivalent circuit. (b) of FIG. 29 is a view (i) schematically illustrating the receiving device 1a and the transmitting device 1b with the two outside surfaces B adjacent to each other (i.e. an arrangement in which the outside surface B of the transmitting device 1b comes into contact with or approaches the outside surface B of the receiving device 1a) and (ii) illustrating an equivalent circuit. Note that unless particularly stated otherwise, the description below assumes that the drive line driving circuit 41 of the transmitting device 1b is in a driving state.

In a case where, as illustrated in (a) of FIG. 29, the transmitting device 1b and the receiving device 1a are not adjacent to each other, there occurs no coupling capacitance between the drive line DL of the transmitting device 1b and a sense line SL of the receiving device 1a. This prevents the sense line SL of the receiving device 1a from receiving a pulse signal applied to the drive line DL of the transmitting device 1b.

On the other hand, in a case where, as illustrated in (b) of FIG. 29, the transmitting device 1b and the receiving device 1a are adjacent to each other, there occurs a coupling capacitance between the drive line DL of the transmitting device 1b and the sense line SL of the receiving device 1a. This allows the sense line SL of the receiving device 1a to receive the pulse signal applied to the drive line DL of the transmitting device 1b.

An example of the process of the receiving device 1a to detect a position of the transmitting device 1b while the receiving device 1a and the transmitting device 1b are thus adjacent will be described next with reference to FIGS. 30 and 31. (a) and (b) of FIG. 30 are each a view illustrating a positional relation between the transmitting device 1b and the receiving device 1a. (c) of FIG. 30 is a view illustrating an example position detection table. (a) and (c) of FIG. 31 are each a view schematically illustrating an equivalent circuit during the position detection process. (b) and (d) of FIG. 31 are views illustrating signal distributions corresponding to (a) and (c) of FIG. 31, respectively.

The following description will discuss an example in which the respective touch panels 14 of the transmitting device 1b and of the receiving device 1a each include drive lines DL and sense lines SL which are (i) identical in number (4×4) and (ii) identical in line pitch.

(Signal Distribution-Based Position Detection)

An example, in which the position/angle determining section 505 detects a position of the transmitting device 1b by use of the signal distribution (described later), will be described first.

In a case where the transmitting device 1b and the receiving device 1a are each driving by an orthogonal sequence driving scheme at least in the "normal mode," pulse signals are respectively applied to the drive lines DL1 to DL4 of the transmitting device 1b in accordance with the code sequences di as illustrated in FIG. 18. In addition, by receiving the pulse signals, the receiving device 1a (i) calculates output sequence vectors s4 (output signals (Vout (Y1), Vout (Y2), Vout (Y3), Vout (Y4))) described earlier and (ii) carries out inner product operation di·s4. In accordance with a result of the inner product operation, the position/angle determining section 505 calculates (i) a location of a coupling capacitance that occurred between a drive line DL of the transmitting device 1b and a sense line SL of the receiving device 1a and (ii) a capacitance value of the coupling capacitance at the location. In the cases illustrated in (a) and (b) of FIG. 30, the position/angle determining section 505 calculates (i) a location of a coupling capacitance that occurs between each of the drive lines DL1 to DL4 and at least one of detection electrodes SE1 to SE4 of the sense line SL1 and (ii) a capacitance value of the coupling capacitance at the location.

Then, the position/angle determining section 505 generates a signal distribution (capacity map) such as those of (a) and (b) of FIG. 31 by substituting the capacitance values of the coupling capacitances and their respective locations into a three-dimensional space which is formed by (1) a plane (x-y plane) represented by two axes which are (i) a drive line DL and a sense line SL of the transmitting device 1b or (ii) a drive line DL and a sense line SL of the receiving device 1a and (2) an axis (z-axis) which is orthogonal to the plane and which represents the capacitance values of the coupling capacitances. Then, based on the signal distribution thus generated, the position/angle determining section 505 determines the position of the transmitting device 1b in relation to the receiving device 1a.

In other words, the position/angle determining section 505 determines the position by generating a distribution (signal distribution) of capacitance values which have occurred at the sense line SL due to the coupling capacitance, the distribution showing a relationship between (i) the capacitance values and (ii) a position of at least one of the touch panels 14 of the receiving device 1a and of the transmitting device 1b, at which touch panels 14 the capacitance values have occurred.

In (b) and (d) of FIG. 31, "1" to "4" (on an x-axis of each of (b) and (d) of FIG. 31) indicate positions on a sense line SL1, which positions respectively correspond to the drive lines DL1 to DL4 of the transmitting device 1b. In addition, "S1" to "S4" (on a y-axis of each of (b) and (d) of FIG. 31) indicate the four sense lines SL of the receiving device 1a, respectively. Specifically, "1" indicates the sense line SL1 that is closest to the transmitting device 1b. Furthermore, "0" to "1.6" (on a z-axis of each of (b) and (d) of FIG. 31) indicate capacitance values of coupling capacitances obtained from the sense lines SL.

Note that a method of identifying the x-axis and the y-axis is not limited to the method described above. For example, the x-axis and the y-axis can represent a drive line DL and a sense line SL of the receiving device 1a, respectively. Alternatively, the x-axis and the y-axis can represent a sense line SL and a drive line DL of the transmitting device 1b, respectively.

For example, in a case illustrated in (a) of FIG. 30 (i.e. a case where positional shifting is not occurring), four coupling capacitances occur between the respective drive lines DL1 to DL4 of the transmitting device 1b and the sense line SL1, as illustrated in (a) of FIG. 31. In this case, as illustrated in (b) of FIG. 31, the position/angle determining section 505 obtains a signal distribution in which a capacitance value reaches a maximum level at "S1" to "S4" of the sense line SL1 at which the coupling capacitances are occurring.

On the other hand, in a case where, as illustrated in (c) of FIG. 31, the receiving device 1a is shifted in an upward direction of the view (i.e. a direction from the drive line DL4 toward the drive line DL1) by two drive lines DL of the transmitting device 1b, two coupling capacitances respectively occur between the drive line DL1 of the transmitting device 1b and the sense line SL1 (the detection electrode SE3 illustrated in (a) of FIG. 30) and between the drive line DL2 of the transmitting device 1b and the sense line SL2 (the detection electrodes SE4 illustrated in (a) of FIG. 30). In so doing, as illustrated in (d) of FIG. 31, the position/angle determining section 505 obtains a signal distribution in which a capacitance value reaches a maximum level at "S1" and "S2" of the sense line SL1 at which the coupling capacitances are occurring.

The position/angle determining section 505 thus determines a positional relation of a drive line DL of the transmitting device 1b to a sense line SL of the receiving device 1a by generating a signal distribution showing a relationship between (i) a capacitance value of a coupling capacitance determined in accordance with an output signal Vout and (ii) a location of the touch panel 14 of the receiving device 1a or the touch panel 14 of the transmitting device 1b, at which touch panel 14 the coupling capacitance occurred. This allows the position/angle determining section 505 to determine the position of the transmitting device 1b with a precision in units smaller than a line pitch (approximately 5 mm) of a drive line DL or a sense lines SL. In addition, by performing general interpolation, the position/angle determining section 505 can detect the position of the transmitting device 1b with a higher degree of accuracy (i.e. in units of approximately 0.1 mm (which is at least approximately equal to or less than 1/10 of the line pitch and in units of display pixel pitch)).

Note that a pulse signal to be applied to a drive line DL of the transmitting device 1b can be supplied with line identification information that identifies the drive line DL. This allows the position/angle determining section 505 of the receiving device 1a to determine, by analyzing the line identification information, which part of the outside surface B of the casing 17 coming into contact or approaching corresponds to the drive line DL of the transmitting device 1b.

In a case where the transmitting device 1b and the receiving device 1a are each driven by a sequential driving scheme during the "normal mode," the position/angle determining section 505 can generate a signal distribution as is the case of the orthogonal sequence driving scheme. Specifically, the position/angle determining section 505 can generate a signal distribution by calculating a capacitance value of a coupling capacitance and a location of the coupling capacitance by carrying out inner product operation as described above in accordance with each of output sequence vectors (output signals Vout (X1), Vout (X2), Vout (X3) and Vout (X4)).

(Example of Position Detection by Use of Position Detection Table)

Other than an operation of detecting the position of the transmitting device 1b by use of a signal distribution as described above, it is alternatively possible to perform a position detection operation by use of a position detection table as illustrated in (c) of FIG. 30. The description below deals with an example of the position detection operation by use of the position detection table. The example will be discussed on the assumption that the orthogonal sequence driving scheme is employed at least in the "normal mode."

(a) of FIG. 30 illustrates a case where drive lines DL (d1 to d4 in (a) of FIG. 30) of the transmitting device 1b and corresponding four detection electrodes 31a (receiving-end detection electrodes) (SE1 to SE4 in (a) of FIG. 30) forming the sense line SL1 of the receiving device 1a are adjacent to each other so as to face each other.

In the present example, an amount by which the transmitting device 1b and the receiving device 1a are shifted from each other (hereinafter referred to as "position shifting amount") is 0 in the case of the positional relation illustrated in (a) of FIG. 30.

In contrast, (b) of FIG. 30 illustrates a case where drive lines DL (d1 to d3 in (b) of FIG. 30) of the transmitting device 1b and corresponding three detection electrodes 31a (SE2 to SE4 in (b) of FIG. 30) forming the sense line SL1 of the receiving device 1a are adjacent to each other so as to face each other. That is, there is no detection electrode 31a of the receiving device 1a, which detection electrode 31a faces the drive line DL4 of the transmitting device 1b. There is also no drive line DL of the transmitting device 1b, which drive line DL faces the detection electrode SE1 of the receiving device 1a.

In the present example, the position shifting amount between the transmitting device 1b and the receiving device 1a is determined to be +1 in a case where the receiving device 1a is thus shifted in an upward direction of the view (i.e. direction from the drive line DL4 toward the drive line DL1) from the transmitting device 1b by one drive line DL.

That is, in the present example, (i) the position shifting amount is expressed in a positive value in a case where the receiving device 1a is shifted from the transmitting device 1b in the upward direction as compared with the state illustrated in (a) of FIG. 30 and (ii) the position shifting amount is expressed in a negative value in a case where the receiving device 1a is shifted from the transmitting device 1b in a downward direction (i.e. direction from the drive lines DL1 toward the drive line DL4) as compared with the state illustrated in (a) of FIG. 30.

In the case illustrated in (a) of FIG. 30, coupling capacitances occur between the drive lines DL1 to DL4 of the transmitting device 1b and the corresponding detection electrodes SE1 to SE4 of the sense line SL1 of the receiving device 1a. Then, in a case where inner product operation as described above is carried out and then respective capacitance values of the coupling capacitances are each C, (i) capacitance values of coupling capacitances when pulse signals are received a first time are 4C, (ii) capacitance values of coupling capacitances when pulse signal are received a second time are 0, (iii) capacitance values of coupling capacitances when pulse signal are received a third time are 0, and (iv) capacitance values of coupling capacitances when pulse signal are received a fourth time are 0.

On the other hand, in the case illustrated in (b) of FIG. 30, coupling capacitances occur between drive lines DL1 to DL3 of the transmitting device 1b and the corresponding detection electrodes SE2 to SE4 of the sense line SL1 of the receiving device 1a, whereas no coupling capacitance occurs at the drive line DL4.

In this case, no coupling capacitance corresponding to C4 of the above described output signals Vout (Y1) to Vout (Y4) occurs (i.e. C4=0). Therefore, (i) the capacitance values of the coupling capacitances when pulse signals are received a first time are 3C, (ii) capacitance values of coupling capacitances when pulse signals are received a second time are 1C, (iii) capacitance values of coupling capacitances when pulse signals are received a third time are 1C, and (iv) capacitance values of coupling capacitances when pulse signals are received a fourth time are −1C.

In a case where the receiving device 1a is thus shifted by a drive line DL (or drive electrode 32) of the transmitting device 1b (i.e. by a detection electrode 31a (sense line SL) of the receiving device 1a), a coupling capacitance corresponding to each of C1 to C4 of the above described output signals Vout (Y1) to Vout (Y4) varies. This predetermined particular patterns are shown in the position detection table illustrated in (c) of FIG. 30.

As illustrated in (c) of FIG. 30, in a case where, for example, the receiving device 1a is shifted in the upward direction by two drive lines DL of the transmitting device 1b ("+2" in (c) of FIG. 30) as compared with the state illustrated in (a) of FIG. 30, no coupling capacitance corresponding to C3 or C4 of the above described output signals Vout occurs. In a case where the receiving device 1a is shifted in the downward direction by one drive line DL of the transmitting device 1b ("−1" in (c) of FIG. 30) as compared with the state illustrated in (a) of FIG. 30, no coupling capacitance corresponding to C1 of the above described output signal Vout occurs.

Combinations of capacitance values, which combinations correspond to respective position shifting amounts and are illustrated in (c) of FIG. 30 (e.g. a combination of capacitance values (3C, 1C, 1C, −1C) corresponding to the position shifting amount of "+1"), show the particular patterns.

Note that a predetermined application pattern refers to a pattern in which voltages are applied to the respective drive lines DL per period as illustrated in FIG. 19. Specifically, the predetermined application pattern refers to a combination of values of voltages which are simultaneously applied, per period, to the respective drive lines DL of the transmitting device 1b and which are equal in number to the drive lines DL of the transmitting device 1b. At least the drive controlling section 601 applies, in accordance with the predetermined application pattern, pulse signals to the respective drive lines DL of the transmitting device 1b.

The predetermined application pattern can be considered to be defined such that a pattern of capacitance values which are obtained when coupling capacitances occur in accordance with the predetermined application pattern and which are equal in number to the drive lines DL of the transmitting device 1b, matches one of a predetermined number of the particular patterns associated in advance with a respective predetermined number of positional relations of at least one of the drive lines DL of the transmitting device 1b to a sense line SL of the receiving device 1a (see (c) of FIG. 30).

The position/angle determining section 505, for example, calculates capacitance values obtained from the respective output signals Vout (Y1) to Vout (Y4), and then compares a combination of the capacitance values with the particular patterns shown in the position detection table. Then, in accordance with a result of the comparison, the position/angle determining section 505 determines a position of the transmitting device 1b in relation to the receiving device 1a (e.g. the transmitting device 1b being adjacent to the receiving device 1a such that the detection electrodes SE2 to SE4 of the receiving device 1a face the corresponding drive lines DL1 to DL3 of the transmitting device 1b).

More specifically, by referring to the position detection table illustrated in (c) of FIG. 30, the position/angle determining section 505 determines which of the particular patterns shown in the position detection table, which particular patterns are indicative of the respective combinations of the capacitance values, matches the pattern of the capacitance values (which are equal in number to the drive lines DL of the transmitting device 1b) obtained at the occurrence of the coupling capacitances at the sense line SL of the receiving device 1a.

Then, in accordance with a result of the determination, the position/angle determining section 505 determines a position of the drive line DL of the transmitting device 1b in relation to the sense line SL of the receiving device 1a. This allows the position of the transmitting device 1b to be accurately determined in units smaller than the line pitch unit. In addition, by interpolation, it is possible to accurately detect the position in units of display pixel pitch.

(Specific Example of Signal Distribution-Based Position Detection)

Next, the description below deals with a specific example of the above described signal distribution-based position detection. More specifically, the description below deals with a relationship between (i) how a drive line DL of transmitting device 1b and a sense line SL of the receiving device 1a are provided during a state illustrated in (a) of FIG. 13 and (ii) a signal distribution that is obtained when the receiving device 1a detects that the transmitting device 1b comes into contact with or approaches the receiving device 1a.

(1) In Case where Touch Panels are Identical in Shape

The relationship in a case where the touch panel 14 of the transmitting device 1b and the touch panel 14 of the receiving device 1a are identical in shape will be described first with reference to FIGS. 32 and 33. Note that the touch panels being identical in shape at least means that the two touch panels 14 (i) are identical in numbers of drive lines DL and of sense lines SL and (ii) are identical in line pitch of the drive lines DL and of the sense lines SL.

Note that the present example discusses, as a mere example, a case where the touch panel 14 of the receiving device 1a includes four drive lines DL and four sense lines SL.

FIG. 32 is a view illustrating each of relationships between (i) electrode arrangement of the transmitting device 1b and of the receiving device 1a and (ii) a signal distribution obtained when the contact or approach is detected. FIG. 32 illustrates cases where the receiving device 1a is shifted in the upward direction by two drive lines DL of the transmitting device 1b as shown in the "conceptual image" column.

(a) through (d) of FIG. 33 illustrate equivalent circuits corresponding to the cases 1 to 4 illustrated in FIG. 32, respectively, when the contact or approach is detected.

Examples of the arrangement of the drive lines DL of the transmitting device 1b and the sense lines SL of the receiving device 1a encompass the four patterns illustrated in FIG. 32. In each of the four patterns, a signal distribution ("output example") as described above is obtained. Note that the case 1 illustrated in FIG. 32 is a case where (i) the electrode arrangement is as illustrated in FIGS. 29 through 31 and (ii) a signal distribution is as illustrated in (d) of FIG. 31.

According to the electrode arrangement in each of the cases 1 to 3 of FIG. 32, it is possible to obtain a signal distribution that corresponds to position shifting unique to the case. Therefore, in the cases 1 to 3, the receiving device 1a can determine position shifting in a Y-axis direction. This allows the position of the transmitting device 1b in relation to the receiving device 1a to be accurately determined.

On the other hand, according to the electrode arrangement in the case 4, although position shifting is occurring, the signal distribution is similar to a signal distribution obtained in a case where no position shifting is occurring (see (a) of FIG. 31). Therefore, according to the electrode arrangement of the case 4, it is difficult to detect the position of the transmitting device 1b.

Therefore, in a case where the touch panels 14 are identical in shape, the receiving device 1a can accurately detect the position of the transmitting device 1b by using the transmitting device 1b and the receiving device 1a which have a relation in terms of electrode arrangement as illustrated in each of the cases 1 to 3.

(2) Case where Touch Panels Differ in Size (Case A)

Next, the relationship in a case where the touch panel 14 of the transmitting device 1b is larger in size than the touch panel 14 of the receiving device 1a will be described with reference to FIGS. 34 and 35.

Note that the touch panels 14 differing in size means that the two touch panels 14 (i) are different in numbers of drive lines DL and of sense lines SL and (ii) are identical in line pitch of the drive lines DL and of the sense lines SL.

Note that the present example discusses, as a mere example, a case where (i) the touch panel 14 of the receiving device 1a includes four drive lines DL and four sense lines SL and (ii) the touch panel 14 of the transmitting device 1b includes eight drive lines DL and four sense lines SL.

In each of signal distributions obtained by the position/angle determining section 505, "Sequence 1" to "Sequence 8" (y-axes in FIG. 34) respectively indicate positions, on the sense line SL1, of eight drive lines DL1 to DL8 of the transmitting device 1b. Anything other than the matters described above is similar to (b) and (d) of FIG. 31.

FIG. 34 is a view illustrating each of relationships between (i) electrode arrangement of the transmitting device 1b and of the receiving device 1a and (ii) a signal distribution obtained when the contact or approach is detected. FIG. 34 illustrates cases where the receiving device 1a is coming into contact with or approaching a side surface of the transmitting device 1b as shown in the "conceptual image" column.

(a) through (d) of FIG. 35 illustrate example equivalent circuits corresponding to the cases 1 to 4 illustrated in FIG. 34, respectively, when the contact or approach is detected.

Examples of the arrangement of the drive lines DL of the transmitting device 1b and the sense lines SL of the receiving device 1a encompass the four patterns illustrated in FIG. 34. According to the electrode arrangement of each of the cases 1 and 3, the signal distribution is configured such that capacitance values of coupling capacitances are at a maximum level in "Sequence 2" to "Sequence 5" corresponding to the drive lines DL of the transmitting device 1b.

According to the electrode arrangement of each of the cases 1 and 3 of FIG. 34, it is possible to obtain a signal distribution that corresponds to position shifting unique to the case. This allows the receiving device 1a to determine position shifting in a Y-axis direction.

On the other hand, according to the electrode arrangement of each of the cases 2 and 4, no change occurs to an obtained signal distribution even in a case where the positional relation with the transmitting device 1b changes. Therefore, according to the electrode arrangement of each of the cases 2 and 4, it is difficult to detect the position of the transmitting device 1b.

Therefore, in a case where the touch panels 14 differ in size as shown in the "conceptual image" column of FIG. 34, the receiving device 1a can accurately detect the position of the transmitting device 1b by using the transmitting device 1b and the receiving device 1a which are in a relation in terms of electrode arrangement as illustrated in each of the cases 1 and 3.

(3) Case where Touch Panels Differ in Size (Case B)

The relationship in a case where the touch panel 14 of the receiving device 1a is larger in size than the touch panel 14 of the transmitting device 1b will be described next with reference to FIGS. 36 and 37.

The present example discusses, as a mere example, a case where (i) the touch panel 14 of the receiving device 1a includes eight drive lines DL and eight sense lines SL and (ii) the touch panel 14 of the transmitting device 1b includes four drive lines DL and four sense lines SL.

FIG. 36 is a view illustrating each of relationships between (i) electrode arrangement of the transmitting device 1b and of the receiving device 1a and (ii) a signal distribution obtained when the contact or approach is detected. FIG. 36 illustrates cases where the receiving device 1a is coming into contact with or approaching a side surface of the transmitting device 1b as shown in the "conceptual image" column.

In each of the signal distributions in the "output example" column of FIG. 36, (i) "Sequence 1" to "Sequence 8" (y-axes in FIG. 36) respectively indicate the eight sense lines SL of the receiving device 1a and (ii) "1" to "8" (x-axes in FIG. 36) respectively indicate the eight drive lines DL of the receiving device 1a.

(a) through (d) of FIG. 37 illustrate example equivalent circuits corresponding to the cases 1 to 4 illustrated in FIG. 36, respectively, when the contact or approach is detected.

Examples of the arrangement of the drive lines DL of the transmitting device 1b and the sense lines SL of the receiving device 1a encompass the four patterns illustrated in FIG. 36. According to the electrode arrangement of each of the cases 2 and 3, the signal distribution is configured such that capacitance values of coupling capacitances are at a maximum level in the vicinity of "Sequence 2" to "Sequence 5" corresponding to the sense lines SL of the receiving device 1a.

According to the electrode arrangement of each of the cases 2 and 3 of FIG. 36, it is possible to obtain a signal distribution that corresponds to position shifting unique to the case. This allows the receiving device 1a to determine position shifting in a Y-axis direction.

On the other hand, according to the electrode arrangement of each of the cases 1 and 4, no change occurs to an obtained signal distribution even in a case where the positional relation with the transmitting device 1b changes. Therefore, according to the electrode arrangement of each of the cases 1 and 4, it is difficult to detect the position of the transmitting device 1b.

Therefore, in a case where the touch panels 14 differ in size as shown in the "conceptual image" column of FIG. 36, the receiving device 1a can accurately detect the position of the transmitting device 1b by using the transmitting device 1b and the receiving device 1a which are in a relation in terms of electrode arrangement as illustrated in each of the cases 2 and 3.

(4) Case where Devices Overlap

The following description will discuss, with reference to FIG. 38, a case where, as illustrated in (b) of FIG. 13, (i) the receiving device 1a and the transmitting device 1b overlap each other and (ii) a display-region side of the transmitting device 1b and a back surface (surface of the casing 17, which surface is opposite from the display region) of the receiving device 1a face each other. FIG. 38 is a cross-sectional view schematically illustrating the transmitting device 1b and the receiving device 1a in such a state.

As illustrated in FIG. 38, in a case where the receiving device 1a comes into contact with or approaches the transmitting device 1b so as to be placed on or over the transmitting device 1b, there occurs a coupling capacitance between (i) a drive line DL (drive electrode 32) of the touch panel 14 of the transmitting device 1b and (ii) a sense line SL (detection electrode 31a) of the touch panel 14 of the receiving device 1a. By recognizing a change in capacitance value of the coupling capacitance, the receiving device 1a can determine at which part of the transmitting device 1b the receiving device 1a is located.

FIG. 39 is a set of views illustrating equivalent circuits in cases where the receiving device 1a comes into contact with or approaches the transmitting device 1b so as to be placed on or over the transmitting device 1b.

As illustrated in (a) of FIG. 39, in a case where two side surfaces (two sides face each other) of the receiving device 1a have a narrow frame, coupling capacitances occur, when the receiving device 1a comes into contact with or approaches the transmitting device 1b so as to be placed on or over the transmitting device 1b, between (i) sense lines SL provided along the two side surfaces and (ii) the drive lines DL of the transmitting device 1b. This allows the sense lines SL of the receiving devices 1a to receive pulse signals applied to the drive lines DL of the transmitting device 1b.

On the other hand, as illustrated in (b) of FIG. 39, in a case where four side surfaces (all of four sides) of the receiving device 1a have a narrow frame, coupling capacitances occur, when the receiving device 1a comes into contact with or approaches the transmitting device 1b so as to be placed on or over the transmitting device 1b, between (i) sense lines SL provided along the four side surfaces and the detection electrodes 31a and (ii) the drive lines DL of the transmitting device 1b. In this case also, the sense lines SL and the detection electrodes 31a can receive the pulse signals.

Next, the following description will discuss, with reference to FIGS. 40 and 41, a relationship, in a case where the touch panel 14 of the receiving device 1a is placed on or over the touch panel 14 of the transmitting device 1b so as to overlap the touch panel 14 of the transmitting device 1b, between (i) arrangement of the drive lines DL of the transmitting device 1b and the sense lines SL of the receiving device 1a and (ii) a signal distribution obtained when the receiving device 1a detects that the transmitting device 1b comes into contact with or approaches the receiving device 1a.

An example, in which the two side surfaces of the receiving device 1a have a narrow frame as illustrated in (a) of FIG. 39, will be described first.

FIG. 40 is a view illustrating each of relationships between (i) electrode arrangement of the transmitting device 1b and of the receiving device 1a and (ii) a signal distribution obtained when the contact or approach is detected. FIG. 40 illustrates cases where the receiving device 1a is provided in the vicinity of a center part of the display region of the transmitting device 1b so as to overlap the transmitting device 1b as shown in the "conceptual image" column.

In each of the signal distributions illustrated in the "output example" column of FIG. 40, (i) "Sequence 1" to "Sequence 8" (y-axes in FIG. 40) in the cases 1 and 3 of FIG. 40 indicate the eight drive lines DL of the transmitting device 1b, respectively and (ii) "1" to "8" (x-axes in FIG. 40) in the cases 1 and 3 of the FIG. 40 indicate the eight sense lines SL of the transmitting device 1b. On the other hand, the opposite is true in the cases 2 and 4 of FIG. 40. Note that a plane (xy plane) of each of the signal distributions is generated in accordance with basic information of the touch panel 14 which has been transmitted from the transmitting device 1b after completion of the above described synchronization adjustment.

Note that as illustrated in the "output example" column in the cases 3 and 4 of FIG. 40, in order to obtain signal distributions that are precise in an x-axis direction and a y-axis direction, it is preferable to measure capacitance values of coupling capacitances of two or more cases (e.g. cases 1 and 2, cases 1 and 4 or the like). This also applies to the "output example" column in the cases 2 to 4 of FIG. 42.

(a) through (d) of FIG. 41 illustrate example equivalent circuits corresponding to the cases 1 to 4 illustrated in FIG. 40, respectively, when the contact or approach is detected.

Examples of the arrangement of the drive lines DL of the transmitting device 1b and the sense lines SL of the receiving device 1a encompass the four patterns illustrated in FIG. 40. In each of the four patterns, a signal distribution is configured such that capacitance values of coupling capacitances are at a maximum level (i) in the vicinity of "3" to "6" corresponding to the sense lines SL of the transmitting device 1b and (ii) in the vicinity of "Sequence 2" to "Sequence 5" corresponding to the drive lines DL of the transmitting device 1b.

In the cases 1 and 3, the receiving device 1a can determine position shifting in the Y-axis direction. In the cases 2 and 4, the receiving device 1a can determine position shifting in the X-axis direction.

Next, the following description will discuss, with reference to FIG. 42, a relationship, in a case where the touch panel 14 of the transmitting device 1b is placed on or over the touch panel 14 of the receiving device 1a so as to overlap the touch panel 14 of the receiving device 1a, between (i) arrangement of the drive lines DL of the transmitting device 1b and the sense lines SL of the receiving device 1a and (ii) a signal distribution obtained when the receiving device 1a detects that the transmitting device 1b comes into contact with or approaches the receiving device 1a.

In each of the signal distributions illustrated in the "output example" column of FIG. 42, (i) "Sequence 1" to "Sequence 8" (y-axes in FIG. 42) in the cases 1 and 4 of FIG. 42 indicate the eight drive lines DL of the receiving device 1a, respectively and (ii) "1" to "8" (x-axes in FIG. 42) in the cases 1 and 4 of the FIG. 42 indicate the eight sense lines SL of the receiving device 1a. On the other hand, the opposite is true in the cases 2 and 3 of FIG. 42.

Examples of the arrangement of the drive lines DL of the transmitting device 1b and the sense lines SL of the receiving device 1a encompass the four patterns illustrated in FIG. 42. As is the case of FIG. 40, in each of the four patterns, a signal distribution is configured such that capacitance values of coupling capacitances are at a maximum level (i) in the vicinity of "3" to "6" corresponding to the sense lines SL of the receiving device 1a and (ii) in the vicinity of "Sequence 2" to "Sequence 5" corresponding to the drive lines DL of the receiving device 1a.

Note, however, that unlike the case of FIG. 40, the receiving device 1a can (i) determine position shifting in the Y-axis direction in the cases 2 and 3 and (ii) determine position shifting in the X-axis direction in the cases 1 and 4.

Note also that the drive lines DL of the transmitting device 1b are orthogonal to the sense lines SL of the receiving device 1a. In this case, whether a position detection operation is possible is determined depending on a line direction of a larger touch panel 14 (the touch panel 14 of the receiving device 1a in the case of FIG. 42). Therefore, it varies between the cases 1 and 2 of FIG. 42 and the cases 1 and 2 of FIG. 40 whether a position detection operation is possible.

On the other hand, in the cases 3 and 4 of FIG. 40 and in the cases 3 and 4 of FIG. 42, the drive lines DL of the transmitting device 1b and the sense lines SL of the receiving device 1a extend in the same direction (parallel). Therefore, it does not vary between FIG. 40 and FIG. 42 whether a position detection operation is possible.

Note that the above description discusses the case where the two side surfaces of the receiving device 1a have a narrow frame. However, even in a case where the four side surfaces have a narrow frame as illustrated in (b) of FIG. 39, it is possible to obtain a signal distribution as in FIG. 43 by the detection electrodes 31a receiving pulse signals transmitted from the touch panel 14 of the transmitting device 1b, which detection electrodes 31a are provided along the four side surfaces.

(5) Case where Devices Overlap (Case where Display Regions Face Each Other)

The following description will discuss, with reference to FIG. 44, a case where, as illustrate in (c) of FIG. 13, (i) the receiving device 1a and the transmitting device 1b overlap each other and (ii) the respective display regions of the transmitting device 1b and of the receiving device 1a face each other. FIG. 44 is a cross-sectional view schematically illustrating the transmitting device 1b and the receiving device 1a in such a state.

As illustrated in FIG. 44, as is the case of FIG. 38, in a case where the receiving device 1a comes into contact with or approaches the transmitting device 1b so as to be placed on or over the transmitting device 1b, there occurs a coupling capacitance between (i) a drive line DL (drive electrode 32) of the transmitting device 1b and (ii) a sense line SL (detection electrode 31a) of the receiving device 1a. By recognizing a change in capacitance value of the coupling capacitance, the receiving device 1a can determine at which part of the transmitting device 1b the receiving device 1a is located.

In this case, since the touch panels 14 of the transmitting device 1b and of the receiving device 1a face each other, (i) the detection electrodes 31a provided along the four side surfaces receive pulse signals from the touch panel 14 of the transmitting device 1b and (ii) the remaining detection electrodes 31 also receive the pulse signals. This allows the receiving device 1a to obtain a signal distribution as illustrated in FIG. 45.

Note that setting or the like of "Sequence 1" to "Sequence 8" and "1" to "8" in FIG. 45 is similar to that described in "Case where devices overlap (Case A)" (case illustrated in (b) of FIG. 13), and therefore will not be described below.

(6) Case where Device is in an Upright Position

A case where, as illustrated in (d) of FIG. 13, the receiving device 1a is so placed on or over the transmitting device 1b that a side surface of the receiving device 1a is adjacent to the transmitting device 1b (the receiving device 1a is placed in an upright position on the transmitting device 1b) will be described next with reference to FIG. 46. FIG. 46 is a cross-sectional view schematically illustrating the transmitting device 1b and the receiving device 1a in such a state.

As illustrated in FIG. 46, as is the case of FIG. 38, in a case where the receiving device 1a comes into contact with or approaches the transmitting device 1b so as to be placed on or over the transmitting device 1b, there occurs a coupling capacitance between (i) a drive line DL (drive electrode 32) of the transmitting device 1b and (ii) a sense line SL (detection electrode 31a) of the receiving device 1a. By recognizing a change in capacitance value of the coupling capacitance, the receiving device 1a can determine at which part of the transmitting device 1b the receiving device 1a is located.

Next, the following description will discuss, with reference to FIGS. 47 and 48, a relationship, in a case where the transmitting device 1b and the receiving device 1a are provided as illustrated in FIG. 46, between (i) arrangement of the drive lines DL of the transmitting device 1b and the sense lines SL of the receiving device 1a and (ii) a signal distribution obtained when the receiving device 1a detects that the transmitting device 1b comes into contact with or approaches the receiving device 1a.

FIGS. 47 and 48 are each a view illustrating relationships between (i) the electrode arrangement of the transmitting device 1b and the receiving device 1a and (ii) signal distributions obtained when the contact or approach is detected. FIG. 47 illustrates cases where, as illustrated in the "conceptual image" column, (i) the side surface of the receiving device 1a is in contact with a partial region Q1 of the display region of the transmitting device 1b and (ii) the receiving device 1a is in an upright position on the display region of the transmitting device 1b. On the other hand, FIG. 48 illustrates cases where, as illustrated in the "conceptual image" column, (i) the side surface of the transmitting device 1b is in contact with a partial region Q2 of the display region of the receiving device 1a and (ii) the transmitting device 1b is in an upright position on the display region of the receiving device 1a.

In each of the signal distributions illustrated in the "output example" column of FIG. 47, (i) "Sequence 1" to "Sequence 8" (y-axes in FIG. 47) in the cases 1 and 3 of FIG. 47 indicate the eight drive lines DL of the transmitting device 1b, respectively and (ii) "1" to "8" (x-axes in FIG. 47) in the cases 1 and 3 of the FIG. 47 indicate the eight sense lines SL of the transmitting device 1b. On the other hand, the opposite is true in the cases 2 and 4 of FIG. 47. Note that a plane (xy plane) of each of the signal distributions is generated in accordance with basic information of the touch panel 14 which has been transmitted from the transmitting device 1b after completion of the above described synchronization adjustment.

On the other hand, in each of the signal distributions illustrated in the "output example" column of FIG. 48, (i)

"Sequence 1" to "Sequence 8" (y-axes in FIG. 48) in the cases 1 and 4 of FIG. 48 indicate the eight drive lines DL of the receiving device 1a, respectively and (ii) "1" to "8" (x-axes in FIG. 48) in the cases 1 and 4 of the FIG. 48 indicate the eight sense lines SL of the receiving device 1a. On the other hand, the opposite is true in the cases 2 and 3 of FIG. 48.

Examples of the arrangement of the drive lines DL of the transmitting device 1b and the sense lines SL of the receiving device 1a encompass the four patterns illustrated in FIG. 47. In each case of the electrode arrangement, the signal distribution is configured such that capacitance values of coupling capacitances are at a maximum level (i) in the vicinity of "Sequence 6" corresponding to the drive lines DL of the transmitting device 1b and (ii) in the vicinity of "3" to "6" corresponding to the sense lines SL of the transmitting device 1b.

In the cases 1 and 3, the receiving device 1a can, as is the case of FIG. 40, determine position shifting in the Y-axis direction. In the cases 2 and 4, the receiving device 1a can determine position shifting in the X-axis direction.

Meanwhile, in the case of FIG. 48 also, examples of the arrangement of the drive lines DL of the transmitting device 1b and the sense lines SL of the receiving device 1a encompass the four patterns illustrated in FIG. 48. In each case of the electrode arrangement, the signal distribution is configured such that capacitance values of coupling capacitances are at a maximum level (i) in the vicinity of "Sequence 6" corresponding to the drive line DL of the receiving device 1a and (ii) in the vicinity of "3" to "6" corresponding to the sense lines SL of the receiving device 1a.

In the cases 2 and 3, the receiving device 1a can, as is the case of FIG. 42, determine position shifting in the Y-axis direction. In the cases 1 and 4, the receiving device 1a can determine position shifting in the X-axis direction.

Note that as illustrated in the "output example" column in FIG. 48, in order to obtain signal distributions that are precise in the x-axis direction and the y-axis direction, it is preferable to measure capacitance values of coupling capacitances of two or more cases (e.g. cases 1 and 2, cases 1 and 4 or the like).

(Points Concerning Position Detection)

According to the present embodiment, in a case where the display device 1 or the like is equipped with functions of both the receiving device 1a and the transmitting device 1b, display devices 1 or the like are each capable of switching between the functions of the transmitting device 1b and of the receiving device 1a at any time. In such a case, the display devices 1 or the like can each recognize a position of its counterpart device in real time. That is, both devices, whether they are both smartphones or a smartphone and a tablet computer, can perform operations of detecting positions of each other in real time.

The switching between the functions of the receiving device 1a and of the transmitting device 1b can be realized by, for example, one display device 1 or the like (i) performing an operation of detecting a position of the other display device 1 or the like and then (ii) notifying the other display device 1 or the like that the operation has been performed.

<Angle Detection Process>

The following description will discuss, with reference to FIGS. 49 through 51, a case where the position/angle determining section 505 determines, as a position of the transmitting device 1b (counterpart device), a tilt of the receiving device 1a in relation to the transmitting device 1b.

(a) through (c) of FIG. 49 are each a view illustrating a positional relation between the transmitting device 1b and the receiving device 1a. (d) of FIG. 49 is a view illustrating a tilt detection table that serves as a replacement of the position detection table. (a) through (d) of FIG. 50 are views illustrating example equivalent circuits that correspond to respective angles, shown on the tilt detection table, when contact or approach of the transmitting device 1b is detected. (a) through (d) of FIG. 51 are signal distributions corresponding to the respective angles.

(Example of Signal Distribution-Based Tile Detection)

As is the case of the above described operation of detecting the position of a counterpart device, the position/angle determining section 505, in accordance with a result of inner product operation of a output sequence vector and a code sequence, calculates (i) a location of a coupling capacitance that occurred between a drive line DL of the transmitting device 1b and a sense line SL of the receiving device 1a and (ii) a capacitance value of the coupling capacitance at the location. Then, based on the capacitance value and the location thus calculated, the position/angle determining section 505 generates a signal distribution as illustrated in FIG. 51 so as to determine the tilt of the receiving device 1a in relation to the transmitting device 1b.

Note that FIG. 50 illustrates, as a mere example, a case where (i) the touch panel 14 of the receiving device 1a includes four drive lines DL and four sense lines SL and (ii) the touch panel 14 of the transmitting device 1b includes eight drive lines DL and eight sense lines SL. The touch panels 14 of the receiving device 1a and of the transmitting device 1b are identical in line pitch of each line.

The equivalent circuits illustrated in (a) through (d) of FIG. 50 correspond to the signal distributions illustrated in (a) through (d) of FIG. 51, respectively. (a) through (d) of FIG. 50 illustrate cases where an angle θ, which is formed between a line segment L illustrated in (a) of FIG. 49 or the like and the sense line SL1 of the receiving device 1a, is 0°, 41°, 60° and 76°, respectively. In each of (a) through (d) of FIG. 51, "1" to "8" (x-axes in each of (a) through (d) of FIG. 51) indicate eight sense lines SL1 of the transmitting device 1b, and the "Sequence 1" to "Sequence 8" (y-axes in each of (a) through (d) of FIG. 51) indicate eight drive lines DL of the transmitting device 1b, respectively. In each of (a) through (d) of FIG. 51, a z-axis indicates a capacitance value of a coupling capacitance. Note that a plane (xy plane) of each of the signal distributions is generated in accordance with basic information of the touch panel 14 which has been transmitted from the transmitting device 1b after completion of the above described synchronization adjustment.

By generating a signal distribution, the position/angle determining section 505 determines, as a position of the transmitting device 1b, a tilt (angle) at which the receiving device 1a is tilted, on an operation screen of the touch panel 14 of the receiving device 1a, from a line segment L in a plane including the operation screen. In other words, the position/angle determining section 505 determines an angle (angle θ), in the operation screen of the touch panel 14 of the receiving device 1a, between (i) a reference line (sense line SL) set within an operation screen of the touch panel 14 of the transmitting device 1b and (ii) a reference line (any line segment L) set within the operation screen of the touch panel 14 of the receiving device 1a.

With the configuration, it is possible to determine the angle of the transmitting device 1b with respect to the receiving device 1a (or the angle of the receiving device 1a with respect to the transmitting device 1b). This makes it possible to recognize, as the angle, a positional relation of the receiving device 1a to the transmitting device 1b. In addition, by performing interpolation, it is possible to determine the angle in unit of approximately 1°. That is, it is possible to accurately detect the angle.

(Example of Tilt Detection by Use of Tilt Detection Table)

In addition to the tilt detection by use of a signal distribution, the position/angle determining section 505 can also detect the tilt by use of the tilt detection table illustrated in (d) of FIG. 49. An example of such a process will be described below.

FIG. 49 illustrates cases where the respective touch panels 14 of the transmitting device 1b and of the receiving device 1a (i) each include four drive lines DL and four sense lines SL and (ii) are identical in line pitch. Note, however, that the numbers of drive lines DL and sense lines SL are not limited to such an example.

(a) of FIG. 49 illustrates a case where the angle θ between any line segment L and the sense line SL1 of the receiving device 1a is 0°. In this case, coupling capacitances occur between the drive lines DL1 to DL4 of the transmitting device 1b and the respective detection electrodes SE1 to SE4 of the sense line SL1 of the receiving device 1a. That is, as is the case of the equivalent circuit illustrated in (a) of FIG. 50, four coupling capacitances occur on a surface of the receiving device 1a.

In this case, respective capacitance values of the coupling capacitances are each C, (i) capacitance values of coupling capacitances when pulse signals are received a first time are 4C, (ii) capacitance values of coupling capacitances when pulse signals are received a second time are 0, (iii) capacitance values of coupling capacitances when pulse signals are received a third time are 0, and (iv) capacitance values of coupling capacitances when pulse signals are received a fourth time are 0.

(b) of FIG. 49 illustrates a case where the angle θ between any line segment L and the sense line SL1 of the receiving device 1a is 41°. In this case, while coupling capacitances occur between the drive line DL2 to DL4 of the transmitting device 1b and the sense line SL1 (at least one of the detection electrodes SE1 to SE4) of the receiving device 1a, no coupling capacitance occurs at the drive line DL1. That is, as is the case of the equivalent circuit illustrated in (b) of FIG. 50, three coupling capacitances occur on a surface of the receiving device 1a.

In this case, no coupling capacitance corresponding to C1 of the above described output signals Vout (Y1) to Vout (Y4) is occurring (i.e. C1=0). This applies to a particular pattern shown in the "41°" column of (d) of FIG. 49 (capacitance values of the first time to the fourth time are 3C, −1C, −1C and −1C, respectively).

Likewise, (c) of FIG. 49 illustrates a case where the angle θ between any line segment L and the sense line SL1 of the receiving device 1a is 60°. In this case, while coupling capacitances occur between the drive line DL3 to DL4 of the transmitting device 1b and the sense line SL1 of the receiving device 1a, no coupling capacitance occurs at the drive line DL1 and the drive line DL2. That is, as is the case of the equivalent circuit illustrated in (c) of FIG. 50, two coupling capacitances occur on a surface of the receiving device 1a.

In this case, no coupling capacitance corresponding to C1 or C2 of the above described output signals Vout (Y1) to Vout (Y4) is occurring (i.e. C1=C2=0). This applies to a particular pattern shown in the "60°" column of (d) of FIG. 49 (capacitance values of the first time to the fourth time are 2C, 0, −2C and 0, respectively).

Assume a case where the angle θ between a line segment L and the sense line SL1 of the receiving device 1a is 76°. In this case, while coupling capacitances occur between the drive line DL4 of the transmitting device 1b and the sense line SL1 of the receiving device 1a, no coupling capacitance occurs at the drive lines DL1 to DL3. That is, as illustrated in (d) of FIG. 50, a single coupling capacitance occurs on a surface of the receiving device 1a.

In this case, no coupling capacitance corresponding to any of C1 to C3 of the above described output signals Vout (Y1) to Vout (Y4) is occurring (i.e. C1=C2=C3=0). This applies to a particular pattern shown in the "76°" column of (d) of FIG. 49 (capacitance values of the first time to the fourth time are 1C, −1C, −1C and 1C, respectively).

In a case where the receiving device 1a is thus shifted by a drive line DL of the transmitting device 1b, a coupling capacitance corresponding to each of C1 to C4 of the above described output signals Vout (Y1) to Vout (Y4) varies. This predetermined particular patterns are shown in the tilt detection table illustrated in (d) of FIG. 49.

As is the case of a position detection operation, the position/angle determining section 505, for example, calculates capacitance values obtained from the respective output signals Vout (Y1) to Vout (Y4), and then compares a combination of the capacitance values with the particular patterns shown in the tilt detection table. Then, in accordance with a result of the comparison, the position/angle determining section 505 determines the tilt of the receiving device 1a with respect to the transmitting device 1b.

In this process also, as has been described, it is possible to recognize, as an angle of the receiving device 1a, a positional relation of the receiving device 1a to the transmitting device 1b. In addition, by interpolation, it is possible to determine the angle in unit of approximately 1°.

<High-Accuracy Position Detection Operation and Low-Accuracy Position Detection Operation>

As described above, with the position/angle determining section 505, it is possible to detect a position of a counterpart device with a precision in units smaller than a line pitch unit (e.g. in units of display pixel pitch). In other words, the receiving device 1a can be considered as capable of highly accurately detecting a position of a counterpart device (i.e. performing a high-accuracy position detection operation).

Note that it is not possible to highly accurately perform a position detection operation by the device detection section 502 analyzing an output signal Vout. However, it is still possible to roughly perform position detection (low-accuracy position detection) to such an extent that the receiving device 1a substantially detect a position of a counterpart device in relation to the receiving device 1a (e.g. the receiving device 1a determines that the transmitting device 1b is present at a partial region of a surface of the receiving device 1a or is present on a display-region side of the receiving device 1a).

Therefore, in a case where a low-accuracy position detection operation is to be performed, the receiving device 1a does not necessarily need to be equipped with a function (the synchronization adjusting section 503, the mode changing section 504 and the position/angle determining section 505) for a position detection operation by the position/angle determining section 505. That is, in such a case, the receiving device 1a only needs to be equipped with a position detection function to detect that a finger or the like (detection target object), which serves as a control function of a general touch panel 14, has come into contact with or approached the receiving device 1a (i.e. the function of the device detection section 502 of the receiving device 1a).

<Data Communications Between Touch Panels>

Data communications between the touch panel 14 of the transmitting device 1b and the touch panel 14 of the receiving device 1a will be described below with reference to FIG. 52. FIG. 52 is a view illustrating an equivalent circuit showing data communications between the touch panels 14.

As described above, after the receiving device 1a detects the position of the transmitting device 1b, the transmitting device 1b transmits predetermined data to the receiving device 1a (S4 to S5 illustrated in FIG. 22, S19 to S20 illustrated in FIG. 24).

Examples of the predetermined data encompass various data such as basic information (number of nodes, pitch, driving scheme and the like) of the touch panel 14 of the transmitting device 1b; moving image; still image; content such as text data; program (application); the function of the transmitting device 1b; and status.

Examples of the predetermined data can also encompass: device identification information (device information, device ID) for identifying the transmitting device 1b; and/or user identification information (user information, user ID) for identifying a user who uses the transmitting device 1b. In a case where the transmitting device 1b does not include the display panel 12 (e.g. a card including a touch panel 14), the device identification information is information contained in the card.

After the position detection is performed, the receiving device 1a determines a sense line SL at which capacitance coupling is occurring. In this case, after the position/angle determining section 505 performs the position detection operation, the data transmitting and receiving section 506 of the receiving device 1a notifies, via the communication section 51, the transmitting device 1b of a drive line DL at which the capacitance coupling is occurring. Note that such notification is not necessarily required in a case where, for example, the transmitting device 1b can recognize a drive line DL at which coupling capacitance is occurring, such as a case where the transmitting device 1b is equipped with the function of the receiving device 1a in combination with the function thereof.

The transmitting device 1b is configured such that in a case where the drive controlling section 601 recognizes a drive line DL at which capacitance coupling is occurring, the drive controlling section 601 generates, by referring to the storage section 62, a pulse signal (data pulse) on which predetermined data to be transmitted to the receiving device 1a is superimposed. Then, the drive controlling section 601 applies the pulse signal to the drive line DL at which the capacitance coupling is occurring.

The receiving device 1a is configured such that the data transmitting and receiving section 506 receives, via the sense line SL at which the capacitance coupling is occurring, predetermined data that is superimposed on the pulse signal.

Since capacitance coupling is thus occurring between a drive line DL of the transmitting device 1b and a sense lines SL of the receiving device 1a, it is possible to realize data communications between the touch panels 14 by utilizing a pulse signal applied to the drive line DLL Note that in a case where, for example, the touch panels 14 of the transmitting device 1b and of the receiving device 1a are driving in parallel in the case 1 illustrated in FIG. 32, it is possible to increase an amount of data communications per unit time in comparison with a case where the touch panels 14 are driving sequentially. That is, in the case of parallel driving, it is possible to carry out communications at higher speed than is the case of sequential driving.

Assume a case as in, for example, the case 3 illustrated in FIG. 32, where a drive line DL of the transmitting device 1b and a sense line SL of the receiving device 1a have a one-to-one correspondence. In this case, it is possible to realize high-speed communications as described above even by the sequential driving without performing encoding as in the parallel driving.

In a case where, as illustrated in (c) of FIG. 13, the respective display regions of the transmitting device 1b and of the receiving device 1a face each other, coupling capacitances occur across the entire sense lines SL of the receiving device 1a as illustrated in FIG. 45. Therefore, it is possible to configure the amount of data communications to be larger in comparison with the case illustrated in (a) of FIG. 13 or the like where coupling capacitances occur only at part of the sense lines SL of the receiving device 1a.

(Function of Transmitting Device 1b During Data Communications Between Touch Panels)

On the other hand, in order to realize the data communications, the drive controlling section 601 of the transmitting device 1b can be considered to be equipped with a function to (i) add, to a pulse signal, predetermined data to be transmitted to the receiving device 1a and (ii) apply the pulse signal to a drive line DL of the touch panel 14 of the transmitting device 1b.

In this case, the information processing system 5 illustrated in FIG. 13 can be considered as a synchronization process system including the transmitting device 1b and the receiving device 1a for performing the data communications.

Embodiment 2

The following description will discuss an embodiment of the present invention with reference to FIGS. 54 through 58. Note that members similar to those described in Embodiment 1 will be given the same reference numbers, and the descriptions of the members will be omitted as appropriate.

Input devices 2a and 2b and display devices 3a and 3b in the following description will be described as members equipped with the functions of the receiving device 1a and the transmitting device 1b, respectively, which were described in Embodiment 1.

Needless to say, it is possible, as is the case of Embodiment 1, one input device or display device performs a position detection operation and then notifies the other input device or display device that the position detection operation has been performed. In such a case, the other input device or display device detects a position of the other input device or display device by receiving, from said one input device or display device, (i) a position detection completion notification and (ii) relative position information that indicates the position of the other input device or display device in relation to the counterpart device.

[Overview of Embodiment 2]

Embodiment 2 will discuss a configuration in which (i) the two input devices 2a and 2b has a positional relation as illustrated in FIG. 13 and (ii) one input device detects a position of the other input device so that the other input device can recognize that an input is a continuous input operation from said one input device to the other input device. Embodiment 2 will also discuss the opposite, that is, a configuration in which one input device detects a position of the other input device so that said one input device can recognize that an input is a continuous input operation from the other input device to said one input device.

[Details of Input Device 2a]

The input device 2a, which transmits first detection coordinates (described later), will be described first with reference to FIG. 54. The description below particularly deals with a process in a case where the input device 2a comes into contact with or approaches the input device 2b that serves as a counterpart device. FIG. 54 is a view illustrating an example functional block of a control section 70 included in the input device 2a in accordance with Embodiment 2.

The input device 2a mainly includes a display panel 12 (display screen), a touch panel 14 (first panel component), a communication section 51, a storage section 52, and a control section 70. That is, the input device 2a is a device capable of, while the touch panel 14 of the input device 2a is placed next to the touch panel 14 (second panel component) of the input device 2b (serving as a counterpart device), accepting an input of a continuous track made through contact of a finger or the like or approach thereof and extending from the touch panel 14 of the input device 2a to the touch panel 14 of the input device 2b.

<Configuration of Control Section 70>

The control section 70 mainly includes a drive controlling section 501, a device detection section 502, a synchronization adjusting section 503, a mode changing section 504, a position/angle determining section 505 (region determining section), a data transmitting and receiving section 506 (transmitting section), a detection position control section 701 (detection position determining section), and a display control section 702. The control section 70 is similar to the control section 50, etc. in terms of basic function of the control section.

As is the case of Embodiment 1, the position/angle determining section 505 determines, in accordance with a pulse signal transmitted from the input device 2b, a position of the input device 2b in relation to the input device 2a. That is, in accordance with a pulse signal transmitted from the input device 2b, the position/angle determining section 505 determines an adjacent region F1 (first adjacent region) which is a region located in the touch panel 14 of the input device 2a so as to be adjacent to the touch panel 14 of the input device 2b (see FIG. 58).

The position/angle determining section 505 also defines, in the adjacent region F1, an input coordinate system in common with the input device 2b.

Note that the input device 2b, which serves as a counterpart device and which has received first detection coordinates specified by the detection position control section 701 (described later), needs to be made capable of recognizing the first detection coordinates as a detection position of the input coordinate system in the touch panel 14 of the input device 2b. This is to enable a process (to be described) of the input device 2b, that is, a determining process of determining whether the first detection coordinates match second detection coordinates or whether first detection coordinates are deemed to match the second detection coordinates.

Therefore, in a case where the input device 2a and the input device 2b are adjacent to each other, for example, the position/angle determining section 505 defines, as the common input coordinate system, a virtual xy plane formed by (i) a y-axis which is a boundary between the adjacent region F1 and an adjacent region F2 (see FIG. 58) and (ii) an x-axis which is an axis located in the adjacent region F1 (or in the adjacent region F2) so as to be perpendicular to the y-axis.

In addition, the common input coordinate system is associated with an input coordinate system of the touch panel 14 of the input device 2a and with an input coordinate system of the touch panel 14 of the input device 2b. The position/angle determining section 505 associates the common input coordinate system with each of the input coordinate systems by obtaining information on the input coordinate system of the touch panel 14 of the input device 2b from basic information of the touch panel 14 of the input device 2b, which basic information has been received from the input device 2b.

Therefore, even in a case where the respective touch panels 14 of the two input devices have different input coordinate systems, it is still possible, by preparing the common input coordinate system, to determine whether there is a match between the first detection coordinates and the second detection coordinates (described later) or whether the match is deemed to be present.

Note that it is possible to define, as a common input coordinate system, an input coordinate system of either one of the respective touch panels 14 of the two input devices. That is, any input coordinate system can be prepared, provided that the common input coordinate system is one that the two input devices have in common.

When the position of the counterpart device is determined, the position/angle determining section 505 notifies the mode changing section 504 that the position has been determined. Then, the mode changing section 504 changes a mode of the drive controlling section 501 from a "position detection mode," which is a state in which to detect the counterpart device, to a "normal mode" that is a state in which it is possible to detect contact or approach of a finger or the like.

The data transmitting and receiving section 506 transmits, to the input device 2b, the first detection coordinates thus specified by the detection position control section 701. This enables the input device 2b to recognize an input of a continuous track from the adjacent region F1.

The data transmitting and receiving section 506 also transmits, along with the first detection coordinates specified by the detection position control section 701, image information to the input device 2b. The detection position control section 701 and the display control section 702 control the data transmitting and receiving section 506 to thus transmit the image information. The image information represents an image displayed on the display panel 12 in accordance with a user operation.

The detection position control section 701 detects, via the drive controlling section 501, (i) a user operation performed onto the touch panel 14 and (ii) a location of the user operation. In addition, in order to cause an image in accordance with the user operation to be displayed, the detection position control section 701 transmits, to the display control section 702, user operation information that indicates the user operation and the location thus detected.

According to Embodiment 2, in particular, the detection position control section 701 determines, when a user operation is detected in the adjacent region F1 specified by the position/angle determining section 505 (user operation within the adjacent region F1), first detection coordinates that indicate a position of the user operation in the input coordinate system.

The display control section 702 controls, by controlling a display control circuit (not shown), how an image is displayed on the display panel 12.

In accordance with the user operation information received from the detection position control section 701, the display control section 702 controls how an image is displayed in accordance with a running application. For example, if the user operation is a dragging operation, the display control section 702 causes an image (e.g. icon) to be displayed at a detection position of the user operation so as to follow the dragging operation.

<Flowchart>

A flow of a process of the input device 2a will be described next with reference to FIG. 55. FIG. 55 is a flowchart illustrating the flow of the process of the input device 2a.

First, the position/angle determining section 505 determines the input device 2a that serves as a counterpart device (S31). This process is performed as described in Embodiment 1, and is similar to the process illustrated in the step S19 of FIG. 24. In so doing, the position/angle determining section 505 defines the common input coordinate system.

Next, the detection position control section 701 determines whether or not a user operation was detected within an adjacent region F1 (S32). In a case where it is determined that the user operation within the adjacent region F1 has been detected (YES in S32), the detection position control section 701 determines first detection coordinates which is a location of the user operation in the common input coordinate system (S33). On the other hand, in a case where the user operation is not detected (NO in S32), the detection is monitored.

The data transmitting and receiving section 506 transmits the first detection coordinates to the input device 2b (S34), and transmits image information that represents an image displayed on the display panel 12 in accordance with the user operation within the adjacent region F1 (S35).

In a case where, for example, the input operation is a dragging operation, the data transmitting and receiving section 506 transmits, to the input device 2b, image information that represents an image, such as an icon, which follows the dragging operation (see S35). However, the image information does not necessarily need to be transmitted.

In a case where, for example, a drawing process is being performed by following a track of the input operation, the data transmitting and receiving section 506, instead of transmitting the image information in the step S35, only needs to instruct that an application for the drawing process be launched. In a case where the input device 2b does not have such an application, the data transmitting and receiving section 506 transmits, to the input device 2b, (i) the application for the drawing process and (ii) an instruction that the application be launched. This allows the input device 2b to perform, as a continuation of the drawing process performed by the input device 2a, a drawing process by following the track of the input operation.

[Details of Input Device 2b]

The input device 2a for receiving the first detection coordinates will be described next with reference to FIG. 56. The following description will discuss particularly a process in a case where the input device 2b comes into contact with or approaches the input device 2a that serves as a counterpart device. FIG. 56 is a view illustrating an example functional block of a control section 72 of the input device 2b in accordance with Embodiment 2.

The input device 2b mainly includes a display panel 12, the touch panel 14 (second panel component), a communication section 51, a storage section 52, and the control section 72. That is, the input device 2b is a device capable of, while the touch panel 14 of the input device 2b is placed next to the touch panel 14 (first panel component) of the input device 2a (serving as a counterpart device), accepting an input of a continuous track made through contact of a finger or the like or approach thereof and extending from the touch panel 14 of the input device 2a to the touch panel 14 of the input device 2b.

<Configuration of Control Section 72>

The control section 72 mainly includes a drive controlling section 501, a device detection section 502, a synchronization adjusting section 503, a mode changing section 504, a position/angle determining section 505 (region determining section), a data transmitting and receiving section 506 (receiving section), a detection position control section 721 (detection position determining section, position judging section, input judging section), and a display control section 722 (display control section). The control section 72 is similar to the control section 50, etc. in terms of basic function of the control section.

As is the case of Embodiment 1, the position/angle determining section 505 detects, in accordance with a pulse signal transmitted from the input device 2a, a position of the counterpart device in relation to the input device 2b. That is, in accordance with a pulse signal transmitted from the input device 2a, the position/angle determining section 505 determines an adjacent region F2 (second adjacent region) which is a region located in the touch panel 14 of the input device 2b so as to be adjacent to touch panel 14 of the input device 2a (see FIG. 58).

As is the case of the input device 2a, the position/angle determining section 505 of the input device 2b (i) defines, in the adjacent region F2, a common input coordinate system shared with the input device 2a and (ii) associates the common input coordinate system with an input coordinate system of the touch panel 14 of the input device 2a and with an input coordinate system of the touch panel 14 of the input device 2b. A process related to defining of the common input coordinate system can be performed only by one of the input devices 2a and 2b.

As is the case of the input device 2a, the position/angle determining section 505 of the input device 2b notifies, when a position of the counterpart device is detected, the mode changing section 504 that the position has been detected. Then, the mode changing section 504 changes a mode of the drive controlling section 501 from the "position detection mode" to the "normal mode."

The data transmitting and receiving section 506 receives first detection coordinates which have been specified by the input device 2a.

Along with the first detection coordinates, the data transmitting and receiving section 506 also receives image information that represents an image which was displayed on the display panel 12 of the input device 2a.

As is the case of the detection position control section 701, the detection position control section 721 detects (i) a user operation performed onto the touch panel 14 and (ii) a location of the user operation. In addition, in order to cause an image in accordance with the user operation to be displayed, the detection position control section 701 transmits, to the display control section 722, user operation information that indicates the user operation and the location thus detected.

In addition to the function as described above, the detection position control section 721 has the following three functions.

Firstly, the detection position control section 721 has a detection position determining function in which the detection position control section 721 determines, when a user operation is detected in the adjacent region F2, the second detection coordinates that indicate a position of the user operation in the input coordinate system of the touch panel 14 of the input device 2b.

Secondly, the detection position control section 721 has a position judging function in which the detection position control section 721 judges whether the second detection coordinates having been determined by use of the detection position determining function match the first detection coordinates having been received by the data transmitting and receiving section 506 or whether the second detection coordinates are present in a predetermined range where the second detection coordinates are deemed to match the first detection coordinates.

The predetermined range is where (i) an input is accepted as an input of a continuous track over the two input devices even in a case where the two input coordinate systems do not exactly match each other and (ii) a transition of an image, in a case where the image is following the input, is accepted (viewed) as one continuous transition.

The input coordinate system, which is common to the respective input coordinate systems of the touch panels 14 of the input device 2a and of the input device 2b, is thus defined. This makes it possible to compare, in the same input coordinate system, between the first detection coordinates and the second detection coordinates.

Thirdly, the detection position control section 721 has an input judging function in which the detection position control section 721 judges, in a case where the second detection coordinates are determined to match the first detection coordinates or are determined to be present in the predetermined range where the second detection coordinates are deemed to match the first detection coordinates, the second detection coordinates as being the input of the continuous track from the input device 2a. Then, in a case where the second detection coordinates are judged as being the input of a continuous track, the detection position control section 721 notifies the display control section 722 that the second detection coordinates are judged as being the input of a continuous track.

The display control section 722 controls, by controlling a display control circuit (not shown), how an image is displayed on the display panel 12.

In a case where the display control section 722 receives the notification from the detection position control section 721, the display control section 722 causes an image (e.g. icon), which is represented by the image information received by the data transmitting and receiving section 506, to be displayed on the display panel 12 in accordance with the user operation performed onto the touch panel 14 of the input device 2b. This allows an image, which continues from the input device 2a to the input device 2b, to be displayed so as to follow the input that continues from the input device 2a.

<Flowchart>

A flow of the process of the input device 2b will be described next with reference to FIG. 57. FIG. 57 is a flowchart illustrating the flow of the process of the input device 2b.

First, the position/angle determining section 505 determines the input device 2a that serves as a counterpart device (S41). This process is similar to the process of the step S31. In so doing, the position/angle determining section 505 defines the common input coordinate system.

Then, in a case where the input device 2a comes into contact with or approaches the input device 2b, the input device 2a transmits the first detection coordinates and image information as described with reference to FIGS. 54 and 55. In response, the data transmitting and receiving section 506 receives the first detection coordinates (location information) and the image information (S42).

Next, the detection position control section 721 determines whether or not a user operation performed onto the adjacent region F2 has been detected (S43). In a case where it is determined that the user operation onto the adjacent region F2 has been detected (YES in S43), the detection position control section 721 determines, in the common input coordinate system, the second detection coordinates of the user operation performed onto the adjacent region F2 (S44). Then, the detection position control section 721 judges whether the second detection coordinates thus determined by the detection position control section 721 match the first detection coordinates or whether the second detection coordinates are present in the predetermined range where the second detection coordinates are deemed to match the first detection coordinates (S45).

In a case where the detection position control section 721 judges that the two detection positions match (or are deemed to match) each other (YES in S45), the detection position control section 721 notifies the display control section 722 that the second detection coordinates have been judged as being an input of a continuous track from the input device 2a. Upon reception of the notification, the display control section 722 causes an image, which is represented by the image information received, to be displayed so as to follow the user operation (S46).

Note that in the case where, for example, the input operation is a dragging operation, the input device 2b receives image information that represents an image, such as an icon, which follows the dragging operation as described above. However, in a case where, for example, a drawing process is being performed by a track of the input operation, the input device 2b does not receive the image information in the step S42, but receives an instruction that an application for the drawing process be launched. Then, as is the case of "YES" in the step S45, the detection position control section 721 launches the application during the process illustrated in the step S46. Then, a drawing process by following the track of the input operation is performed as a continuation of the drawing process of the input device 2a.

<Example of Image Transition>

An example of an image transition from the input device 2a to the input device 2b will be described below with reference to FIG. 58. FIG. 58 is a view illustrating the image transition.

FIG. 58 illustrates the transition while a dragging operation is performed onto the icon. FIG. 58 shows an example in which the input devices 2a and 2b are adjacent to each other such that their respective side surfaces face each other as illustrated in (a) of FIG. 13.

However, the image transition is not limited to such an example, but is likewise performed (i) in a case where the input devices 2a and 2b overlap each other as illustrated in (b) of FIG. 13 and (ii) in a case where one input device is placed in an upright position on the other input device as illustrated in (d) of FIG. 13.

While the input device 2a and the input device 2b are in contact with or are in the proximity of each other, the input device 2a accepts a dragging operation onto an icon 96 in response to a fingertip 94 which is in contact with the icon 96 as illustrated in (a) of FIG. 58. In a case where the icon 96 is moved onto the adjacent region F1 by the operation, the above described first detection coordinates of the icon 96 and the image information are transmitted to the input device 2b by the above described process of the input device 2a.

The input device 2b receives these pieces of information, and then a user operation is obtained within the adjacent region F2. In a case where a location of the user operation (second detection coordinates) is judged as matching the first detection coordinates, the user operation is judged as a continuation of a user operation onto the input device 2a performed as illustrated in (a) of FIG. 58. As a result, as illustrated in (b) of FIG. 58, the dragging operation onto the icon 96 performed by the input device 2a is continued by the input device 2b. The icon 96 is then displayed in accordance with the dragging operation by the input device 2b.

<Other Processes>

In a case where the respective display regions of the input device 2a and of the input device 2b face each other as illustrated in (c) of FIG. 13, it is possible that (i) a movement of the input device on top is recognized as an input operation performed onto the input device at the bottom and then (ii) the input device at the bottom performs a certain operation. In such a case, it is possible to cause the input device on top to function as an operation input section such as a mouse.

In a case where one display device is used while being in an upright position on the other display device as illustrated in (d) of FIG. 13, it is possible that (i) a tilt of said one display device in relation to the other display device is detected and then (ii) the other display device performs, in accordance with the tilt, an operation such as launching an application, transitioning to or a resuming from a sleep state, or locking/unlocking.

In a case where the display device 3b judges an input as an input of a continuous track extending from the display device 3a, an image (e.g. icon) does not need to be displayed so as to follow a subsequent input operation. For example, in a case where a positional relation between two display devices are as illustrated in (a), (b), or (d) of FIG. 13, it is possible to cause the display device 3b to expand and display lower-layer information contained in an icon (i.e. information stored in the icon). In such a case, it is only necessary that the lower-layer information along with the image information be transmitted to the display device 3b. Then, the display device 3b can judge the input as a continuous input, and then, when the lower-layer information is obtained, display the lower-layer information.

<High-Accuracy Position Detection Operation and Low-Accuracy Position Detection Operation>

The aforementioned process has been described on the assumption that the high-accuracy position detection operation (position detection operation performed by the position/angle determining section 505) is performed.

That is, in the case of the high-accuracy position detection operation, the sense lines SL of the touch panel 14 (capacitive touch panel) of the input device 2a (input device 2b) are each capable of receiving a pulse signal applied to a drive line DL (counterpart-side drive line) which is provided in the touch panel 14 (capacitive touch panel) of the input device 2b (input device 2a) that serves as a counterpart device (see Embodiment 1). Then, the position/angle determining section 505 determines a positional relation between the input device 2a (input device 2b) and the counterpart device by judging which of the plurality of sense lines SL provided in the touch panel 14 of the input device 2a (input device 2b) has received the pulse signal transmitted from the counterpart-device side drive line DL.

However, the above described process in accordance with Embodiment 2 is not limited to the high-accuracy position detection operation, but can be realized by the low-accuracy position detection operation (position detection operation performed by the device detection section 502).

In the case of the high-accuracy position detection operation, however, the input device 2b can recognize, as a smoother input operation, an input operation that continues from the input device 2a. This allows a smooth image transition (image transition indicating a track of the input operation) to be provided to a user.

Embodiment 3

The description below deals with an embodiment of the present invention with reference to FIGS. 59 through 63. Note that members similar to those described in Embodiment 1 and 2 will be given the same reference numbers, and the descriptions of the members will be omitted as appropriate.

[Overview of Embodiment 3]

Embodiment 3 deals with a configuration in which (i) two display devices 3a and 3b have a positional relation as illustrated in FIG. 13 and (ii) one display device detects a position of the other display device, an image related to the two display devices can be displayed across the two display devices.

[Details of Display Device 3a]

The display device 3a for transmitting a second image (described later) will be described first with reference to FIG. 59. The following description will discuss particularly a process in a case where the display device 3a comes into contact with or approaches the display device 3b that serves as a counterpart device. FIG. 59 is a view illustrating an example functional block of a control section 74 included in the display device 3a in accordance with Embodiment 3.

The display device 3a mainly includes a display panel 12, a touch panel 14, a communication section 51, a storage section 52, and the control section 74. The display device 3a is to be placed next to the display device 3b, which includes a display panel 12 and the like and serves as a counterpart device, so that an image related to the two display devices can be displayed.

<Configuration of Control Section 74>

The control section 74 mainly includes a drive controlling section 501, a device detection section 502, a synchronization adjusting section 503, a mode changing section 504, a position/angle determining section 505 (determining section), a data transmitting and receiving section 506 (transmitting section), an image control section 741 (image control section), and a display control section 742. The control section 74 is similar to the control section 50, etc. in terms of basic function of the control section.

As is the case of Embodiment 1, the position/angle determining section 505 determines a position of the display device 3b (serving as a counterpart device) in relation to the display device 3a.

The position/angle determining section 505 also judges whether a previously-determined position of the display device 3b matches a currently-determined position of the display device 3b. In a case where the position/angle determining section 505 has judged that there is no match, the position/angle determining section 505 notifies the image control section 741 that there is thus no match.

A degree to which the there is a match between the two positions is not so great that there needs to be an exact match between two positions. The degree only needs to be so great that visibility of an image displayed across the two display devices is secured. For example, it is possible to judge that there is no match in a case where the two positions differ by approximately one line (approximately several millimeters).

The judging process does not need to be always performed, but only needs to be performed at predetermined time intervals. That is, a position detection operation for performing the judging process only needs to be performed at predetermined time intervals. The predetermined time intervals only need to be set, by performing the position detection operation several times, so that visibility of a user does not deteriorate.

The image control section 741 generates an image to be displayed on the display panel 12. According to Embodiment 3, in particular, the image control section 741 generates, in accordance with a position of the display device 3b determined by the position/angle determining section 505, (i) a first image to be displayed on the display panel 12 of the display device 3a and (ii) a second image to be displayed on the display panel 12 of the display device 3b.

The first image and the second image are related to each other. For example, in a case where part of image data stored in the storage section 52 to be displayed on the display panel 12, an image represented by the image data is the first image.

In a case where the display device 3b comes into contact with or approaches the display device 3a, the image control section 741 recognizes a positional relation between the display device 3a and the display device 3b (i) by the position detection operation of the position/angle determining section 505 and by following data communications and (ii) in accordance with basic information of the touch panel 14 of the display device 3b. The image control section 741 also obtains, as the above described predetermined data, basic information (the number of inches, the number of pixels, resolution and the like) of the display panel 12 of the display device 3b.

The image control section 741, for example, (i) determines the position (adjacent region F1) of the counterpart device which is coming into contact with or approaching the display device 3a and (ii) to which part of the first image the position corresponds. Then, in accordance with (i) the position (coordinates on the image data) thus determined, (ii) the number of inches of the display panel 12 of the display device 3b, and (iii) the like, the image control section 741 determines a partial region (to be displayed on the display panel 12) of an image which is represented by the image data. The partial region thus determined is the second image.

Upon generation of the second image, the image control section 741 notifies the data transmitting and receiving section 506 that the second image has been generated.

In a case where the image control section 741 receives, from the position/angle determining section 505, a result of the determination by the position/angle determining section 505, the image control section 741 can (i) determine that the image displayed across the two display devices has deteriorated in visibility and (ii) re-generate a second image by the above described process of the image control section 741.

Furthermore, the image control section 741 can generate, instead of the second image, image generation information which is required for generating the second image. In such a case, for example, the image control section 741 calculates, when determining the partial region, coordinates that indicate the partial region (e.g. coordinates of four corners of the partial region). Then, the image control section 741 generates, as the image generation information, information containing the coordinates and the image data. This allows the display device 3b to (i) generate the second image by receiving the image generation information and (ii) causes the second image to be displayed on the display panel 12 of the display device 3b.

The data transmitting and receiving section 506 transmits, to the display device 3b, the second image (or the image generation information) generated by the image control section 741.

The display control section 742 controls, by controlling a display control circuit (not shown), how an image is displayed on the display panel 12. According to Embodiment 3, in particular, the display control section 742 causes the first image to be displayed on the display panel 12.

(Variation of Image Control Section 741)

The partial region can be a part of the first image. For example, in a case where the display device 3b is used while being in an upright position on the display device 3a as illustrated in (d) of FIG. 13, the partial region can be a part of an image displayed on the display device 3a while the display device 3b is being viewed, which part is blocked by the display device 3b so as to be invisible.

In such a case, for example, the image control section 741 estimates (i) a region corresponding to the display device 3b when the display device 3b is placed on the display device 3a, as a result of being rotated about a boundary between the adjacent regions F1 and F2 (a boundary between the display devices 3a and 3b), so that the display region of the display device 3b is substantially in parallel with the display region of the display device 3a (i.e. a region corresponding to the display device 3b being placed on the display device 3a so as to overlap the display device 3a) and (ii) an image supposed to be displayed in that region. Then, the image control section 741 designates, as a second image, the image supposed to be displayed on the region, and then transmits the second image to the display device 3b.

This allows the part, which is blocked so as to be invisible as described above, to be viewed on the display device 3b.

Alternatively, the image control section 741 can prevent an image from being displayed on such a part, or can generate a first image such that an image displayed on such a part is displayed on another portion of the display region of the display device 3a.

Alternatively, the first image and the second image can be identical. In such a case, an image, which is identical to an image displayed on the display device 3a, is also displayed on the display device 3b.

Alternatively, in order for an image displayed on the display device 3a to be displayed across the two display panels 12, the image control section 741 can (i) generate an enlarged image of the image and (ii) designate, as a second image, a partial region of the enlarged image, which partial region is to be displayed on the display device 3b.

Alternatively, the image control section 741 can generate, as a second image, an image containing information that indicates (i) device identification information of the display device 3a, (ii) user identification information of a user who uses the display device 3a, (iii) display content (content of the first image) of an image displayed on the display device 3a, or (iv) the like. Alternatively, the image control section 741 can generate, as a second image, an interface image, such as a keyboard, via which text or the like can be inputted into the display device 3a.

Note that in a case where the second image is to be displayed on a partial region of the display device 3b as illustrated in (c) of FIG. 63, the image control section 741 can determine a display position of the second image on the display device 3b in accordance with (i) the basic information of the display panel 12 of the display device 3b obtained when a positional relation between the display device 3a and display device 3b is determined and (ii) the position of the display device 3a in relation to the display device 3b. In such a case, a result of such determination is transmitted to the display device 3b. In accordance with the result, an image control section 761 (described later) of the display device 3b can cause the second image to be displayed on the display region of the display device 3b which display region is adjacent to the display device 3a.

Alternatively, this process of determining the display position of the second image does not necessarily need to be performed by the image control section 741, but can be performed by, for example, the image control section 761 of the display device 3b. For example, in a case where certain data such as an interface image is transmitted or where the display device 3a is determined to be in an upright position on the display device 3b, the image control section 741 notifies the display device 3b that the second image is to be displayed on a partial region of the display region of the display device 3b. Then, in response to the notification, the image control section 761 of the display device 3b can perform the process of determining the display position.

Alternatively, it is possible to only instruct the display device 3b to generate the second image as described above (i.e. only to transmit image generation information).

<Flowchart>

With reference to FIG. 60, the description below deals with a flow of processes performed by the display device 3a. FIG. 60 is a flowchart illustrating a flow of processes performed by the display device 3a. Note that the description below deals with the arrangement in which the display device 3a generates the second image and then transmits the second image thus generated to the display device 3b.

First, the position/angle determining section 505 determines the display device 3b that serves as a counterpart device (S51). This process is similar to the process performed in the step S19 of FIG. 24 in accordance with Embodiment 1.

Next, the image control section 741 generates the first image and the second image in accordance with the position of the display device 3b which position has been determined by the position/angle determining section 505 (S52). Subsequently, the data transmitting and receiving section 506 transmits the second image to the display device 3b (S53), and the display control section 742 causes the first image to be displayed on the display panel 12 included in the display device 3a (S54).

The position/angle determining section 505 performs the position detection process at predetermined time intervals. The position/angle determining section 505 judges whether a previously-determined position of the display device 3a matches a currently-determined position of the display device 3b (S55). In a case where the position/angle determining section 505 has judged that there is a match (NO in S55), the flowchart ends. On the other hand, in a case where the position/angle determining section 505 has judged that there is a difference between those two positions (YES in S55), the process returns to S51, and the first image and the second image are then generated again.

Even when it is judged in S55, after the transmission of the second image, that the display device 3a is different in positional relation from the display device 3b, automatic image correction can be performed. It is thus possible to prevent a decreased visibility.

Note that, instead of the second image, the image generation information may be generated in S52, so that the image generation information thus generated is transmitted in S53.

[Details of Display Device 3b]

Next, the description below deals with the display device 3b for transmitting the second image, with reference to FIG. 61. The description below particularly deals with a process carried out in a case where the display device 3b comes into contact with or approached the display device 3a that serves as a counterpart device. FIG. 61 is a view illustrating an example functional block of a control section 76 included in the display device 3b according to present embodiment.

The display device 3b mainly includes a display panel 12, a touch panel 14, a communication section 51, a storage section 52, and a control section 76. The display device 3b is to be placed next to the display device 3a, which includes a display panel 12 and the like and serves as a counterpart device, so that an image related to the two display devices can be displayed.

<Configuration of Control Section 76>

The control section 76 mainly includes a drive controlling section 501, a device detection section 502, a synchronization adjusting section 503, a mode changing section 504, a position/angle determining section 505, a data transmitting and receiving section 506 (receiving section), an image control section 761 (image control section), and a display control section 762. The control section 76 is similar to the control section 50 or the like in terms of basic function of the control section.

As in Embodiment 1, the position/angle determining section 505 determines a position of the display device 3a (serving as a counterpart device) in relation to the display device 3a.

The image control section 761 generates an image to be displayed on the display panel 12. In a case where the image generation information, instead of the second image, has been received from the display device 3a, the image control section 761 generates, as the second image, an image corresponding to the partial region of the image represented by the image data, on the basis of coordinates representing the partial region which coordinates are contained in the image generation information.

The position/angle determining section 505 also judges whether a previously-determined position of the display device 3a matches a currently-determined position of the display device 3a. In a case where the position/angle determining section 505 has judged that there is no match, the position/angle determining section 505 notifies the image control section 761 that there is no match.

The display control section 762 controls, by controlling a display control circuit (not shown), how an image is displayed on the display panel 12. According to the present embodiment, in particular, the display control section 762 causes the second image to be displayed on the display panel 12.

The data transmitting and receiving section 506 receives the second image or the image generation information from the transmitting device 1b.

(Variation of Image Control Section 761)

In addition to the above process, it is possible to perform a process corresponding to a variation of the image control section 741 of the display device 3a.

For example, in a case where an interface image is obtained as the second image, the image control section 761 may cause the interface image to be displayed in the vicinity of the display device 3a and also may cause a result of an input operation performed on the interface image to be sent back to the display device 3a. In this case, the image control section 741 may perform a process corresponding to the result of the input operation (e.g. displaying the result of the input operation, and start-up of an application associated with the input operation).

In this arrangement allows the display device 3b to be used as an input device for the display device 3a.

<Flowchart>

With reference to FIG. 62, the description below deals with a flow of processes performed by the display device 3b.

FIG. 62 is a flowchart illustrating a flow of processes performed by the display device 3b.

First, the position/angle determining section 505 determines the display device 3a that serves as a counterpart device (S61). This process is similar to the process performed in the step S19 of FIG. 24 in accordance with Embodiment 1.

Subsequently, upon receipt of the second image, the data transmitting and receiving section 506 notifies the display control section 762 of the receipt of the second image. Upon receipt of the notification, the display control section 762 causes the second image to be displayed on the display panel 12.

In a case where the data transmitting and receiving section 506 receives the image generation information, the data transmitting and receiving section 506 notifies the image control section 761 of the reception of the image generation information. The image control section 761 generates the second image on the basis of the image generation information, and then notifies the display control section 762 of the generation of the image generation information. Upon receipt of the notification, the display control section 762 causes the second image to be displayed on the display panel 12.

The position/angle determining section 505 performs the position detection process at predetermined time intervals, as in the process performed by the display device 3a. The position/angle determining section 505 judges whether a previously-determined position of the display device 3a matches a currently-determined position of the display device 3a (S64). In a case where the position/angle determining section 505 has judged that there is a match (NO in S64), the flowchart ends. On the other hand, in a case where the position/angle determining section 505 has judged that there is a difference between those two positions (YES in S64), the process returns to S61, and the second image is then received again. In so doing, the position/angle determining section 505 may cause the data transmitting and receiving section 506 to transmit, to the display device 3a, an instruction to request for generation of the second image.

The judgment process performed in S64 may be performed only by the display device 3a. In this arrangement, the reception of the second image or the image generation information triggers the display device 3b generating or displaying the second image.

<Example Display Images>

With reference to FIG. 63, the description below deals with example display images displayed on the display devices 3a and 3b according to the above processes. FIG. 63 is a view illustrating the example display images.

(a) of FIG. 63 illustrates example continuous (connected) images displayed on the display devices 3a and 3b as a result of the above processes performed when the display devices 3a and 3b contact each other or approach to each other.

(b) of FIG. 63 illustrates example resultant images displayed when the first image and second image as displayed in the manner illustrated in (a) of FIG. 63 are regenerated according to a different positional relation between the display devices 3a and 3b from that illustrated in (a) of FIG. 63.

Further, (c) of FIG. 63 illustrates an example manner in which the display device 3b displays the second image thereon when the second image containing, for example, device identification information of the display device 3a has been transmitted to the display device 3b. Since the position detection is performed by the position/angle determining section 505, it is possible to display the device identification information of the display device 3a in a region of the display panel 12 included in the display device 3b, which region is adjacent to the display device 3a.

In the region where the device identification information or the like is displayed, the aforementioned interface image may be further displayed.

(a) and (b) of FIG. 63 each illustrate a state illustrated in (a) of FIG. 13 (a state in which the display devices are adjacent to each other on their side surfaces), whereas (c) of FIG. 63 illustrates the state illustrated in (d) of FIG. 13 (the display device 3a is upright on the display device 3b). The arrangements illustrated in (a), (b), and (c) of FIG. 63 are merely examples.

That is, the manners of image display as illustrated in (a) and (b) of FIG. 63 can also be realized in the state as illustrated in (b) of FIG. 13 (in the state in which the two display devices overlap each other) and in the state as illustrated in (d) of FIG. 13. The manner of image display as illustrated in (c) of FIG. 63 can also be realized in the state as illustrated in (a) and (b) of FIG. 13.

Further, (d) of FIG. 63 illustrates (i) a state in which the display device 3a is placed on the display device 3b and (ii) a state in which the display device 3b is removed from the state (i). In the state (i) in which the display device 3a is placed on the display device 3b, the display device 3a detects the position of the display device 3b, and then transmits, as the second image, an image (first image) being displayed on the display device 3a, to the display device 3b.

This arrangement allows a content having been displayed on the display device 3a to be displayed as it is, as illustrated in (d) of FIG. 63, on the display panel 12 of the display device 3b in a position (region 3a') corresponding to where the display device 3a was present on the display device 3b.

Other Display Example

Other example configuration is such that a plurality of display devices are placed next to one another in a flat manner so as to realize the so-called multi-display. In such a configuration, an arrangement may be adopted, for example, in which one of the display devices (display device 3a) may (i) obtain information that indicates positional relations between the display device 3a and the other display devices adjacent to the display device 3a, (ii) generate images to be displayed on the respective display devices, and then transmit the images thus generated to the respective display devices.

<High-Accuracy Position Detection Operation and Low-Accuracy Position Detection Operation>

As in Embodiment 2, the aforementioned process has been described on the assumption that the high-accuracy position detection operation (position detection operation performed by the position/angle determining section 505) is performed. This is, however, not the only possibility. Alternatively, the aforementioned process can be realized by the low-accuracy position detection operation (position detection performed by the device detection section 502). In the case of the high-accuracy position detection operation, however, it is possible to perform display control (generation of the second image, and control of a position where the second image is to be displayed on the display device 3b) with a high degree of accuracy.

Embodiment 4

The description below deals with an embodiment of the present invention with reference to FIGS. 64 and 65. Note that members similar to those described in Embodiment 1 to 3 will be given the same reference numbers, and the descriptions of the members will be omitted as appropriate.

[Overview of Embodiment 4]

Embodiment 4 deals with an example process of performing, in a configuration in which (i) two display devices 1 or the like devices have a positional relation as illustrated in FIG. 13 and (ii) one display device detects a position of the other display device, communications between the respective touch panels 14 included in the two display devices, without using any device such as a device for data communications.

As one example process, the description below deals with a process of the receiving device 4a starting up an application by using device identification information or user identification information that the transmitting device 1b has. Note that the description below deals with an arrangement in which the device identification information is used, but a similar process is performed even in an arrangement in which the user identification information is used.

The data communications between the touch panels 14 have been described in Embodiment 1 with reference to FIG. 52, and specific descriptions thereof are therefore omitted. Further, at the start-up of the application, a process performed by the transmitting device 1b is similar to the above-described process. The description below deals with a receiving device 4a that has a function specific to the start-up process.

[Details of Receiving Device 4a (Control Section 78)]

Next, a receiving device 4a that starts up an application upon receipt of data from the transmitting device 1b will be described with reference to FIG. 64. FIG. 64 is an example functional block of a control section 78 included in the receiving device 4a according to the present embodiment.

The receiving device 4a mainly includes the display panel 12, the touch panel 14, the communication section 51, the storage section 52, and the control section 78. The control section 78 includes the drive controlling section 501, the device detection section 502, the synchronization adjusting section 503, the mode changing section 504, the position/angle determining section 505, the data transmitting and receiving section 506, an application control section 781, and a display control section 782.

The application control section 781 performs control of an application stored in the storage section 52. Particularly, in the present embodiment, the application control section 781 judges the presence or absence of an application associated with the device identification information, transmitted from the transmitting device 1b, for identifying the transmitting device 1b, and then starts up such an application in a case where it is judged that the application is present.

The application associated with the device identification information does not necessarily need to be previously stored in the storage section 52. The application, together with the device identification information, may be received from the transmitting device 1b. The receiving device 4a may access a server (not shown) in which applications are stored, in order to receive, from the server, an application associated with the device identification information (which application is permitted to be started up based on the device identification information).

The display control section 782 controls, by controlling a display control circuit (not shown), how an image is displayed on the display panel 12. Particularly, in response to an instruction to execute the application from the application control section 781, the display control section 782 causes the display panel 12 to display an image represented by the application.

<Flowchart>

With reference to FIG. 65, the description below deals with a flow of processes performed by the receiving device 4a. FIG. 65 is a flowchart illustrating a flow of processes performed by the receiving device 4a.

First, the position/angle determining section 505 determines the transmitting device 1b that serves as a counterpart device (S71). This process is similar to the process performed in the step S19 of FIG. 24 in accordance with Embodiment 1. At this time, when the receiving device 4a transmits the position detection completion notification to the transmitting device 1b, the transmitting device 1b, in response to the notification, transmits the device identification information to the receiving device 4a.

The data transmitting and receiving section 506, upon receipt of the device identification information (S72), transmits the device identification information to the application control section 781.

The application control section 781, upon receipt of the device identification information, determines whether the application associated with the device identification information is present or absent in the storage section 52 (S73). Then, in a case where a result of the determination is that the application is present (YES in S73), the application control section 781 starts up the application (S74). On the other hand, in a case where the application is absent (NO in S73), the process of starting up the application on the basis of the device identification information is not performed.

In a case where a plurality of applications associated with the device identification information is present, the application control section 781 controls the display control section 702 so that the display control section 702 causes the display panel 12 to display a selection screen that allows the user to select any of these applications. With this arrangement, it is possible to start up an application desired by the user.

As described in Embodiment 1, the receiving device 4a, as with the receiving device 1a, receives predetermined data that is superimposed on a pulse signal applied to the drive lines DL of the touch panel 14 included in the transmitting device 1b. This allows the receiving device 4a to receive the predetermined data without a need to use a form of communications for receiving the predetermined data. That is, it is possible to perform data communications between the two touch panels 14.

Further, the arrangement enabling such data communications achieves the following advantages:

(a) A need for visualization of information to be transmitted to the receiving device 4a, which visualization is required for data communications using an optical sensor, is eliminated, and data communications with a high level of security are therefore achieved.

(b) A need for infrastructure and wireless communications, both of which are required for WiFi-based data communications, is eliminated. The elimination of the need for wireless communications enables data communications with a high level of security.

(c) A need to provide a device for data communications, which device is required for WiFi-based or infrared-based data communications, is eliminated, and reduction in size of the electronic devices is therefore achieved.

[Software Implementation Example]

Control blocks of the display devices 1, 2, 3, 3a, 3b, the receiving device 1a, the receiving device 4a, the transmitting device 1b, the input devices 2a and 2b (particularly respective functional blocks of the control sections 50, 60, 70, 72, 74, 76, and 78) may be realized by a logic circuit (hardware) provided in an integrated circuit (IC chip) or the like, or may be realized by software as executed by a central processing unit (CPU).

In the latter case, the display device 1 and the like includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program. Note that the present invention can also be implemented by the program in the form of a data signal embedded in a carrier wave which is embodied by electronic transmission.

[Recap]
<Input Control>

An input device (input device 2a) according to Aspect 1 of the present invention is an input device capable of, while a first panel component (touch panel 14) of the input device is placed next to a second panel component (touch panel 14) of a counterpart device, accepting an input of a continuous track made through contact of the target object or approach thereof, the continuous track extending from the first panel component to the second panel component, the input device including: a region determining section (position/angle determining section 505) for, at an occurrence of contact of the counterpart device with the input device or approach thereof to the input device, determining a first adjacent region (adjacent region F1) and defining, in the first adjacent region, an input coordinate system that is in common with the counterpart device, the first adjacent region being a region located in the first panel component so as to be adjacent to the second panel component; a detection position determining section (detection position control section 701) for, upon detection of a user operation performed in the first adjacent region, determining first detection coordinates indicating a position of the user operation in the input coordinate system; and a transmitting section (data transmitting and receiving section 506) for transmitting, to the counterpart device, the first detection coordinates determined by the detection position determining section.

According to the above arrangement, the first detection coordinates, which indicates the position of the user operation having been detected in the first adjacent region, are transmitted to the counterpart device. The first detection coordinates indicate coordinates in the input coordinate system, defined by the region determining section, in common with the counterpart device.

With the arrangement in which the first detection coordinates are transmitted to the counterpart device, the counterpart device can determine whether or not there is a match between the first detection coordinates thus received and the detection position of the user operation performed on the panel component included in the counterpart device, with use of the input coordinate system that is the same as that of the input device (input device that is a transmitting end of the first detection coordinates). As a result, in a case where it is determined that there is a match between the two detection positions, it is possible to cause the counterpart device to recognize that an input is a continuous input operation (input of a continuous track) from the input device to the counterpart device.

The above arrangement makes it possible to achieve a continuous input operation made across two input device that are adjacent to each other, and can thus improve user's convenience.

Further, an input device (input device 2a) according to Aspect 2 of the present invention is preferably, in Aspect 1, such that the transmitting section transmits, to the counterpart device, the first detection coordinates and image information representing an image having been displayed on a display screen (display panel 12) of the input device in accordance with the user operation.

According to the above arrangement, the input device transmits, to the counterpart device, the image having been displayed in accordance with the user operation. This allows, in a case where the counterpart device judges that an input is a continuous input operation from the input device, the counterpart device to display the image in accordance with a subsequent user operation.

The above arrangement thus makes it possible to achieve a visual feedback made in accordance with the continuous input operation.

Still further, an input device (input device 2b) according to Aspect 3 of the present invention is an input device capable of, while a second panel component (touch panel 14) of the input device is placed next to a first panel component (touch panel 14) of a counterpart device, accepting an input of a continuous track made through contact of the target object or approach thereof, the continuous track extending from the first panel component to the second panel component, the input device including: a region determining section (position/angle determining section 505) for, at an occurrence of contact of the counterpart device with the input device or approach thereof to the input device, determining a second adjacent region (adjacent region F2) and defining, in the second adjacent region, an input coordinate system that is in common with the counterpart device, the second adjacent region being a region located in the second panel component so as to be adjacent to the first panel component; a receiving section (data transmitting and receiving section 506) for receiving first detection coordinates, determined by the counterpart device, indicating, in the input coordinate system, a position of a user operation performed in a first adjacent region (adjacent region F1), the first adjacent region being a region located in the first panel component so as to be adjacent to the second panel component; a detection position determining section (detection position control section 721) for, upon detection of a user operation performed in the second adjacent region, determining second detection coordinates indicating a position of the user operation in the input coordinate system; a position judging section (detection position control section 721) for judging whether the second detection coordinates having been determined by the detection position determining section match the first detection coordinates having been received by the receiving section or whether the second detection coordinates is present in a predetermined range where the second detection coordinates are deemed to match the first detection coordinates; and an input judging section (detection position control section 721) for, in a case where the position judging section has judged that the second detection coordinates match the first detection coordinates or that the second detection coordinates are present in the predetermined range, judging the second detection coordinates as being the input of the continuous track.

According to the above arrangement, in a case where the second detection coordinates determined by the detection position determining section match the first detection coordinates received from the counterpart device or where the second detection coordinates are present in the predetermined range where the second detection coordinates are deemed to match the first detection coordinates, the second detection coordinates are judged as being an input of a continuous track.

As described above, a common input coordinate system is defined, and the judgment as to whether or not there is a match between the first detection coordinates and the second detection coordinates is made based on the common input coordinate system. Thus, in a case where there is a match between these coordinates or in a case where it is deemed that there is a match between these coordinates, an end position of the user operation on the counterpart device can be judged as being adjacent to a starting position of the user operation on the input device. The input operation performed at the starting position can thus be judged as a continuous input operation (input of a continuous track) from the counterpart device.

The above arrangement makes it possible to achieve a continuous input operation made across two input device that are adjacent to each other, and can thus improve user's convenience.

Yet further, an input device (input device 2b) according to Aspect 4 of the present invention is preferably, in Aspect 3, such that the receiving section receives the first detection coordinates and image information representing an image having been displayed on a display screen of the counterpart device, and the input device further includes a display control section for causing a display screen (display panel 12) of the input device to display, in accordance with the user operation, an image represented by the image information having been received by the receiving section.

According to the above arrangement, the image having been displayed on the counterpart device in accordance with the user operation is received from the counterpart device. This allows, in a case where the input device judges that an input is a continuous input operation from the counterpart device, the input device to display the image in accordance with a subsequent user operation performed on the input device.

The above arrangement thus makes it possible to achieve a visual feedback made in accordance with the continuous input operation.

Further, an input device (input device 2a or 2b) according to Aspect 5 of the present invention is preferably, in any one of Aspects 1 to 4, such that the first panel component and the second panel component are touch panels that are capacitive touch panels which detect contact of the target object or approach thereof, the touch panels each include sense lines (sense lines SL) each capable of receiving a pulse signal applied to at least one of counterpart-side drive lines (drive lines DL) which are provided in the capacitive touch panel of the counterpart device having contacted or approached the input device, and the region determining section determines a positional relation between the input device and the counterpart device by judging which of the sense lines provided in the touch panel has received the pulse signal having been transmitted from the counterpart-side drive line.

According to the above arrangement, judgment is performed as to which of the sense lines of the other input device has received a pulse signal applied to the at least one of drive lines (counterpart-side drive lines) provided in one input device. This makes it possible to recognize a positional relation between (i) the drive line of the one input device to which the pulse signal has been applied (which has supplied the pulse signal to the other input device) and (ii) the sense line of the other input device which has received the pulse signal.

The above arrangement thus makes it possible to determine the position of the other input device in relation to the one input device, with a precision in units smaller than a distance (line pitch) between adjacent transmitting-end drive lines or between adjacent receiving-end sense lines (i.e. with a high degree of accuracy). For example, interpolation allows detecting the position with a high degree of accuracy in units of display pixel pitch (approximately 0.1 mm).

<Display Control>

A display device (display device 2a) according to Aspect 6 of the present invention is a display device capable of displaying an image related to an image displayed on a counterpart device, the display device including: a determining section (position/angle determining section 505) for determining a position of the counterpart device in relation to the display device at an occurrence of contact of the counterpart device with the display device or approach thereof to the display device; an image control section (image control section 741) for generating, according to the position of the counterpart device which position has been determined by the determining section, a first image to be displayed on a display screen of the display device and generating image generation information required for the counterpart device to generate, according to the position of the counterpart device, a second image, related to the first image, to be displayed on a display screen of the counterpart device; and transmitting section (data transmitting and receiving section 506) for transmitting, to the counterpart device, the image generation information having been generated by the image control section.

According to the above arrangement, the first image is generated according to the position of the counterpart device, and the image generation information is transmitted to the counterpart device. This allows the counterpart device to generate the second image, which is related to the first image, according to the position of the counterpart device.

The above arrangement thus allows adjacent two display devices to display respective images adjusted according to the positional relation between these two display devices.

Further, a display device (display device 2a) according to Aspect 7 of the present invention is preferably, in Aspect 6, such that the determining section judges whether a previously-determined position of the counterpart device matches a currently-determined position of the counterpart device, and in a case where the determining section has judged that there is no match between the previously-determined position and the currently-determined position, the image control section generates the first image and the image generation information.

According to the above arrangement, in a case where it is judged that there is no match between the above two positions, the position of the counterpart device is detected, and the first image and the image generation information are then generated. This allows displaying images according to the positional relation between the two display devices. For example, even when the positional relation is changed after the images have been displayed, images adjusted according to another positional relation obtained by the change can be displayed.

Still further, a display device (display device 2a) according to Aspect 8 of the present invention is preferably, in Aspect 6 or 7, such that the image control section generates the second image instead of the image generation information, and the transmitting section transmits, to the counterpart device, the second image having been generated by the image control section.

According to the above arrangement, the counterpart device only needs to display the incoming second image. This allows the counterpart device to display images adjusted according to the positional relation even when the counterpart device has no mechanism to generate the second image.

Yet further, a display device (display device 2b) according to Aspect 9 of the present invention is preferably a display device capable of displaying an image related to an image displayed on another display device (display device 2a), recited in Aspect 6 or 7, as a counterpart device, the display device including: a receiving section (data transmitting and receiving section 506) for receiving the image generation information; and an image control section (image control section 761) for generating the second image on a basis of the image generation information.

According to the above arrangement, the second image can be generated on the basis of the incoming image generation information. The above arrangement thus allows adjacent two display devices to display respective images adjusted according to the positional relation between these two display devices.

Further, a display device (display device 2a or 2b) according to Aspect 10 of the present invention is preferably, in any one of Aspects 6 to 9, such that the display device further include a touch panel (touch panel 14) being a capacitive touch panel which detects contact of a target object or approach thereof, the touch panel including sense lines (sense lines SL) each capable of receiving a pulse signal applied to at least one of counterpart-side drive lines (drive lines DL) which are provided in a capacitive touch panel (touch panel 14) of a counterpart device having contacted or approached the display device, and the determining section determining a positional relation between the display device and the counterpart device by judging which of the sense lines provided in the touch panel has received the pulse signal having been transmitted from the counterpart-side drive line.

According to the above arrangement, judgment is performed as to which of the sense lines of the other display device has received a pulse signal applied to the at least one of drive lines (counterpart-side drive lines) provided in one display device. This makes it possible to recognize a positional relation between (i) the drive line of the one display device to which the pulse signal is applied (which has supplied the pulse signal to the other display device) and (ii) the sense line of the other display device which has received the pulse signal.

The above arrangement thus makes it possible to determine the position of the other display device in relation to the one display device, with a precision in units smaller than a distance (line pitch) between adjacent transmitting-end drive lines or between adjacent receiving-end sense lines (i.e. with a high degree of accuracy). For example, interpolation allows detecting the position with a high degree of accuracy in units of display pixel pitch (approximately 0.1 mm).

<Others>
(Other Configuration)

An information processing system according to an aspect of the present invention may be constituted by the above-described input devices 2a and 2b or may be constituted by the above-described display devices 3a and 3b. In this case, it is possible to establish an information processing system that yields the variety of effects described above.

The input devices 2a and 2b and display devices 3a and 3b according to the foregoing embodiments of the present invention may be realized by a computer. In this case, the present invention encompasses: a control program for the input devices and display devices which program causes a computer to operate as the foregoing sections included in the input devices and display devices so that the input devices and display devices can be realized by the computer; and a computer-readable storage medium storing the program.

(Differences from Patent Literature 1)

Note that the input devices 2a and 2b and display devices 3a and 3b according to an aspect of the present invention are different from a table-type screen device (digital platform device) 200 of Patent Literature 1 in the following points.

The technique of Patent Literature 1 is such that the table-type screen device 200 detects, on the screen 215, the positions of the electronic devices placed on the screen 215, but one of the electronic devices placed on the screen 215 does not detect the position of the other electronic device.

That is, in the technique of Patent Literature 1, the table-type screen device 200 plays a predominant role. The table-type screen device 200 is a master, while the electronic devices placed on the screen 215 are servants.

Thus, in the technique of Patent Literature 1, the table-type screen device 200, which serves as the master, is an essential component, and the table-type screen device 200, which serves as the master, requires a special component for recognizing the positions of the electronic devices, which serve as the servants. The technique of Patent Literature 1 always requires intermediation of the "master" during each operation, and thus causes a delay in data communications between the electronic devices, which are the servants, and other operations.

On the contrary, according to an aspect of the present invention, a pulse signal applied to the drive line of the touch panel included in one of the input devices or display devices is received by the sense line of the touch panel included in the other input device or display device. This allows the other input device or display device to recognize the position of the one input device or display device (counterpart device). Further, according to an aspect of the present invention, the other input device or display device functioning as the electronic device for receiving the pulse signal functions as the electronic device for transmitting the pulse signal, while the one input device or display device functioning as the electronic device for transmitting the pulse signal functions as the electronic device for receiving the pulse signal (In other words, the function of transmitting the pulse signal and the function of receiving the pulse signal are exchanged between the electronic devices that perform communications with each other.). This allows the electronic device for receiving the pulse signal to recognize the position of the counterpart device in real time.

Thus, according to an aspect of the present invention, the detection of the position of the counterpart device requires no intermediation of any device like the table-type screen device 200 disclosed in Patent Literature 1, and also requires no special components for pressure detection, barcode detection, and other detection.

Further, the detection of the position of the counterpart device can be performed with a high degree of accuracy (e.g. with a precision in unit of a drive line or a sense line). This makes it possible to prevent erroneous recognition of the position of the counterpart device.

Still further, according to an aspect of the present invention, the position detection can be performed without requiring any "master" component like the table-type screen device 200. This makes it possible to perform the position detection without a time lag caused by intermediation of the "master".

Thanks to such a speedup in the position detection operation, it is possible to provide an intuitive and easy-to-use user interface to perform a continuous user operation across the input devices according to an aspect of the present invention or to cause images mutually related to the display devices according to an aspect of the present invention to be displayed on the display devices.

Supplemental Notes

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention enables input control, display control, or the like control based on the detection of a position of a counterpart device, thereby achieving improvement in convenience of a user operation. The present invention is thus particularly applicable to, for example, multifunction mobile telephones, tablet computers, monitors, and televisions.

REFERENCE SIGNS LIST

1 Display device (input device, display device)
2 Display device (input device, display device)
3 Display device (input device, display device)
1a Receiving device (input device, display device)
1b Transmitting device (input device, display device)
2a Input device
2b Input device
3a Display device
3b Display device
12 Display panel (display screen)
14 Touch panel (first panel component, second panel component, capacitive touch panel)
505 Position/angle determining section (region determining section, determining section)
506 Data transmitting and receiving section (transmitting section, receiving section)
701 Detection position control section (detection position determining section)
721 Detection position control section (position judging section, input judging section, display control section)
741 Image control section (image control section)
761 Image control section (image control section)
F1 Adjacent region (first adjacent region)
F2 Adjacent region (second adjacent region)
SL Sense line
DL Drive line (counterpart-side drive line)
SL1 to SLL Sense line
DL1 to DLn Drive line (counterpart-side drive line)

The invention claimed is:

1. An input device that, while a first panel component of the input device is placed adjacent to a second panel component of a counterpart device, accepts an input of a continuous track made through contact of a target object or approach thereof, the continuous track extending from the first panel component to the second panel component, the input device comprising:
the first panel component and the second panel component that are capacitive touch panels that detect contact of the target object or the approach thereof;
a central processing unit (CPU) that:
at an occurrence of contact of the counterpart device with the input device or approach thereof to the input device, determines a first adjacent region and defines in the first adjacent region, an input coordinate system that is in common with the counterpart device, the first adjacent region being a region located in the first panel component to be adjacent to the second panel component;
upon detection of a user operation performed in the first adjacent region, determines first detection coordinates indicating a position of the user operation in the input coordinate system; and
transmits, to the counterpart device, the first detection coordinates; and
a casing in which the first panel component is located, wherein
a minimum distance between the first panel component and an end surface of the casing is no longer than a detectable distance within which the first panel component is capable of detecting the contact of the target object with the end surface or the approach thereof to the end surface, and
the first panel component transmits a pulse signal to the second panel component when the counterpart device has contacted or approached the end surface.

2. The input device according to claim 1, wherein the CPU transmits, to the counterpart device, the first detection coordinates and image information representing an image having been displayed on a display screen of the input device in accordance with the user operation.

3. The input device according to claim 1, wherein
the capacitive touch panels each include sense lines each capable of receiving a pulse signal applied to at least one counterpart-side drive lines that are in the capacitive touch panel of the counterpart device having contacted or approached the input device, and
the CPU determines a positional relation between the input device and the counterpart device by judging which of the sense lines provided in the touch panel has received the pulse signal having been transmitted from the at least one counterpart-side drive line.

4. An input device that, while a second panel component of the input device is placed next to a first panel component of a counterpart device, accepts an input of a continuous track made through contact of a target object or approach thereof, the continuous track extending from the first panel component to the second panel component, the input device comprising:
the first panel component and the second panel component that are capacitive touch panels that detect contact of the target object or approach thereof;
a central processing unit (CPU) that:
at an occurrence of contact of the counterpart device with the input device or approach thereof to the input device, determines a second adjacent region and defines, in the second adjacent region, an input coordinate system that is in common with the counterpart device, the second adjacent region being a region located in the second panel component so as to be adjacent to the first panel component;

receives first detection coordinates, determined by the counterpart device, indicating, in the input coordinate system, a position of a user operation performed in a first adjacent region, the first adjacent region being a region located in the first panel component so as to be adjacent to the second panel component;

upon detection of a user operation performed in the second adjacent region, determines second detection coordinates indicating a position of the user operation in the input coordinate system;

judges whether the second detection coordinates having been determined by the match the first detection coordinates having been received or whether the second detection coordinates is present in a predetermined range where the second detection coordinates are deemed to match the first detection coordinates; and in a case where the CPU has judged that the second detection coordinates match the first detection coordinates or that the second detection coordinates are present in the predetermined range, judges the second detection coordinates as being the input of the continuous track; and a casing in which the second panel component is located, wherein a minimum distance between the second panel component and an end surface of the casing is no longer than a detectable distance within which the second panel component is capable of detecting the contact of the target object with the end surface or the approach thereof to the end surface, and the second panel component receives a pulse signal from the first panel component when the counterpart device has contacted or approached the end surface.

5. The input device according to claim 4, wherein the CPU receives the first detection coordinates and image information representing an image having been displayed on a display screen of the counterpart device, and causes a display screen of the input device to display, in accordance with the user operation, an image represented by the image information having been received by the CPU.

6. A first display device that displays an image related to an image displayed on a counterpart device, the first display device comprising:

a central processing unit (CPU) that:

determines a position of the counterpart device in relation to the first display device at an occurrence of contact of the counterpart device with the first display device or approach thereof to the first display device;

generates, according to the position of the counterpart device which position has been determined, a first image to be displayed on a display screen of the first display device and generating image generation information required for the counterpart device to generate, according to the position of the counterpart device, a second image, related to the first image, to be displayed on a display screen of the counterpart device; and transmits, to the counterpart device, the image generation information having been generated;

a capacitive touch panel that detects contact of a target object or approach thereof; and a casing in which the capacitive touch panel is located, wherein a minimum distance between the capacitive touch panel and an end surface of the casing is no longer than a detectable distance within which the capacitive touch panel is capable of detecting the contact of the target object with the end surface or the approach thereof to the end surface, the capacitive touch panel transmits a pulse signal to a touch panel of the counterpart device when the counterpart device has contacted or approached the end surface.

7. The display device according to claim 6, wherein the CPU judges whether a previously-determined position of the counterpart device matches a currently-determined position of the counterpart device, and in a case where the CPU has judged that there is no match between the previously-determined position and the currently-determined position, the CPU generates the first image and the image generation information.

8. The display device according to claim 6, wherein the CPU generates the second image instead of the image generation information and transmits, to the counterpart device, the second image having been generated by the CPU.

9. A second display device that displays an image related to an image displayed on the first display device, recited in claim 6, as a counterpart device, the second display device comprising:

an additional CPU that receives the image generation information and generates the second image on a basis of the image generation information.

10. The display device according to claim 6, wherein the capacitive touch panel includes sense lines each capable of receiving a pulse signal applied to at least one counterpart-side drive line that are in a capacitive touch panel of a counterpart device having contacted or approached the display device, and the CPU determines a positional relation between the display device and the counterpart device by judging which of the sense lines in the capacitive touch panel has received the pulse signal having been transmitted from the at least one counterpart-side drive line.

* * * * *